(12) United States Patent
Yoscovich et al.

(10) Patent No.: US 11,201,476 B2
(45) Date of Patent: Dec. 14, 2021

(54) PHOTOVOLTAIC POWER DEVICE AND WIRING

(71) Applicant: Solaredge Technologies Ltd., Herzeliya (IL)

(72) Inventors: Ilan Yoscovich, Ramat-Gan (IL); Tzachi Glovinsky, Petah Tikva (IL); Ofir Bieber, Raanana (IL)

(73) Assignee: Solaredge Technologies Ltd., Herzeliya (IL)

( * ) Notice: Subject to any disclaimer, the term of this patent is extended or adjusted under 35 U.S.C. 154(b) by 893 days.

(21) Appl. No.: 15/593,761

(22) Filed: May 12, 2017

(65) Prior Publication Data

US 2017/0346295 A1  Nov. 30, 2017
US 2021/0288503 A9  Sep. 16, 2021

Related U.S. Application Data

(63) Continuation-in-part of application No. 15/478,526, filed on Apr. 4, 2017.
(Continued)

(51) Int. Cl.
*H02J 3/38* (2006.01)
*H02S 40/34* (2014.01)
(Continued)

(52) U.S. Cl.
CPC .............. *H02J 3/385* (2013.01); *H02J 3/383* (2013.01); *H02J 3/46* (2013.01); *H02S 40/32* (2014.12);
(Continued)

(58) Field of Classification Search
CPC .... H02J 3/385; H02J 3/383; H02J 3/46; H02J 7/35; H02S 40/32; H02S 40/34; H02S 50/10
(Continued)

(56) References Cited

U.S. PATENT DOCUMENTS 2,367,925 A  1/1945  Brown
2,586,804 A  2/1952  Fluke
(Continued)

FOREIGN PATENT DOCUMENTS

AU  2073800 A  9/2000
AU  2005262278 A1  1/2006
(Continued)

OTHER PUBLICATIONS

2000; Bascope, G.V.T. Barbi, I; "Generation of Family of Non-isolated DC-DC PWM Converters Using New Three-state Switching Cells"; 2000 IEEE 31st Annual Power Electronics Specialists Conference in Galway, Ireland; vol. 2.
(Continued)

*Primary Examiner* — Michael R. Fin
(74) *Attorney, Agent, or Firm* — Banner & Witcoff, Ltd.

(57) ABSTRACT

Various implementations described herein are directed to employing photovoltaic strings including a photovoltaic power device with a specialized wiring configuration, which enables high string efficiency without incurring excessive wiring costs. Implementations may include a cable built into photovoltaic generators that carry one portion of the current, and other portions of the current may be carried by direct-current (DC) or alternating-current (AC) cables bypassing the photovoltaic generators.

20 Claims, 32 Drawing Sheets

Related U.S. Application Data

(60) Provisional application No. 62/395,461, filed on Sep. 16, 2016, provisional application No. 62/341,147, filed on May 25, 2016, provisional application No. 62/318,303, filed on Apr. 5, 2016, provisional application No. 62/395,461, filed on Sep. 16, 2016, provisional application No. 62/341,147, filed on May 25, 2016.

(51) Int. Cl.
  *H02S 40/32* (2014.01)
  *H02S 50/10* (2014.01)
  *H02J 3/46* (2006.01)
  *H02J 1/00* (2006.01)
  *H02J 7/35* (2006.01)

(52) U.S. Cl.
  CPC ............. *H02S 40/34* (2014.12); *H02S 50/10* (2014.12); *H02J 1/00* (2013.01); *H02J 7/35* (2013.01)

(58) Field of Classification Search
  USPC .................................................. 307/71, 82
  See application file for complete search history.

(56) References Cited

U.S. PATENT DOCUMENTS

| | | | |
|---|---|---|---|
| 2,758,219 | A | 8/1956 | Miller |
| 2,852,721 | A | 9/1958 | Harders et al. |
| 2,958,171 | A | 11/1960 | Deckers |
| 3,369,210 | A | 2/1968 | Manickella |
| 3,392,326 | A | 7/1968 | Lamberton |
| 3,496,029 | A | 2/1970 | King et al. |
| 3,566,143 | A | 2/1971 | Paine et al. |
| 3,569,784 | A | 3/1971 | Carroll et al. |
| 3,643,564 | A | 2/1972 | Uchiyama |
| 3,696,286 | A | 10/1972 | Ule |
| 3,740,652 | A | 6/1973 | Burgener |
| 3,958,136 | A | 5/1976 | Schroeder |
| 4,060,757 | A | 11/1977 | McMurray |
| 4,101,816 | A | 7/1978 | Shepter |
| 4,104,687 | A | 8/1978 | Zulaski |
| 4,127,797 | A | 11/1978 | Perper |
| 4,129,788 | A | 12/1978 | Chavannes |
| 4,129,823 | A | 12/1978 | van der Pool et al. |
| 4,146,785 | A | 3/1979 | Neale |
| 4,161,771 | A | 7/1979 | Bates |
| 4,171,861 | A | 10/1979 | Hohorst |
| 4,183,079 | A | 1/1980 | Wachi |
| 4,257,087 | A | 3/1981 | Cuk |
| 4,296,461 | A | 10/1981 | Mallory et al. |
| 4,321,581 | A | 3/1982 | Tappeiner et al. |
| 4,324,225 | A | 4/1982 | Trihey |
| 4,327,318 | A | 4/1982 | Kwon et al. |
| 4,346,341 | A | 8/1982 | Blackburn et al. |
| 4,363,040 | A | 12/1982 | Inose |
| 4,367,557 | A | 1/1983 | Stern et al. |
| 4,375,662 | A | 3/1983 | Baker |
| 4,384,321 | A | 5/1983 | Rippel |
| 4,404,472 | A | 9/1983 | Steigerwald |
| 4,412,142 | A | 10/1983 | Ragonese et al. |
| 4,452,867 | A | 6/1984 | Conforti |
| 4,453,207 | A | 6/1984 | Paul |
| 4,460,232 | A | 7/1984 | Sotolongo |
| 4,470,213 | A | 9/1984 | Thompson |
| 4,479,175 | A | 10/1984 | Gille et al. |
| 4,481,654 | A | 11/1984 | Daniels et al. |
| 4,488,136 | A | 12/1984 | Hansen et al. |
| 4,526,553 | A | 7/1985 | Guerrero |
| 4,533,986 | A | 8/1985 | Jones |
| 4,545,997 | A | 10/1985 | Wong et al. |
| 4,549,254 | A | 10/1985 | Kissel |
| 4,554,502 | A | 11/1985 | Rohatyn |
| 4,554,515 | A | 11/1985 | Burson et al. |
| 4,580,090 | A | 4/1986 | Bailey et al. |
| 4,591,965 | A | 5/1986 | Dickerson |
| 4,598,330 | A | 7/1986 | Woodworth |
| 4,602,322 | A | 7/1986 | Merrick |
| 4,604,567 | A | 8/1986 | Chetty |
| 4,611,090 | A | 9/1986 | Catella et al. |
| 4,623,753 | A | 11/1986 | Feldman et al. |
| 4,626,983 | A | 12/1986 | Harada et al. |
| 4,631,565 | A | 12/1986 | Tihanyi |
| 4,637,677 | A | 1/1987 | Barkus |
| 4,639,844 | A | 1/1987 | Gallios et al. |
| 4,641,042 | A | 2/1987 | Miyazawa |
| 4,641,079 | A | 2/1987 | Kato et al. |
| 4,644,458 | A | 2/1987 | Harafuji et al. |
| 4,649,334 | A | 3/1987 | Nakajima |
| 4,652,770 | A | 3/1987 | Kumano |
| 4,683,529 | A | 7/1987 | Bucher, II |
| 4,685,040 | A | 8/1987 | Steigerwald et al. |
| 4,686,617 | A | 8/1987 | Colton |
| 4,706,181 | A | 11/1987 | Mercer |
| 4,719,553 | A | 1/1988 | Hinckley |
| 4,720,667 | A | 1/1988 | Lee et al. |
| 4,720,668 | A | 1/1988 | Lee et al. |
| 4,736,151 | A | 4/1988 | Dishner |
| 4,746,879 | A | 5/1988 | Ma et al. |
| 4,772,994 | A | 9/1988 | Harada et al. |
| 4,783,728 | A | 11/1988 | Hoffman |
| 4,797,803 | A | 1/1989 | Carroll |
| 4,819,121 | A | 4/1989 | Saito et al. |
| RE33,057 | E | 9/1989 | Clegg et al. |
| 4,864,213 | A | 9/1989 | Kido |
| 4,868,379 | A | 9/1989 | West |
| 4,873,480 | A | 10/1989 | Lafferty |
| 4,888,063 | A | 12/1989 | Powell |
| 4,888,702 | A | 12/1989 | Gerken et al. |
| 4,899,246 | A | 2/1990 | Tripodi |
| 4,899,269 | A | 2/1990 | Rouzies |
| 4,903,851 | A | 2/1990 | Slough |
| 4,906,859 | A | 3/1990 | Kobayashi et al. |
| 4,910,518 | A | 3/1990 | Kim et al. |
| 4,951,117 | A | 8/1990 | Kasai |
| 4,978,870 | A | 12/1990 | Chen et al. |
| 4,987,360 | A | 1/1991 | Thompson |
| 5,001,415 | A | 3/1991 | Watkinson |
| 5,027,051 | A | 6/1991 | Lafferty |
| 5,027,059 | A | 6/1991 | de Montgolfier et al. |
| 5,045,988 | A | 9/1991 | Gritter et al. |
| 5,081,558 | A | 1/1992 | Mahler |
| 5,097,196 | A | 3/1992 | Schoneman |
| 5,138,422 | A | 8/1992 | Fujii et al. |
| 5,143,556 | A | 9/1992 | Matlin |
| 5,144,222 | A | 9/1992 | Herbert |
| 5,155,670 | A | 10/1992 | Brian |
| 5,191,519 | A | 3/1993 | Kawakami |
| 5,196,781 | A | 3/1993 | Jamieson et al. |
| 5,210,519 | A | 5/1993 | Moore |
| 5,235,266 | A | 8/1993 | Schaffrin |
| 5,237,194 | A | 8/1993 | Takahashi |
| 5,268,832 | A | 12/1993 | Kandatsu |
| 5,280,133 | A | 1/1994 | Nath |
| 5,280,232 | A | 1/1994 | Kohl et al. |
| 5,287,261 | A | 2/1994 | Ehsani |
| 5,289,361 | A | 2/1994 | Vinciarelli |
| 5,289,998 | A | 3/1994 | Bingley et al. |
| 5,327,071 | A | 7/1994 | Frederick et al. |
| 5,329,222 | A | 7/1994 | Gyugyi et al. |
| 5,345,375 | A | 9/1994 | Mohan |
| 5,379,209 | A | 1/1995 | Goff |
| 5,381,327 | A | 1/1995 | Yan |
| 5,391,235 | A | 2/1995 | Inoue |
| 5,402,060 | A | 3/1995 | Erisman |
| 5,404,059 | A | 4/1995 | Loffler |
| 5,412,558 | A | 5/1995 | Sakurai et al. |
| 5,413,313 | A | 5/1995 | Mutterlein et al. |
| 5,428,286 | A | 6/1995 | Kha |
| 5,446,645 | A | 8/1995 | Shirahama et al. |
| 5,460,546 | A | 10/1995 | Kunishi et al. |
| 5,472,614 | A | 12/1995 | Rossi |

(56) References Cited

U.S. PATENT DOCUMENTS

| | | | |
|---|---|---|---|
| 5,477,091 A * | 12/1995 | Fiorina | H02J 1/14 |
| | | | 307/66 |
| 5,493,154 A | 2/1996 | Smith et al. | |
| 5,497,289 A | 3/1996 | Sugishima et al. | |
| 5,501,083 A | 3/1996 | Kim | |
| 5,504,415 A | 4/1996 | Podrazhansky et al. | |
| 5,504,418 A | 4/1996 | Ashley | |
| 5,504,449 A | 4/1996 | Prentice | |
| 5,513,075 A | 4/1996 | Capper et al. | |
| 5,517,378 A | 5/1996 | Asplund et al. | |
| 5,530,335 A | 6/1996 | Decker et al. | |
| 5,539,238 A | 7/1996 | Malhi | |
| 5,548,504 A | 8/1996 | Takehara | |
| 5,563,780 A | 10/1996 | Goad | |
| 5,565,855 A | 10/1996 | Knibbe | |
| 5,566,022 A | 10/1996 | Segev | |
| 5,576,941 A | 11/1996 | Nguyen et al. | |
| 5,580,395 A | 12/1996 | Yoshioka et al. | |
| 5,585,749 A | 12/1996 | Pace et al. | |
| 5,604,430 A | 2/1997 | Decker et al. | |
| 5,616,913 A | 4/1997 | Litterst | |
| 5,631,534 A | 5/1997 | Lewis | |
| 5,636,107 A | 6/1997 | Lu et al. | |
| 5,644,212 A | 7/1997 | Takahashi | |
| 5,644,219 A | 7/1997 | Kurokawa | |
| 5,646,501 A | 7/1997 | Fishman et al. | |
| 5,648,731 A | 7/1997 | Decker et al. | |
| 5,654,740 A | 8/1997 | Schulha | |
| 5,659,465 A | 8/1997 | Flack et al. | |
| 5,677,833 A | 10/1997 | Bingley | |
| 5,684,385 A | 11/1997 | Guyonneau et al. | |
| 5,686,766 A | 11/1997 | Tamechika | |
| 5,696,439 A | 12/1997 | Presti et al. | |
| 5,703,390 A | 12/1997 | Itoh | |
| 5,708,576 A | 1/1998 | Jones et al. | |
| 5,719,758 A | 2/1998 | Nakata et al. | |
| 5,722,057 A | 2/1998 | Wu | |
| 5,726,505 A | 3/1998 | Yamada et al. | |
| 5,726,615 A | 3/1998 | Bloom | |
| 5,731,603 A | 3/1998 | Nakagawa et al. | |
| 5,734,258 A | 3/1998 | Esser | |
| 5,734,259 A | 3/1998 | Sisson et al. | |
| 5,734,565 A | 3/1998 | Mueller et al. | |
| 5,747,967 A | 5/1998 | Muljadi et al. | |
| 5,751,120 A | 5/1998 | Zeitler et al. | |
| 5,773,963 A | 6/1998 | Blanc et al. | |
| 5,777,515 A | 7/1998 | Kimura | |
| 5,777,858 A | 7/1998 | Rodulfo | |
| 5,780,092 A | 7/1998 | Agbo et al. | |
| 5,793,184 A | 8/1998 | O'Connor | |
| 5,798,631 A | 8/1998 | Spee et al. | |
| 5,801,519 A | 9/1998 | Midya et al. | |
| 5,804,894 A | 9/1998 | Leeson et al. | |
| 5,812,045 A | 9/1998 | Ishikawa et al. | |
| 5,814,970 A | 9/1998 | Schmidt | |
| 5,821,734 A | 10/1998 | Faulk | |
| 5,822,186 A | 10/1998 | Bull et al. | |
| 5,838,148 A | 11/1998 | Kurokami et al. | |
| 5,847,549 A | 12/1998 | Dodson, III | |
| 5,859,772 A | 1/1999 | Hilpert | |
| 5,869,956 A | 2/1999 | Nagao et al. | |
| 5,873,738 A | 2/1999 | Shimada et al. | |
| 5,886,882 A | 3/1999 | Rodulfo | |
| 5,886,890 A * | 3/1999 | Ishida | H02J 3/38 |
| | | | 363/71 |
| 5,892,354 A | 4/1999 | Nagao et al. | |
| 5,898,585 A | 4/1999 | Sirichote et al. | |
| 5,903,138 A | 5/1999 | Hwang et al. | |
| 5,905,645 A | 5/1999 | Cross | |
| 5,917,722 A | 6/1999 | Singh | |
| 5,919,314 A | 7/1999 | Kim | |
| 5,923,100 A | 7/1999 | Lukens et al. | |
| 5,923,158 A | 7/1999 | Kurokami et al. | |
| 5,929,614 A | 7/1999 | Copple | |
| 5,930,128 A | 7/1999 | Dent | |
| 5,930,131 A | 7/1999 | Feng | |
| 5,932,994 A | 8/1999 | Jo et al. | |
| 5,933,327 A | 8/1999 | Leighton et al. | |
| 5,945,806 A | 8/1999 | Faulk | |
| 5,946,206 A | 8/1999 | Shimizu et al. | |
| 5,949,668 A | 9/1999 | Schweighofer | |
| 5,955,885 A | 9/1999 | Kurokami et al. | |
| 5,959,438 A | 9/1999 | Jovanovic et al. | |
| 5,961,739 A | 10/1999 | Osborne | |
| 5,963,010 A | 10/1999 | Hayashi et al. | |
| 5,963,078 A | 10/1999 | Wallace | |
| 5,982,253 A | 11/1999 | Perrin et al. | |
| 5,986,909 A | 11/1999 | Hammond et al. | |
| 5,990,659 A | 11/1999 | Frannhagen | |
| 6,002,290 A | 12/1999 | Avery et al. | |
| 6,002,603 A | 12/1999 | Carver | |
| 6,008,971 A | 12/1999 | Duba et al. | |
| 6,021,052 A | 2/2000 | Unger et al. | |
| 6,031,736 A | 2/2000 | Takehara et al. | |
| 6,037,720 A | 3/2000 | Wong et al. | |
| 6,038,148 A | 3/2000 | Farrington et al. | |
| 6,046,470 A | 4/2000 | Williams et al. | |
| 6,046,919 A | 4/2000 | Madenokouji et al. | |
| 6,050,779 A | 4/2000 | Nagao et al. | |
| 6,058,035 A | 5/2000 | Madenokouji et al. | |
| 6,064,086 A | 5/2000 | Nakagawa et al. | |
| 6,078,511 A | 6/2000 | Fasullo et al. | |
| 6,081,104 A | 6/2000 | Kern | |
| 6,082,122 A | 7/2000 | Madenokouji et al. | |
| 6,087,738 A | 7/2000 | Hammond | |
| 6,091,329 A | 7/2000 | Newman | |
| 6,093,885 A | 7/2000 | Takehara et al. | |
| 6,094,129 A | 7/2000 | Baiatu | |
| 6,101,073 A | 8/2000 | Takehara | |
| 6,105,317 A | 8/2000 | Tomiuchi et al. | |
| 6,111,188 A | 8/2000 | Kurokami et al. | |
| 6,111,391 A | 8/2000 | Cullen | |
| 6,111,767 A | 8/2000 | Handleman | |
| 6,130,458 A | 10/2000 | Takagi et al. | |
| 6,150,739 A | 11/2000 | Baumgartl et al. | |
| 6,151,234 A | 11/2000 | Oldenkamp | |
| 6,163,086 A | 12/2000 | Choo | |
| 6,166,455 A | 12/2000 | Li | |
| 6,166,527 A | 12/2000 | Dwelley et al. | |
| 6,169,678 B1 | 1/2001 | Kondo et al. | |
| 6,175,219 B1 | 1/2001 | Imamura et al. | |
| 6,175,512 B1 | 1/2001 | Hagihara et al. | |
| 6,191,456 B1 | 2/2001 | Stoisiek et al. | |
| 6,215,286 B1 | 4/2001 | Scoones et al. | |
| 6,219,623 B1 | 4/2001 | Wills | |
| 6,225,793 B1 | 5/2001 | Dickmann | |
| 6,255,360 B1 | 7/2001 | Domschke et al. | |
| 6,255,804 B1 | 7/2001 | Herniter et al. | |
| 6,256,234 B1 | 7/2001 | Keeth et al. | |
| 6,259,234 B1 | 7/2001 | Perol | |
| 6,262,558 B1 | 7/2001 | Weinberg | |
| 6,268,559 B1 | 7/2001 | Yamawaki | |
| 6,274,804 B1 | 8/2001 | Psyk et al. | |
| 6,275,016 B1 | 8/2001 | Ivanov | |
| 6,281,485 B1 | 8/2001 | Siri | |
| 6,285,572 B1 | 9/2001 | Onizuka et al. | |
| 6,292,379 B1 | 9/2001 | Edevold et al. | |
| 6,297,621 B1 | 10/2001 | Hui et al. | |
| 6,301,128 B1 | 10/2001 | Jang et al. | |
| 6,304,065 B1 | 10/2001 | Wittenbreder | |
| 6,307,749 B1 | 10/2001 | Daanen et al. | |
| 6,311,137 B1 | 10/2001 | Kurokami et al. | |
| 6,316,716 B1 | 11/2001 | Hilgrath | |
| 6,320,769 B2 | 11/2001 | Kurokami et al. | |
| 6,329,808 B1 | 12/2001 | Enguent | |
| 6,331,670 B2 | 12/2001 | Takehara et al. | |
| 6,339,538 B1 | 1/2002 | Handleman | |
| 6,344,612 B1 | 2/2002 | Kuwahara et al. | |
| 6,346,451 B1 | 2/2002 | Simpson et al. | |
| 6,348,781 B1 | 2/2002 | Midya et al. | |
| 6,350,944 B1 | 2/2002 | Sherif et al. | |
| 6,351,130 B1 | 2/2002 | Preiser et al. | |
| 6,369,461 B1 | 4/2002 | Jungreis et al. | |
| 6,369,462 B1 | 4/2002 | Siri | |

(56) References Cited

U.S. PATENT DOCUMENTS

| | | |
|---|---|---|
| 6,380,719 B2 | 4/2002 | Underwood et al. |
| 6,396,170 B1 | 5/2002 | Laufenberg et al. |
| 6,396,239 B1 | 5/2002 | Benn et al. |
| 6,400,579 B2 | 6/2002 | Cuk |
| 6,425,248 B1 | 7/2002 | Tonomura et al. |
| 6,429,546 B1 | 8/2002 | Ropp et al. |
| 6,429,621 B1 | 8/2002 | Arai |
| 6,433,522 B1 | 8/2002 | Siri |
| 6,433,978 B1 | 8/2002 | Neiger et al. |
| 6,441,597 B1 | 8/2002 | Lethellier |
| 6,445,599 B1 | 9/2002 | Nguyen |
| 6,448,489 B2 | 9/2002 | Kimura et al. |
| 6,452,814 B1 | 9/2002 | Wittenbreder |
| 6,465,910 B2 | 10/2002 | Young et al. |
| 6,465,931 B2 | 10/2002 | Knowles et al. |
| 6,469,919 B1 | 10/2002 | Bennett |
| 6,472,254 B2 | 10/2002 | Cantarini et al. |
| 6,483,203 B1 | 11/2002 | McCormack |
| 6,493,246 B2 | 12/2002 | Suzui et al. |
| 6,501,362 B1 | 12/2002 | Hoffman et al. |
| 6,507,176 B2 | 1/2003 | Wittenbreder, Jr. |
| 6,509,712 B1 | 1/2003 | Landis |
| 6,512,444 B1 | 1/2003 | Morris, Jr. et al. |
| 6,515,215 B1 | 2/2003 | Mimura |
| 6,519,165 B2 | 2/2003 | Koike |
| 6,528,977 B2 | 3/2003 | Arakawa |
| 6,531,848 B1 | 3/2003 | Chitsazan et al. |
| 6,545,211 B1 | 4/2003 | Mimura |
| 6,548,205 B2 | 4/2003 | Leung et al. |
| 6,560,131 B1 | 5/2003 | vonBrethorst |
| 6,587,051 B2 | 7/2003 | Takehara et al. |
| 6,590,793 B1 | 7/2003 | Nagao et al. |
| 6,590,794 B1 | 7/2003 | Carter |
| 6,593,520 B2 | 7/2003 | Kondo et al. |
| 6,593,521 B2 | 7/2003 | Kobayashi |
| 6,600,100 B2 | 7/2003 | Ho et al. |
| 6,603,672 B1 | 8/2003 | Deng et al. |
| 6,608,468 B2 | 8/2003 | Nagase |
| 6,611,130 B2 | 8/2003 | Chang |
| 6,611,441 B2 | 8/2003 | Kurokami et al. |
| 6,628,011 B2 | 9/2003 | Droppo et al. |
| 6,633,824 B2 | 10/2003 | Dollar, II |
| 6,636,431 B2 | 10/2003 | Seki et al. |
| 6,650,031 B1 | 11/2003 | Goldack |
| 6,650,560 B2 | 11/2003 | MacDonald et al. |
| 6,653,549 B2 | 11/2003 | Matsushita et al. |
| 6,655,987 B2 | 12/2003 | Higashikozono et al. |
| 6,657,419 B2 | 12/2003 | Renyolds |
| 6,664,762 B2 | 12/2003 | Kutkut |
| 6,672,018 B2 | 1/2004 | Shingleton |
| 6,678,174 B2 | 1/2004 | Suzui et al. |
| 6,690,590 B2 | 2/2004 | Stamenic et al. |
| 6,693,327 B2 | 2/2004 | Priefert et al. |
| 6,693,781 B1 | 2/2004 | Kroker |
| 6,708,507 B1 | 3/2004 | Sem et al. |
| 6,709,291 B1 | 3/2004 | Wallace et al. |
| 6,724,593 B1 | 4/2004 | Smith |
| 6,731,136 B2 | 5/2004 | Knee |
| 6,738,692 B2 | 5/2004 | Schienbein et al. |
| 6,744,643 B2 | 6/2004 | Luo et al. |
| 6,750,391 B2 | 6/2004 | Bower et al. |
| 6,765,315 B2 | 7/2004 | Hammerstrom et al. |
| 6,768,047 B2 | 7/2004 | Chang et al. |
| 6,768,180 B2 | 7/2004 | Salama et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,800,964 B2 | 10/2004 | Beck |
| 6,801,442 B2 | 10/2004 | Suzui et al. |
| 6,807,069 B2 | 10/2004 | Nieminen et al. |
| 6,809,942 B2 | 10/2004 | Madenokouji et al. |
| 6,810,339 B2 | 10/2004 | Wills |
| 6,812,396 B2 | 11/2004 | Makita et al. |
| 6,828,503 B2 | 12/2004 | Yoshikawa et al. |
| 6,828,901 B2 | 12/2004 | Birchfield et al. |
| 6,837,739 B2 | 1/2005 | Gorringe et al. |
| 6,838,611 B2 | 1/2005 | Kondo et al. |
| 6,838,856 B2 | 1/2005 | Raichle |
| 6,842,354 B1 | 1/2005 | Tallam et al. |
| 6,844,739 B2 | 1/2005 | Kasai et al. |
| 6,850,074 B2 | 2/2005 | Adams et al. |
| 6,856,102 B2 | 2/2005 | Lin et al. |
| 6,882,131 B1 | 4/2005 | Takada et al. |
| 6,888,728 B2 | 5/2005 | Takagi et al. |
| 6,894,911 B2 | 5/2005 | Telefus et al. |
| 6,897,370 B2 | 5/2005 | Kondo et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,933,714 B2 | 8/2005 | Fasshauer et al. |
| 6,936,995 B2 | 8/2005 | Kapsokavathis et al. |
| 6,940,735 B2 | 9/2005 | Deng et al. |
| 6,949,843 B2 | 9/2005 | Dubovsky |
| 6,950,323 B2 | 9/2005 | Achleitner et al. |
| 6,963,147 B2 | 11/2005 | Kurokami et al. |
| 6,966,184 B2 | 11/2005 | Toyomura et al. |
| 6,970,365 B2 | 11/2005 | Turchi |
| 6,980,783 B2 | 12/2005 | Liu et al. |
| 6,984,967 B2 | 1/2006 | Notman |
| 6,984,970 B2 | 1/2006 | Capel |
| 6,987,444 B2 | 1/2006 | Bub et al. |
| 6,996,741 B1 | 2/2006 | Pittelkow et al. |
| 7,030,597 B2 | 4/2006 | Bruno et al. |
| 7,031,176 B2 | 4/2006 | Kotsopoulos et al. |
| 7,038,430 B2 | 5/2006 | Itabashi et al. |
| 7,042,195 B2 | 5/2006 | Tsunetsugu et al. |
| 7,045,991 B2 | 5/2006 | Nakamura et al. |
| 7,046,531 B2 | 5/2006 | Zocchi et al. |
| 7,053,506 B2 | 5/2006 | Alonso et al. |
| 7,061,211 B2 | 6/2006 | Satoh et al. |
| 7,061,214 B2 | 6/2006 | Mayega et al. |
| 7,064,967 B2 | 6/2006 | Ichinose et al. |
| 7,068,017 B2 | 6/2006 | Willner et al. |
| 7,072,194 B2 | 7/2006 | Nayar et al. |
| 7,078,883 B2 | 7/2006 | Chapman et al. |
| 7,079,406 B2 | 7/2006 | Kurokami et al. |
| 7,087,332 B2 | 8/2006 | Harris |
| 7,088,595 B2 | 8/2006 | Nino |
| 7,090,509 B1 | 8/2006 | Gilliland et al. |
| 7,091,707 B2 | 8/2006 | Cutler |
| 7,097,516 B2 | 8/2006 | Werner et al. |
| 7,099,169 B2 | 8/2006 | West et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,142,997 B1 | 11/2006 | Widner |
| 7,148,669 B2 | 12/2006 | Maksimovic et al. |
| 7,150,938 B2 | 12/2006 | Munshi et al. |
| 7,157,888 B2 | 1/2007 | Chen et al. |
| 7,158,359 B2 | 1/2007 | Bertele et al. |
| 7,158,395 B2 | 1/2007 | Deng et al. |
| 7,161,082 B2 | 1/2007 | Matsushita et al. |
| 7,174,973 B1 | 2/2007 | Lysaght |
| 7,176,667 B2 | 2/2007 | Chen et al. |
| 7,183,667 B2 | 2/2007 | Colby et al. |
| 7,193,872 B2 | 3/2007 | Siri |
| 7,202,653 B2 | 4/2007 | Pai |
| 7,208,674 B2 | 4/2007 | Aylaian |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,259,474 B2 | 8/2007 | Blanc |
| 7,262,979 B2 | 8/2007 | Wai et al. |
| 7,276,886 B2 | 10/2007 | Kinder et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,282,924 B1 | 10/2007 | Wittner |
| 7,291,036 B1 | 11/2007 | Daily et al. |
| RE39,976 E | 1/2008 | Schiff et al. |
| 7,315,052 B2 | 1/2008 | Alter |
| 7,319,313 B2 | 1/2008 | Dickerson et al. |
| 7,324,361 B2 | 1/2008 | Siri |

(56) References Cited

U.S. PATENT DOCUMENTS

| | | |
|---|---|---|
| 7,336,004 B2 | 2/2008 | Lai |
| 7,336,056 B1 | 2/2008 | Dening |
| 7,339,287 B2 | 3/2008 | Jepsen et al. |
| 7,348,802 B2 | 3/2008 | Kasanyal et al. |
| 7,352,154 B2 | 4/2008 | Cook |
| 7,361,952 B2 | 4/2008 | Miura et al. |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,388,348 B2 | 6/2008 | Mattichak |
| 7,391,190 B1 | 6/2008 | Rajagopalan |
| 7,394,237 B2 | 7/2008 | Chou et al. |
| 7,405,117 B2 | 7/2008 | Zuniga et al. |
| 7,414,870 B2 | 8/2008 | Rottger et al. |
| 7,420,354 B2 | 9/2008 | Cutler |
| 7,420,815 B2 | 9/2008 | Love |
| 7,432,691 B2 | 10/2008 | Cutler |
| 7,435,134 B2 | 10/2008 | Lenox |
| 7,435,897 B2 | 10/2008 | Russell |
| 7,443,052 B2 | 10/2008 | Wendt et al. |
| 7,443,152 B2 | 10/2008 | Utsunomiya |
| 7,450,401 B2 | 11/2008 | Iida |
| 7,456,510 B2 | 11/2008 | Ito et al. |
| 7,456,523 B2 | 11/2008 | Kobayashi |
| 7,463,500 B2 | 12/2008 | West |
| 7,466,566 B2 | 12/2008 | Fukumoto |
| 7,471,014 B2 | 12/2008 | Lum et al. |
| 7,471,524 B1 | 12/2008 | Batarseh et al. |
| 7,479,774 B2 | 1/2009 | Wai et al. |
| 7,482,238 B2 | 1/2009 | Sung |
| 7,485,987 B2 | 2/2009 | Mori et al. |
| 7,495,419 B1 | 2/2009 | Ju |
| 7,504,811 B2 | 3/2009 | Watanabe et al. |
| 7,518,346 B2 | 4/2009 | Prexl et al. |
| 7,538,451 B2 | 5/2009 | Nomoto |
| 7,560,915 B2 | 7/2009 | Ito et al. |
| 7,589,437 B2 | 9/2009 | Henne et al. |
| 7,595,616 B2 | 9/2009 | Prexl et al. |
| 7,596,008 B2 | 9/2009 | Iwata et al. |
| 7,599,200 B2 | 10/2009 | Tomonaga |
| 7,600,349 B2 | 10/2009 | Liebendorfer |
| 7,602,080 B1 | 10/2009 | Hadar et al. |
| 7,602,626 B2 | 10/2009 | Iwata et al. |
| 7,605,498 B2 | 10/2009 | Ledenev et al. |
| 7,612,283 B2 | 11/2009 | Toyomura et al. |
| 7,615,981 B2 | 11/2009 | Wong et al. |
| 7,626,834 B2 | 12/2009 | Chisenga et al. |
| 7,646,116 B2 | 1/2010 | Batarseh et al. |
| 7,649,434 B2 | 1/2010 | Xu et al. |
| 7,701,083 B2 | 4/2010 | Savage |
| 7,709,727 B2 | 5/2010 | Roehrig et al. |
| 7,719,140 B2 | 5/2010 | Ledenev et al. |
| 7,723,865 B2 | 5/2010 | Kitanaka |
| 7,733,069 B2 | 6/2010 | Toyomura et al. |
| 7,748,175 B2 | 7/2010 | Liebendorfer |
| 7,759,575 B2 | 7/2010 | Jones et al. |
| 7,763,807 B2 | 7/2010 | Richter |
| 7,772,716 B2 | 8/2010 | Shaver, II et al. |
| 7,780,472 B2 | 8/2010 | Lenox |
| 7,782,031 B2 | 8/2010 | Qiu et al. |
| 7,783,389 B2 | 8/2010 | Yamada et al. |
| 7,787,273 B2 | 8/2010 | Lu et al. |
| 7,804,282 B2 | 9/2010 | Bertele |
| 7,807,919 B2 | 10/2010 | Powell et al. |
| 7,808,125 B1 | 10/2010 | Sachdeva et al. |
| 7,812,592 B2 | 10/2010 | Prior et al. |
| 7,812,701 B2 | 10/2010 | Lee et al. |
| 7,821,225 B2 | 10/2010 | Chou et al. |
| 7,824,189 B1 | 11/2010 | Lauermann et al. |
| 7,839,022 B2 | 11/2010 | Wolfs |
| 7,843,085 B2 | 11/2010 | Ledenev et al. |
| 7,864,497 B2 | 1/2011 | Quardt et al. |
| 7,868,599 B2 | 1/2011 | Rahman et al. |
| 7,880,334 B2 | 2/2011 | Evans et al. |
| 7,883,808 B2 | 2/2011 | Norimatsu et al. |
| 7,884,278 B2 | 2/2011 | Powell et al. |
| 7,893,346 B2 | 2/2011 | Nachamkin et al. |
| 7,898,112 B2 | 3/2011 | Powell et al. |
| 7,900,361 B2 | 3/2011 | Adest et al. |
| 7,906,007 B2 | 3/2011 | Gibson et al. |
| 7,906,870 B2 | 3/2011 | Ohm |
| 7,919,952 B1 | 4/2011 | Fahrenbruch |
| 7,919,953 B2 | 4/2011 | Porter et al. |
| 7,925,552 B2 | 4/2011 | Tarbell et al. |
| 7,944,191 B2 | 5/2011 | Xu |
| 7,945,413 B2 | 5/2011 | Krein |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 7,969,133 B2 | 6/2011 | Zhang et al. |
| 7,977,810 B2 | 7/2011 | Choi et al. |
| 8,003,885 B2 | 8/2011 | Richter et al. |
| 8,004,113 B2 | 8/2011 | Sander et al. |
| 8,004,116 B2 | 8/2011 | Ledenev et al. |
| 8,004,117 B2 | 8/2011 | Adest et al. |
| 8,004,866 B2 | 8/2011 | Bucella et al. |
| 8,013,472 B2 | 9/2011 | Adest et al. |
| 8,018,748 B2 | 9/2011 | Leonard |
| 8,035,249 B2 | 10/2011 | Shaver, II et al. |
| 8,039,730 B2 | 10/2011 | Hadar et al. |
| 8,049,363 B2 | 11/2011 | McLean et al. |
| 8,050,804 B2 | 11/2011 | Kernahan |
| 8,058,747 B2 | 11/2011 | Avrutsky et al. |
| 8,058,752 B2 | 11/2011 | Erickson, Jr. et al. |
| 8,067,855 B2 | 11/2011 | Mumtaz et al. |
| 8,077,437 B2 | 12/2011 | Mumtaz et al. |
| 8,080,986 B2 | 12/2011 | Lai et al. |
| 8,089,780 B2 | 1/2012 | Mochikawa et al. |
| 8,089,785 B2 | 1/2012 | Rodriguez |
| 8,090,548 B2 | 1/2012 | Abdennadher et al. |
| 8,093,756 B2 | 1/2012 | Porter et al. |
| 8,093,757 B2 | 1/2012 | Wolfs |
| 8,097,818 B2 | 1/2012 | Gerull et al. |
| 8,098,055 B2 | 1/2012 | Avrutsky et al. |
| 8,102,074 B2 | 1/2012 | Hadar et al. |
| 8,102,144 B2 | 1/2012 | Capp et al. |
| 8,111,052 B2 | 2/2012 | Glovinsky |
| 8,116,103 B2 | 2/2012 | Zacharias et al. |
| 8,138,631 B2 | 3/2012 | Allen et al. |
| 8,138,914 B2 | 3/2012 | Wong et al. |
| 8,139,335 B2 | 3/2012 | Quardt et al. |
| 8,139,382 B2 | 3/2012 | Zhang et al. |
| 8,148,849 B2 | 4/2012 | Zanarini et al. |
| 8,158,877 B2 | 4/2012 | Klein et al. |
| 8,169,252 B2 | 5/2012 | Fahrenbruch et al. |
| 8,179,147 B2 | 5/2012 | Dargatz et al. |
| 8,184,460 B2 | 5/2012 | O'Brien et al. |
| 8,188,610 B2 | 5/2012 | Scholte-Wassink |
| 8,204,709 B2 | 6/2012 | Presher, Jr. et al. |
| 8,212,408 B2 | 7/2012 | Fishman |
| 8,212,409 B2 | 7/2012 | Bettenwort et al. |
| 8,248,804 B2 | 8/2012 | Han et al. |
| 8,271,599 B2 | 9/2012 | Eizips et al. |
| 8,274,172 B2 | 9/2012 | Hadar et al. |
| 8,279,644 B2 | 10/2012 | Zhang et al. |
| 8,289,183 B1 | 10/2012 | Foss |
| 8,289,742 B2 | 10/2012 | Adest et al. |
| 8,294,451 B2 | 10/2012 | Hasenfus |
| 8,299,773 B2 | 10/2012 | Jang et al. |
| 8,304,932 B2 | 11/2012 | Ledenev et al. |
| 8,310,101 B2 | 11/2012 | Amaratunga et al. |
| 8,310,102 B2 | 11/2012 | Raju |
| 8,314,375 B2 | 11/2012 | Arditi et al. |
| 8,324,921 B2 | 12/2012 | Adest et al. |
| 8,325,059 B2 | 12/2012 | Rozenboim |
| 8,344,548 B2 | 1/2013 | Stern |
| 8,369,113 B2 | 2/2013 | Rodriguez |
| 8,378,656 B2 | 2/2013 | de Rooij et al. |
| 8,379,418 B2 | 2/2013 | Falk |
| 8,391,031 B2 | 3/2013 | Garrity |
| 8,391,032 B2 | 3/2013 | Garrity et al. |
| 8,395,366 B2 | 3/2013 | Uno |

(56) References Cited

U.S. PATENT DOCUMENTS

| | | |
|---|---|---|
| 8,405,248 B2 | 3/2013 | Mumtaz et al. |
| 8,405,349 B2 | 3/2013 | Kikinis et al. |
| 8,405,367 B2 | 3/2013 | Chisenga et al. |
| 8,410,359 B2 | 4/2013 | Richter |
| 8,410,889 B2 | 4/2013 | Garrity et al. |
| 8,410,950 B2 | 4/2013 | Takehara et al. |
| 8,415,552 B2 | 4/2013 | Hadar et al. |
| 8,415,937 B2 | 4/2013 | Hester |
| 8,427,009 B2 | 4/2013 | Shaver, II et al. |
| 8,436,592 B2 | 5/2013 | Saitoh |
| 8,461,809 B2 | 6/2013 | Rodriguez |
| 8,466,789 B2 | 6/2013 | Muhlberger et al. |
| 8,472,220 B2 | 6/2013 | Garrity et al. |
| 8,473,250 B2 | 6/2013 | Adest et al. |
| 8,509,032 B2 | 8/2013 | Rakib |
| 8,526,205 B2 | 9/2013 | Garrity |
| 8,531,055 B2 | 9/2013 | Adest et al. |
| 8,542,512 B2 | 9/2013 | Garrity |
| 8,570,017 B2 | 10/2013 | Perichon et al. |
| 8,581,441 B2 | 11/2013 | Rotzoll et al. |
| 8,587,151 B2 | 11/2013 | Adest et al. |
| 8,618,692 B2 | 12/2013 | Adest et al. |
| 8,624,443 B2 | 1/2014 | Mumtaz |
| 8,653,689 B2 | 2/2014 | Rozenboim |
| 8,669,675 B2 | 3/2014 | Capp et al. |
| 8,670,255 B2 | 3/2014 | Gong et al. |
| 8,674,548 B2 | 3/2014 | Mumtaz |
| 8,674,668 B2 | 3/2014 | Chisenga et al. |
| 8,686,333 B2 | 4/2014 | Arditi et al. |
| 8,710,351 B2 | 4/2014 | Robbins |
| 8,751,053 B2 | 6/2014 | Hadar et al. |
| 8,773,236 B2 | 7/2014 | Makhota et al. |
| 8,791,598 B2 | 7/2014 | Jain |
| 8,809,699 B2 | 8/2014 | Funk |
| 8,811,047 B2 | 8/2014 | Rodriguez |
| 8,816,535 B2 | 8/2014 | Adest et al. |
| 8,823,212 B2 | 9/2014 | Garrity et al. |
| 8,823,218 B2 | 9/2014 | Hadar et al. |
| 8,823,342 B2 | 9/2014 | Williams |
| 8,835,748 B2 | 9/2014 | Frolov et al. |
| 8,841,916 B2 | 9/2014 | Avrutsky |
| 8,853,886 B2 | 10/2014 | Avrutsky et al. |
| 8,854,193 B2 | 10/2014 | Makhota et al. |
| 8,859,884 B2 | 10/2014 | Dunton et al. |
| 8,860,241 B2 | 10/2014 | Hadar et al. |
| 8,860,246 B2 | 10/2014 | Hadar et al. |
| 8,878,563 B2 | 11/2014 | Robbins |
| 8,917,156 B2 | 12/2014 | Garrity et al. |
| 8,922,061 B2 | 12/2014 | Arditi |
| 8,933,321 B2 | 1/2015 | Hadar et al. |
| 8,934,269 B2 | 1/2015 | Garrity |
| 8,963,375 B2 | 2/2015 | DeGraaff |
| 8,963,378 B1 | 2/2015 | Fornage et al. |
| 8,972,765 B1 | 3/2015 | Krolak et al. |
| 9,130,401 B2 | 9/2015 | Adest et al. |
| 9,257,848 B2 | 2/2016 | Coccia et al. |
| 9,291,696 B2 | 3/2016 | Adest et al. |
| 9,362,743 B2 | 6/2016 | Gazit et al. |
| 9,397,497 B2 | 7/2016 | Ledenev |
| 9,407,161 B2 | 8/2016 | Adest et al. |
| 9,466,737 B2 | 10/2016 | Ledenev |
| 9,647,442 B2 | 5/2017 | Yoscovich et al. |
| 9,660,527 B2 | 5/2017 | Glovinski |
| 9,673,630 B2 | 6/2017 | Ledenev et al. |
| 9,819,178 B2 | 11/2017 | Gazit et al. |
| 9,831,916 B2 | 11/2017 | Behrends |
| 9,843,193 B2 | 12/2017 | Getsla |
| 9,923,516 B2 | 3/2018 | Har-Shai et al. |
| 9,991,717 B1 | 6/2018 | Rowe et al. |
| 10,032,939 B2 | 7/2018 | Ledenev et al. |
| 2001/0000957 A1 | 5/2001 | Birchfield et al. |
| 2001/0023703 A1 | 9/2001 | Kondo et al. |
| 2001/0032664 A1 | 10/2001 | Takehara et al. |
| 2001/0034982 A1 | 11/2001 | Nagao et al. |
| 2001/0035180 A1 | 11/2001 | Kimura et al. |
| 2001/0048605 A1 | 12/2001 | Kurokami et al. |
| 2001/0050102 A1 | 12/2001 | Matsumi et al. |
| 2001/0054881 A1 | 12/2001 | Watanabe |
| 2002/0002040 A1 | 1/2002 | Kline et al. |
| 2002/0014262 A1 | 2/2002 | Matsushita et al. |
| 2002/0017900 A1 | 2/2002 | Takeda et al. |
| 2002/0034083 A1 | 3/2002 | Ayyanar et al. |
| 2002/0038667 A1 | 4/2002 | Kondo et al. |
| 2002/0041505 A1 | 4/2002 | Suzui et al. |
| 2002/0044473 A1 | 4/2002 | Toyomura et al. |
| 2002/0047309 A1 | 4/2002 | Droppo et al. |
| 2002/0047693 A1 | 4/2002 | Chang |
| 2002/0056089 A1 | 5/2002 | Houston |
| 2002/0063552 A1 | 5/2002 | Arakawa |
| 2002/0063625 A1 | 5/2002 | Takehara et al. |
| 2002/0078991 A1 | 6/2002 | Nagao et al. |
| 2002/0080027 A1 | 6/2002 | Conley |
| 2002/0085397 A1 | 7/2002 | Suzui et al. |
| 2002/0105765 A1 | 8/2002 | Kondo et al. |
| 2002/0113689 A1 | 8/2002 | Gehlot et al. |
| 2002/0118559 A1 | 8/2002 | Kurokami et al. |
| 2002/0127980 A1 | 9/2002 | Amanullah et al. |
| 2002/0134567 A1 | 9/2002 | Rasmussen et al. |
| 2002/0148497 A1 | 10/2002 | Sasaoka et al. |
| 2002/0149950 A1 | 10/2002 | Takebayashi |
| 2002/0162585 A1 | 11/2002 | Sugawara et al. |
| 2002/0165458 A1 | 11/2002 | Carter et al. |
| 2002/0177401 A1 | 11/2002 | Judd et al. |
| 2002/0179140 A1 | 12/2002 | Toyomura |
| 2002/0180408 A1 | 12/2002 | McDaniel et al. |
| 2002/0190696 A1 | 12/2002 | Darshan |
| 2003/0002303 A1 | 1/2003 | Riggio et al. |
| 2003/0025594 A1 | 2/2003 | Akiyama et al. |
| 2003/0038615 A1 | 2/2003 | Elbanhawy |
| 2003/0047207 A1 | 3/2003 | Aylaian |
| 2003/0058593 A1 | 3/2003 | Bertele et al. |
| 2003/0058662 A1 | 3/2003 | Baudelot et al. |
| 2003/0066076 A1 | 4/2003 | Minahan |
| 2003/0066555 A1 | 4/2003 | Hui et al. |
| 2003/0075211 A1 | 4/2003 | Makita et al. |
| 2003/0080741 A1 | 5/2003 | LeRow et al. |
| 2003/0085621 A1 | 5/2003 | Potega |
| 2003/0090233 A1 | 5/2003 | Browe |
| 2003/0090246 A1 | 5/2003 | Shenai et al. |
| 2003/0094931 A1 | 5/2003 | Renyolds |
| 2003/0107352 A1 | 6/2003 | Downer et al. |
| 2003/0111103 A1 | 6/2003 | Bower et al. |
| 2003/0116154 A1 | 6/2003 | Butler et al. |
| 2003/0121514 A1 | 7/2003 | Davenport et al. |
| 2003/0127126 A1 | 7/2003 | Yang |
| 2003/0140960 A1 | 7/2003 | Baum et al. |
| 2003/0156439 A1 | 8/2003 | Ohmichi et al. |
| 2003/0164695 A1 | 9/2003 | Fasshauer et al. |
| 2003/0185026 A1 | 10/2003 | Matsuda et al. |
| 2003/0193821 A1 | 10/2003 | Krieger et al. |
| 2003/0201674 A1 | 10/2003 | Droppo et al. |
| 2003/0214274 A1 | 11/2003 | Lethellier |
| 2003/0223257 A1 | 12/2003 | Onoe |
| 2004/0004402 A1 | 1/2004 | Kippley |
| 2004/0027112 A1 | 2/2004 | Kondo et al. |
| 2004/0041548 A1 | 3/2004 | Perry |
| 2004/0056642 A1 | 3/2004 | Nebrigic et al. |
| 2004/0056768 A1 | 3/2004 | Matsushita et al. |
| 2004/0061527 A1 | 4/2004 | Knee |
| 2004/0076028 A1 | 4/2004 | Achleitner et al. |
| 2004/0117676 A1 | 6/2004 | Kobayashi et al. |
| 2004/0118446 A1 | 6/2004 | Toyomura |
| 2004/0123894 A1 | 7/2004 | Erban |
| 2004/0124816 A1 | 7/2004 | DeLepaut |
| 2004/0125618 A1 | 7/2004 | De Rooij et al. |
| 2004/0140719 A1 | 7/2004 | Vulih et al. |
| 2004/0141345 A1 | 7/2004 | Cheng et al. |
| 2004/0144043 A1 | 7/2004 | Stevenson et al. |
| 2004/0150410 A1 | 8/2004 | Schoepf et al. |
| 2004/0164718 A1 | 8/2004 | McDaniel et al. |
| 2004/0165408 A1 | 8/2004 | West et al. |
| 2004/0167676 A1 | 8/2004 | Mizumaki |
| 2004/0169499 A1 | 9/2004 | Huang et al. |
| 2004/0170038 A1 | 9/2004 | Ichinose et al. |

(56) References Cited

U.S. PATENT DOCUMENTS

| | | |
|---|---|---|
| 2004/0189090 A1 | 9/2004 | Yanagida et al. |
| 2004/0189432 A1 | 9/2004 | Yan et al. |
| 2004/0201279 A1 | 10/2004 | Templeton |
| 2004/0201933 A1 | 10/2004 | Blanc |
| 2004/0207366 A1 | 10/2004 | Sung |
| 2004/0211458 A1 | 10/2004 | Gui et al. |
| 2004/0213169 A1 | 10/2004 | Allard et al. |
| 2004/0223351 A1 | 11/2004 | Kurokami et al. |
| 2004/0230343 A1 | 11/2004 | Zalesski |
| 2004/0233685 A1 | 11/2004 | Matsuo et al. |
| 2004/0246226 A1 | 12/2004 | Moon |
| 2004/0255999 A1 | 12/2004 | Matsushita et al. |
| 2004/0258141 A1 | 12/2004 | Tustison et al. |
| 2004/0262998 A1 | 12/2004 | Kunow et al. |
| 2004/0263119 A1 | 12/2004 | Meyer et al. |
| 2004/0263183 A1 | 12/2004 | Naidu et al. |
| 2004/0264225 A1 | 12/2004 | Bhavaraju et al. |
| 2005/0002214 A1 | 1/2005 | Deng et al. |
| 2005/0005785 A1 | 1/2005 | Poss et al. |
| 2005/0006958 A1 | 1/2005 | Dubovsky |
| 2005/0017697 A1 | 1/2005 | Capel |
| 2005/0017701 A1 | 1/2005 | Hsu |
| 2005/0030772 A1 | 2/2005 | Phadke |
| 2005/0040800 A1 | 2/2005 | Sutardja |
| 2005/0041442 A1 | 2/2005 | Balakrishnan |
| 2005/0057214 A1 | 3/2005 | Matan |
| 2005/0057215 A1 | 3/2005 | Matan |
| 2005/0068012 A1 | 3/2005 | Cutler |
| 2005/0068820 A1 | 3/2005 | Radosevich et al. |
| 2005/0077879 A1 | 4/2005 | Near |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0105306 A1 | 5/2005 | Deng et al. |
| 2005/0109386 A1 | 5/2005 | Marshall |
| 2005/0110454 A1 | 5/2005 | Tsai et al. |
| 2005/0121067 A1 | 6/2005 | Toyomura et al. |
| 2005/0135031 A1 | 6/2005 | Colby et al. |
| 2005/0139258 A1 | 6/2005 | Liu et al. |
| 2005/0140335 A1 | 6/2005 | Lee et al. |
| 2005/0162018 A1 | 7/2005 | Realmuto et al. |
| 2005/0163063 A1 | 7/2005 | Kuchler et al. |
| 2005/0172995 A1 | 8/2005 | Rohrig et al. |
| 2005/0179420 A1 | 8/2005 | Satoh et al. |
| 2005/0194937 A1 | 9/2005 | Jacobs |
| 2005/0201397 A1 | 9/2005 | Petite |
| 2005/0213272 A1 | 9/2005 | Kobayashi |
| 2005/0218876 A1 | 10/2005 | Nino |
| 2005/0225090 A1 | 10/2005 | Wobben |
| 2005/0226017 A1 | 10/2005 | Kotsopoulos et al. |
| 2005/0242795 A1 | 11/2005 | Al-Kuran et al. |
| 2005/0257827 A1 | 11/2005 | Gaudiana et al. |
| 2005/0269988 A1 | 12/2005 | Thrap |
| 2005/0275386 A1 | 12/2005 | Jepsen et al. |
| 2005/0275527 A1 | 12/2005 | Kates |
| 2005/0275979 A1 | 12/2005 | Xu |
| 2005/0281064 A1 | 12/2005 | Olsen et al. |
| 2005/0287402 A1 | 12/2005 | Maly et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0043792 A1 | 3/2006 | Hjort et al. |
| 2006/0043942 A1 | 3/2006 | Cohen |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |
| 2006/0077046 A1 | 4/2006 | Endo |
| 2006/0103360 A9 | 5/2006 | Cutler |
| 2006/0108979 A1 | 5/2006 | Daniel et al. |
| 2006/0109009 A1 | 5/2006 | Banke et al. |
| 2006/0113843 A1 | 6/2006 | Beveridge |
| 2006/0113979 A1 | 6/2006 | Ishigaki et al. |
| 2006/0116968 A1 | 6/2006 | Arisawa |
| 2006/0118162 A1 | 6/2006 | Saelzer et al. |
| 2006/0125449 A1 | 6/2006 | Unger |
| 2006/0132102 A1 | 6/2006 | Harvey |
| 2006/0149396 A1 | 7/2006 | Templeton |
| 2006/0152085 A1 | 7/2006 | Flett et al. |
| 2006/0162772 A1 | 7/2006 | Presher et al. |
| 2006/0163946 A1 | 7/2006 | Henne et al. |
| 2006/0164065 A1 | 7/2006 | Hoouk et al. |
| 2006/0171182 A1 | 8/2006 | Siri et al. |
| 2006/0174939 A1 | 8/2006 | Matan |
| 2006/0176029 A1 | 8/2006 | McGinty et al. |
| 2006/0176031 A1 | 8/2006 | Forman et al. |
| 2006/0176036 A1 | 8/2006 | Flatness et al. |
| 2006/0176716 A1 | 8/2006 | Balakrishnan et al. |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0222916 A1 | 10/2006 | Norimatsu et al. |
| 2006/0225781 A1 | 10/2006 | Locher |
| 2006/0227577 A1 | 10/2006 | Horiuchi et al. |
| 2006/0227578 A1 | 10/2006 | Datta et al. |
| 2006/0231132 A1 | 10/2006 | Neussner |
| 2006/0232220 A1 | 10/2006 | Melis |
| 2006/0235717 A1 | 10/2006 | Sharma et al. |
| 2006/0237058 A1 | 10/2006 | McClintock et al. |
| 2006/0238750 A1 | 10/2006 | Shimotomai |
| 2006/0261751 A1 | 11/2006 | Okabe et al. |
| 2006/0266408 A1 | 11/2006 | Horne et al. |
| 2006/0267515 A1 | 11/2006 | Burke et al. |
| 2006/0290317 A1 | 12/2006 | McNulty et al. |
| 2007/0001653 A1 | 1/2007 | Xu |
| 2007/0013349 A1 | 1/2007 | Bassett |
| 2007/0019613 A1 | 1/2007 | Frezzolini |
| 2007/0024257 A1 | 2/2007 | Boldo |
| 2007/0027644 A1 | 2/2007 | Bettenwort et al. |
| 2007/0029636 A1 | 2/2007 | Kanemaru et al. |
| 2007/0030068 A1 | 2/2007 | Motonobu et al. |
| 2007/0035975 A1 | 2/2007 | Dickerson et al. |
| 2007/0040540 A1 | 2/2007 | Cutler |
| 2007/0044837 A1 | 3/2007 | Simburger et al. |
| 2007/0075689 A1 | 4/2007 | Kinder et al. |
| 2007/0075711 A1 | 4/2007 | Blanc et al. |
| 2007/0081364 A1 | 4/2007 | Andreycak |
| 2007/0085523 A1 | 4/2007 | Scoones et al. |
| 2007/0089778 A1 | 4/2007 | Horne et al. |
| 2007/0103108 A1 | 5/2007 | Capp et al. |
| 2007/0103297 A1 | 5/2007 | Armstrong et al. |
| 2007/0107767 A1 | 5/2007 | Hayden et al. |
| 2007/0115635 A1 | 5/2007 | Low et al. |
| 2007/0119718 A1 | 5/2007 | Gibson et al. |
| 2007/0121648 A1 | 5/2007 | Hahn |
| 2007/0133241 A1 | 6/2007 | Mumtaz et al. |
| 2007/0133421 A1 | 6/2007 | Young |
| 2007/0147075 A1 | 6/2007 | Bang |
| 2007/0158185 A1 | 7/2007 | Andelman et al. |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0209656 A1 | 9/2007 | Lee |
| 2007/0211888 A1 | 9/2007 | Corcoran et al. |
| 2007/0223165 A1 | 9/2007 | Itri et al. |
| 2007/0227574 A1 | 10/2007 | Cart |
| 2007/0235071 A1 | 10/2007 | Work et al. |
| 2007/0236187 A1 | 10/2007 | Wai et al. |
| 2007/0241720 A1 | 10/2007 | Sakamoto et al. |
| 2007/0246546 A1 | 10/2007 | Yoshida |
| 2007/0247135 A1 | 10/2007 | Koga |
| 2007/0247877 A1 | 10/2007 | Kwon et al. |
| 2007/0271006 A1 | 11/2007 | Golden et al. |
| 2007/0273339 A1 | 11/2007 | Haines |
| 2007/0273342 A1 | 11/2007 | Kataoka et al. |
| 2007/0273351 A1 | 11/2007 | Matan |
| 2007/0284451 A1 | 12/2007 | Uramoto |
| 2007/0290636 A1 | 12/2007 | Beck et al. |
| 2007/0290656 A1 | 12/2007 | Lee Tai Keung |
| 2008/0021707 A1 | 1/2008 | Bou-Ghazale et al. |
| 2008/0023061 A1 | 1/2008 | Clemens et al. |
| 2008/0024098 A1 | 1/2008 | Hojo |

(56) References Cited

U.S. PATENT DOCUMENTS

| | | |
|---|---|---|
| 2008/0036440 A1 | 2/2008 | Garmer |
| 2008/0055941 A1 | 3/2008 | Victor et al. |
| 2008/0080177 A1 | 4/2008 | Chang |
| 2008/0088184 A1 | 4/2008 | Tung et al. |
| 2008/0089277 A1 | 4/2008 | Alexander et al. |
| 2008/0097655 A1 | 4/2008 | Hadar et al. |
| 2008/0106250 A1 | 5/2008 | Prior et al. |
| 2008/0111529 A1 | 5/2008 | Shah et al. |
| 2008/0115823 A1 | 5/2008 | Kinsey |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0136367 A1 | 6/2008 | Adest et al. |
| 2008/0142071 A1 | 6/2008 | Dorn et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0149167 A1 | 6/2008 | Liu |
| 2008/0150366 A1 | 6/2008 | Adest et al. |
| 2008/0150484 A1 | 6/2008 | Kimball et al. |
| 2008/0164766 A1 | 7/2008 | Adest et al. |
| 2008/0179949 A1 | 7/2008 | Besser et al. |
| 2008/0186004 A1 | 8/2008 | Williams |
| 2008/0191560 A1 | 8/2008 | Besser et al. |
| 2008/0191675 A1 | 8/2008 | Besser et al. |
| 2008/0192510 A1 | 8/2008 | Falk |
| 2008/0192519 A1 | 8/2008 | Iwata et al. |
| 2008/0198523 A1 | 8/2008 | Schmidt et al. |
| 2008/0205096 A1 | 8/2008 | Lai et al. |
| 2008/0218152 A1 | 9/2008 | Bo |
| 2008/0224652 A1 | 9/2008 | Zhu et al. |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0238372 A1 | 10/2008 | Cintra et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0264470 A1 | 10/2008 | Masuda et al. |
| 2008/0266913 A1 | 10/2008 | Brotto et al. |
| 2008/0266919 A1 | 10/2008 | Mallwitz |
| 2008/0283118 A1 | 11/2008 | Rotzoll et al. |
| 2008/0291707 A1 | 11/2008 | Fang |
| 2008/0294472 A1 | 11/2008 | Yamada |
| 2008/0297963 A1 | 12/2008 | Lee et al. |
| 2008/0298608 A1 | 12/2008 | Wilcox |
| 2008/0303503 A1 | 12/2008 | Wolfs |
| 2008/0304296 A1 | 12/2008 | NadimpalliRaju et al. |
| 2008/0304298 A1 | 12/2008 | Toba et al. |
| 2009/0012917 A1 | 1/2009 | Thompson et al. |
| 2009/0014050 A1 | 1/2009 | Haaf |
| 2009/0014057 A1 | 1/2009 | Croft et al. |
| 2009/0014058 A1 | 1/2009 | Croft et al. |
| 2009/0015071 A1 | 1/2009 | Iwata et al. |
| 2009/0020151 A1 | 1/2009 | Fornage |
| 2009/0021877 A1 | 1/2009 | Fornage et al. |
| 2009/0039852 A1 | 2/2009 | Fishelov et al. |
| 2009/0064252 A1 | 3/2009 | Howarter et al. |
| 2009/0066357 A1 | 3/2009 | Fornage |
| 2009/0066399 A1 | 3/2009 | Chen et al. |
| 2009/0069950 A1 | 3/2009 | Kurokami et al. |
| 2009/0073726 A1 | 3/2009 | Babcock |
| 2009/0078300 A1 | 3/2009 | Ang et al. |
| 2009/0080226 A1 | 3/2009 | Fornage |
| 2009/0084570 A1 | 4/2009 | Gherardini et al. |
| 2009/0097172 A1 | 4/2009 | Bremicker et al. |
| 2009/0101191 A1 | 4/2009 | Beck et al. |
| 2009/0102440 A1 | 4/2009 | Coles |
| 2009/0114263 A1 | 5/2009 | Powell et al. |
| 2009/0120485 A1 | 5/2009 | Kikinis |
| 2009/0121549 A1 | 5/2009 | Leonard |
| 2009/0133736 A1 | 5/2009 | Powell et al. |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0150005 A1 | 6/2009 | Hadar et al. |
| 2009/0160258 A1 | 6/2009 | Allen et al. |
| 2009/0179500 A1 | 7/2009 | Ragonese et al. |
| 2009/0179662 A1 | 7/2009 | Moulton et al. |
| 2009/0182532 A1 | 7/2009 | Stoeber et al. |
| 2009/0184746 A1 | 7/2009 | Fahrenbruch |
| 2009/0189456 A1 | 7/2009 | Skutt |
| 2009/0190275 A1 | 7/2009 | Gilmore et al. |
| 2009/0195081 A1 | 8/2009 | Quardt et al. |
| 2009/0206666 A1 | 8/2009 | Sella et al. |
| 2009/0207543 A1 | 8/2009 | Boniface et al. |
| 2009/0217965 A1 | 9/2009 | Dougal et al. |
| 2009/0224817 A1 | 9/2009 | Nakamura et al. |
| 2009/0234692 A1 | 9/2009 | Powell et al. |
| 2009/0237042 A1 | 9/2009 | Glovinski |
| 2009/0237043 A1 | 9/2009 | Glovinsky |
| 2009/0242011 A1 | 10/2009 | Proisy et al. |
| 2009/0243547 A1 | 10/2009 | Andelfinger |
| 2009/0273241 A1 | 11/2009 | Gazit et al. |
| 2009/0278496 A1 | 11/2009 | Nakao et al. |
| 2009/0282755 A1 | 11/2009 | Abbott et al. |
| 2009/0283129 A1 | 11/2009 | Foss |
| 2009/0283130 A1 | 11/2009 | Gilmore et al. |
| 2009/0284232 A1 | 11/2009 | Zhang et al. |
| 2009/0284240 A1 | 11/2009 | Zhang et al. |
| 2009/0284998 A1 | 11/2009 | Zhang et al. |
| 2009/0295225 A1 | 12/2009 | Asplund et al. |
| 2009/0296434 A1 | 12/2009 | De Rooij et al. |
| 2009/0322494 A1 | 12/2009 | Lee |
| 2009/0325003 A1 | 12/2009 | Aberle et al. |
| 2010/0001587 A1 | 1/2010 | Casey et al. |
| 2010/0002349 A1 | 1/2010 | La Scala et al. |
| 2010/0013452 A1 | 1/2010 | Tang et al. |
| 2010/0020576 A1 | 1/2010 | Falk |
| 2010/0026097 A1 | 2/2010 | Avrutsky et al. |
| 2010/0026736 A1 | 2/2010 | Plut |
| 2010/0038907 A1 | 2/2010 | Hunt et al. |
| 2010/0043781 A1 | 2/2010 | Jones et al. |
| 2010/0052735 A1 | 3/2010 | Burkland et al. |
| 2010/0057267 A1 | 3/2010 | Liu et al. |
| 2010/0060000 A1 | 3/2010 | Scholte-Wassink |
| 2010/0071742 A1 | 3/2010 | de Rooij et al. |
| 2010/0085670 A1 | 4/2010 | Palaniswami et al. |
| 2010/0115093 A1 | 5/2010 | Rice |
| 2010/0124027 A1 | 5/2010 | Handelsman et al. |
| 2010/0124087 A1 | 5/2010 | Falk |
| 2010/0126550 A1 | 5/2010 | Foss |
| 2010/0127570 A1 | 5/2010 | Hadar et al. |
| 2010/0127571 A1 | 5/2010 | Hadar et al. |
| 2010/0131108 A1 | 5/2010 | Meyer |
| 2010/0132757 A1 | 6/2010 | He et al. |
| 2010/0132758 A1 | 6/2010 | Gilmore |
| 2010/0132761 A1 | 6/2010 | Echizenya et al. |
| 2010/0133911 A1 | 6/2010 | Williams et al. |
| 2010/0139734 A1 | 6/2010 | Hadar et al. |
| 2010/0139743 A1 | 6/2010 | Hadar et al. |
| 2010/0141041 A1 | 6/2010 | Bose et al. |
| 2010/0141153 A1 | 6/2010 | Recker et al. |
| 2010/0147362 A1 | 6/2010 | King et al. |
| 2010/0154858 A1 | 6/2010 | Jain |
| 2010/0176773 A1 | 7/2010 | Capel |
| 2010/0181957 A1 | 7/2010 | Goeltner |
| 2010/0191383 A1 | 7/2010 | Gaul |
| 2010/0195357 A1 | 8/2010 | Fornage et al. |
| 2010/0195361 A1 | 8/2010 | Stem |
| 2010/0206378 A1 | 8/2010 | Erickson, Jr. et al. |
| 2010/0207764 A1 | 8/2010 | Muhlberger et al. |
| 2010/0207770 A1 | 8/2010 | Thiemann |
| 2010/0208501 A1 | 8/2010 | Matan et al. |
| 2010/0213897 A1 | 8/2010 | Tse |
| 2010/0214808 A1 | 8/2010 | Rodriguez |
| 2010/0217551 A1 | 8/2010 | Goff et al. |
| 2010/0229915 A1 | 9/2010 | Ledenev et al. |
| 2010/0241375 A1 | 9/2010 | Kumar et al. |
| 2010/0244575 A1 | 9/2010 | Coccia et al. |

(56) References Cited

U.S. PATENT DOCUMENTS

| | | |
|---|---|---|
| 2010/0246223 A1 | 9/2010 | Xuan |
| 2010/0264736 A1 | 10/2010 | Mumtaz et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0286836 A1 | 11/2010 | Shaver, II et al. |
| 2010/0288327 A1 | 11/2010 | Lisi et al. |
| 2010/0289337 A1 | 11/2010 | Stauth et al. |
| 2010/0294528 A1 | 11/2010 | Sella et al. |
| 2010/0294903 A1 | 11/2010 | Shmukler et al. |
| 2010/0295680 A1 | 11/2010 | Dumps |
| 2010/0297860 A1 | 11/2010 | Shmukler et al. |
| 2010/0301991 A1 | 12/2010 | Sella et al. |
| 2010/0308662 A1 | 12/2010 | Schatz et al. |
| 2010/0309692 A1 | 12/2010 | Chisenga et al. |
| 2010/0321148 A1 | 12/2010 | Gevorkian |
| 2010/0326809 A1 | 12/2010 | Lang et al. |
| 2010/0327657 A1 | 12/2010 | Kuran |
| 2010/0327659 A1 | 12/2010 | Lisi et al. |
| 2010/0332047 A1 | 12/2010 | Arditi et al. |
| 2011/0006743 A1 | 1/2011 | Fabbro |
| 2011/0012430 A1 | 1/2011 | Cheng et al. |
| 2011/0019444 A1 | 1/2011 | Dargatz et al. |
| 2011/0025130 A1 | 2/2011 | Hadar et al. |
| 2011/0031816 A1 | 2/2011 | Buthker et al. |
| 2011/0031946 A1 | 2/2011 | Egan et al. |
| 2011/0037600 A1 | 2/2011 | Takehara et al. |
| 2011/0043172 A1 | 2/2011 | Dearn |
| 2011/0045802 A1 | 2/2011 | Bland et al. |
| 2011/0049990 A1 | 3/2011 | Amaratunga et al. |
| 2011/0050002 A1 | 3/2011 | De Luca |
| 2011/0050190 A1 | 3/2011 | Avrutsky |
| 2011/0056533 A1 | 3/2011 | Kuan |
| 2011/0061705 A1 | 3/2011 | Croft et al. |
| 2011/0061713 A1 | 3/2011 | Powell et al. |
| 2011/0062784 A1 | 3/2011 | Wolfs |
| 2011/0068633 A1 | 3/2011 | Quardt et al. |
| 2011/0079263 A1 | 4/2011 | Avrutsky |
| 2011/0080147 A1 | 4/2011 | Schoenlinner et al. |
| 2011/0083733 A1 | 4/2011 | Marroquin et al. |
| 2011/0084553 A1 | 4/2011 | Adest et al. |
| 2011/0088741 A1 | 4/2011 | Dunton et al. |
| 2011/0108087 A1 | 5/2011 | Croft et al. |
| 2011/0114154 A1 | 5/2011 | Lichy et al. |
| 2011/0115295 A1 | 5/2011 | Moon et al. |
| 2011/0121652 A1 | 5/2011 | Sella et al. |
| 2011/0125431 A1 | 5/2011 | Adest et al. |
| 2011/0132424 A1 | 6/2011 | Rakib |
| 2011/0133552 A1 | 6/2011 | Binder et al. |
| 2011/0139213 A1 | 6/2011 | Lee |
| 2011/0140536 A1 | 6/2011 | Adest et al. |
| 2011/0141644 A1 | 6/2011 | Hastings et al. |
| 2011/0161722 A1 | 6/2011 | Makhota et al. |
| 2011/0172842 A1 | 7/2011 | Makhota et al. |
| 2011/0173276 A1 | 7/2011 | Eizips et al. |
| 2011/0181251 A1 | 7/2011 | Porter et al. |
| 2011/0181340 A1 | 7/2011 | Gazit |
| 2011/0183537 A1 | 7/2011 | Fornage et al. |
| 2011/0198935 A1 | 8/2011 | Hinman et al. |
| 2011/0210610 A1 | 9/2011 | Mitsuoka et al. |
| 2011/0210611 A1 | 9/2011 | Ledenev et al. |
| 2011/0210612 A1 | 9/2011 | Leutwein |
| 2011/0218687 A1 | 9/2011 | Hadar et al. |
| 2011/0227411 A1 | 9/2011 | Arditi |
| 2011/0232714 A1 | 9/2011 | Bhavaraju et al. |
| 2011/0240100 A1 | 10/2011 | Lu et al. |
| 2011/0245989 A1 | 10/2011 | Makhota et al. |
| 2011/0246338 A1 | 10/2011 | Eich |
| 2011/0254372 A1 | 10/2011 | Haines et al. |
| 2011/0260866 A1 | 10/2011 | Avrutsky et al. |
| 2011/0267721 A1 | 11/2011 | Chaintreuil et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0273017 A1 | 11/2011 | Borup et al. |
| 2011/0273302 A1 | 11/2011 | Fornage et al. |
| 2011/0278955 A1 | 11/2011 | Signorelli et al. |
| 2011/0285205 A1 | 11/2011 | Ledenev et al. |
| 2011/0285375 A1 | 11/2011 | Deboy |
| 2011/0290317 A1 | 12/2011 | Naumovitz et al. |
| 2011/0291486 A1 | 12/2011 | Adest et al. |
| 2011/0298288 A1 | 12/2011 | Cho et al. |
| 2011/0301772 A1 | 12/2011 | Zuercher et al. |
| 2011/0304204 A1 | 12/2011 | Avrutsky et al. |
| 2011/0304213 A1 | 12/2011 | Avrutsky et al. |
| 2011/0304215 A1 | 12/2011 | Avrutsky et al. |
| 2011/0316346 A1 | 12/2011 | Porter et al. |
| 2012/0007434 A1 | 1/2012 | Perreault et al. |
| 2012/0007613 A1 | 1/2012 | Gazit |
| 2012/0019966 A1 | 1/2012 | DeBoer |
| 2012/0026763 A1 | 2/2012 | Humphrey et al. |
| 2012/0026769 A1 | 2/2012 | Schroeder et al. |
| 2012/0032515 A1 | 2/2012 | Ledenev et al. |
| 2012/0033392 A1 | 2/2012 | Golubovic et al. |
| 2012/0033463 A1 | 2/2012 | Rodriguez |
| 2012/0039099 A1 | 2/2012 | Rodriguez |
| 2012/0043818 A1 | 2/2012 | Stratakos et al. |
| 2012/0043823 A1 | 2/2012 | Stratakos et al. |
| 2012/0044014 A1 | 2/2012 | Stratakos et al. |
| 2012/0048325 A1 | 3/2012 | Matsuo et al. |
| 2012/0049627 A1 | 3/2012 | Matsuo et al. |
| 2012/0049801 A1 | 3/2012 | Chang |
| 2012/0056483 A1 | 3/2012 | Capp et al. |
| 2012/0063177 A1 | 3/2012 | Garrity |
| 2012/0080943 A1 | 4/2012 | Phadke |
| 2012/0081009 A1 | 4/2012 | Shteynberg et al. |
| 2012/0081933 A1 | 4/2012 | Garrity |
| 2012/0081934 A1 | 4/2012 | Garrity et al. |
| 2012/0081937 A1 | 4/2012 | Phadke |
| 2012/0087159 A1 | 4/2012 | Chapman et al. |
| 2012/0091810 A1 | 4/2012 | Aiello et al. |
| 2012/0091817 A1 | 4/2012 | Seymour et al. |
| 2012/0098344 A1 | 4/2012 | Bergveld et al. |
| 2012/0104861 A1 | 5/2012 | Kojori et al. |
| 2012/0104863 A1 | 5/2012 | Yuan |
| 2012/0113554 A1 | 5/2012 | Paoletti et al. |
| 2012/0119584 A1 | 5/2012 | Hadar et al. |
| 2012/0133372 A1 | 5/2012 | Tsai et al. |
| 2012/0134058 A1 | 5/2012 | Pamer et al. |
| 2012/0138123 A1 | 6/2012 | Newdoll et al. |
| 2012/0139343 A1 | 6/2012 | Adest et al. |
| 2012/0146420 A1 | 6/2012 | Wolfs |
| 2012/0146583 A1 | 6/2012 | Gaul et al. |
| 2012/0161526 A1 | 6/2012 | Huang et al. |
| 2012/0161528 A1 | 6/2012 | Mumtaz et al. |
| 2012/0169124 A1 | 7/2012 | Nakashima et al. |
| 2012/0174961 A1 | 7/2012 | Larson et al. |
| 2012/0175961 A1 | 7/2012 | Har-Shai et al. |
| 2012/0175963 A1 | 7/2012 | Adest et al. |
| 2012/0187769 A1 | 7/2012 | Spannhake et al. |
| 2012/0194003 A1 | 8/2012 | Schmidt et al. |
| 2012/0199172 A1 | 8/2012 | Avrutsky |
| 2012/0200311 A1 | 8/2012 | Chaintreuil |
| 2012/0212066 A1 | 8/2012 | Adest et al. |
| 2012/0215367 A1 | 8/2012 | Eizips et al. |
| 2012/0217973 A1 | 8/2012 | Avrutsky |
| 2012/0240490 A1 | 9/2012 | Gangemi |
| 2012/0253533 A1 | 10/2012 | Eizips et al. |
| 2012/0253541 A1 | 10/2012 | Arditi et al. |
| 2012/0255591 A1 | 10/2012 | Arditi et al. |
| 2012/0271576 A1 | 10/2012 | Kamel et al. |
| 2012/0274145 A1 | 11/2012 | Taddeo |
| 2012/0274264 A1 | 11/2012 | Mun et al. |
| 2012/0280571 A1 | 11/2012 | Hargis |
| 2012/0299380 A1 | 11/2012 | Haupt |
| 2012/0318320 A1 | 12/2012 | Robbins |
| 2013/0002335 A1 | 1/2013 | DeGraaff |
| 2013/0026839 A1 | 1/2013 | Grana |
| 2013/0026840 A1 | 1/2013 | Arditi et al. |
| 2013/0026842 A1 | 1/2013 | Arditi et al. |
| 2013/0026843 A1 | 1/2013 | Arditi et al. |
| 2013/0038124 A1 | 2/2013 | Newdoll et al. |
| 2013/0049710 A1 | 2/2013 | Kraft et al. |

(56) References Cited

U.S. PATENT DOCUMENTS

| | | |
|---|---|---|
| 2013/0063119 A1 | 3/2013 | Lubomirsky |
| 2013/0082724 A1 | 4/2013 | Noda et al. |
| 2013/0094112 A1 | 4/2013 | Burghardt et al. |
| 2013/0094262 A1 | 4/2013 | Avrutsky |
| 2013/0134790 A1 | 5/2013 | Amaratunga et al. |
| 2013/0181533 A1 | 7/2013 | Capp et al. |
| 2013/0192657 A1 | 8/2013 | Hadar et al. |
| 2013/0193765 A1 | 8/2013 | Yoscovich |
| 2013/0194706 A1 | 8/2013 | Har-Shai et al. |
| 2013/0200710 A1 | 8/2013 | Robbins |
| 2013/0222144 A1 | 8/2013 | Hadar et al. |
| 2013/0229834 A1 | 9/2013 | Garrity et al. |
| 2013/0229842 A1 | 9/2013 | Garrity |
| 2013/0234518 A1 | 9/2013 | Mumtaz et al. |
| 2013/0235637 A1 | 9/2013 | Rodriguez |
| 2013/0279210 A1 | 10/2013 | Chisenga et al. |
| 2013/0285459 A1 | 10/2013 | Jaoui et al. |
| 2013/0294126 A1 | 11/2013 | Garrity et al. |
| 2013/0307556 A1 | 11/2013 | Ledenev et al. |
| 2013/0313909 A1 | 11/2013 | Storbeck et al. |
| 2013/0320778 A1 | 12/2013 | Hopf et al. |
| 2013/0321013 A1 | 12/2013 | Pisklak et al. |
| 2013/0332093 A1 | 12/2013 | Adest et al. |
| 2013/0335861 A1 | 12/2013 | Laschinski et al. |
| 2014/0062206 A1 | 3/2014 | Bryson |
| 2014/0077756 A1 | 3/2014 | Kataoka et al. |
| 2014/0097808 A1 | 4/2014 | Clark et al. |
| 2014/0119076 A1 | 5/2014 | Chang et al. |
| 2014/0167715 A1 | 6/2014 | Wu et al. |
| 2014/0169053 A1 | 6/2014 | Ilic et al. |
| 2014/0191583 A1 | 7/2014 | Chisenga et al. |
| 2014/0233136 A1 | 8/2014 | Heerdt |
| 2014/0246915 A1 | 9/2014 | Mumtaz |
| 2014/0246927 A1 | 9/2014 | Mumtaz |
| 2014/0252859 A1 | 9/2014 | Chisenga et al. |
| 2014/0265551 A1 | 9/2014 | Willis |
| 2014/0265579 A1 | 9/2014 | Mumtaz |
| 2014/0265629 A1 | 9/2014 | Gazit et al. |
| 2014/0265638 A1 | 9/2014 | Orr et al. |
| 2014/0293491 A1 | 10/2014 | Robbins |
| 2014/0306543 A1 | 10/2014 | Garrity et al. |
| 2014/0327313 A1 | 11/2014 | Arditi et al. |
| 2014/0327995 A1 | 11/2014 | Panjwani et al. |
| 2014/0354245 A1 | 12/2014 | Batikoff et al. |
| 2015/0022006 A1 | 1/2015 | Garrity et al. |
| 2015/0028683 A1 | 1/2015 | Hadar et al. |
| 2015/0028692 A1 | 1/2015 | Makhota et al. |
| 2015/0061409 A1 | 3/2015 | Dunton et al. |
| 2015/0131187 A1 | 5/2015 | Krein et al. |
| 2015/0188415 A1 | 7/2015 | Abido et al. |
| 2015/0263609 A1 | 9/2015 | Weida et al. |
| 2015/0318410 A1 | 11/2015 | Higuma |
| 2015/0364918 A1 | 12/2015 | Singh et al. |
| 2015/0381108 A1 | 12/2015 | Hoft et al. |
| 2015/0381111 A1 | 12/2015 | Nicolescu et al. |
| 2016/0006392 A1 | 1/2016 | Hoft |
| 2016/0036235 A1 | 2/2016 | Getsla |
| 2016/0126367 A1 | 5/2016 | Dunton et al. |
| 2016/0172900 A1 | 6/2016 | Welch, Jr. |
| 2016/0181802 A1* | 6/2016 | Jacobson ............. H02M 7/02 307/31 |
| 2016/0211841 A1 | 7/2016 | Harrison |
| 2016/0226252 A1 | 8/2016 | Kravtiz et al. |
| 2016/0226257 A1 | 8/2016 | Porter et al. |
| 2016/0241039 A1 | 8/2016 | Cheng et al. |
| 2016/0268809 A1 | 9/2016 | Ledenev et al. |
| 2016/0270245 A1 | 9/2016 | Linderman |
| 2016/0276820 A1 | 9/2016 | Olivas et al. |
| 2016/0329715 A1 | 11/2016 | Orr et al. |
| 2016/0336899 A1 | 11/2016 | Ledenev et al. |
| 2016/0380436 A1 | 12/2016 | Porter et al. |
| 2017/0104413 A1* | 4/2017 | Busch ............. H02M 3/33507 |
| 2017/0179876 A1 | 6/2017 | Freeman et al. |
| 2017/0184343 A1 | 6/2017 | Freer et al. |
| 2017/0207746 A1 | 7/2017 | Yoscovich et al. |
| 2017/0211190 A1 | 7/2017 | Glasscock et al. |
| 2017/0271879 A1 | 9/2017 | Ledenev et al. |
| 2017/0278375 A1 | 9/2017 | Galin et al. |
| 2017/0288384 A1* | 10/2017 | Loewenstern ......... H02M 7/48 |
| 2017/0331325 A1 | 11/2017 | Ristau |
| 2018/0145593 A1 | 5/2018 | Xi et al. |
| 2018/0191292 A1 | 7/2018 | Ehlmann |
| 2019/0379279 A1 | 12/2019 | Adest et al. |

FOREIGN PATENT DOCUMENTS

| | | |
|---|---|---|
| AU | 2009202125 A1 | 12/2009 |
| AU | 2012225199 A1 | 10/2013 |
| CA | 1183574 | 3/1985 |
| CA | 2063243 A1 | 12/1991 |
| CA | 2301657 A1 | 3/1999 |
| CA | 2394761 A1 | 6/2001 |
| CA | 2658087 A1 | 6/2001 |
| CA | 2443450 A1 | 3/2005 |
| CA | 2572452 A1 | 1/2006 |
| CA | 2613038 A1 | 1/2007 |
| CA | 2704605 A1 | 5/2009 |
| CA | 2702392 C | 9/2015 |
| CN | 2071396 U | 2/1991 |
| CN | 1106523 A | 8/1995 |
| CN | 2284479 Y | 6/1998 |
| CN | 1188453 A | 7/1998 |
| CN | 2305016 Y | 1/1999 |
| CN | 1236213 A | 11/1999 |
| CN | 1244745 A | 2/2000 |
| CN | 1262552 A | 8/2000 |
| CN | 1064487 C | 4/2001 |
| CN | 1309451 A | 8/2001 |
| CN | 1362655 A | 8/2002 |
| CN | 2514538 Y | 10/2002 |
| CN | 1122905 C | 10/2003 |
| CN | 2579063 Y | 10/2003 |
| CN | 1474492 A | 2/2004 |
| CN | 1523726 A | 8/2004 |
| CN | 1551377 A | 12/2004 |
| CN | 1185782 C | 1/2005 |
| CN | 2672938 Y | 1/2005 |
| CN | 1588773 A | 3/2005 |
| CN | 1201157 C | 5/2005 |
| CN | 1614854 A | 5/2005 |
| CN | 2706955 Y | 6/2005 |
| CN | 1245795 C | 3/2006 |
| CN | 1787717 A | 6/2006 |
| CN | 1794537 A | 6/2006 |
| CN | 1838191 A | 9/2006 |
| CN | 1841254 A | 10/2006 |
| CN | 1841823 A | 10/2006 |
| CN | 1892239 A | 1/2007 |
| CN | 1902809 A | 1/2007 |
| CN | 1929276 A | 3/2007 |
| CN | 1930925 A | 3/2007 |
| CN | 1933315 A | 3/2007 |
| CN | 2891438 Y | 4/2007 |
| CN | 101030752 A | 9/2007 |
| CN | 101050770 A | 10/2007 |
| CN | 101107712 A | 1/2008 |
| CN | 100371843 C | 2/2008 |
| CN | 101128974 A | 2/2008 |
| CN | 101136129 A | 3/2008 |
| CN | 101180781 A | 5/2008 |
| CN | 101257221 A | 9/2008 |
| CN | 100426175 C | 10/2008 |
| CN | 201167381 Y | 12/2008 |
| CN | 201203438 Y | 3/2009 |
| CN | 101488271 A | 7/2009 |
| CN | 101521459 A | 9/2009 |
| CN | 101523230 A | 9/2009 |
| CN | 101647172 A | 2/2010 |
| CN | 101672252 A | 3/2010 |
| CN | 101697462 A | 4/2010 |
| CN | 101779291 A | 7/2010 |
| CN | 101847939 A | 9/2010 |
| CN | 201601477 U | 10/2010 |
| CN | 201623478 U | 11/2010 |

(56) References Cited

FOREIGN PATENT DOCUMENTS

| | | | |
|---|---|---|---|
| CN | 101902051 A | 12/2010 |
| CN | 101904015 A | 12/2010 |
| CN | 201663167 U | 12/2010 |
| CN | 101939660 A | 1/2011 |
| CN | 101951011 A | 1/2011 |
| CN | 101951190 A | 1/2011 |
| CN | 101953051 A | 1/2011 |
| CN | 101953060 A | 1/2011 |
| CN | 101976855 A | 2/2011 |
| CN | 101976952 A | 2/2011 |
| CN | 101980409 A | 2/2011 |
| CN | 102084584 A | 6/2011 |
| CN | 102089883 A | 6/2011 |
| CN | 102117815 A | 7/2011 |
| CN | 102148584 A | 8/2011 |
| CN | 201926948 U | 8/2011 |
| CN | 201956938 U | 8/2011 |
| CN | 202034903 U | 11/2011 |
| CN | 102273039 A | 12/2011 |
| CN | 202103601 U | 1/2012 |
| CN | 102362550 A | 2/2012 |
| CN | 102386259 A | 3/2012 |
| CN | 202178274 U | 3/2012 |
| CN | 102474112 A | 5/2012 |
| CN | 102565635 A | 7/2012 |
| CN | 102771017 A | 11/2012 |
| CN | 202871823 U | 4/2013 |
| CN | 103280768 A | 9/2013 |
| CN | 203367304 U | 12/2013 |
| CN | 103548226 A | 1/2014 |
| CN | 103875144 A | 6/2014 |
| CN | 104253585 A | 12/2014 |
| CN | 104488155 A | 4/2015 |
| CN | 104685785 A | 6/2015 |
| CN | 105075046 A | 11/2015 |
| CN | 105164915 A | 12/2015 |
| CN | 105553422 A | 5/2016 |
| CN | 106093721 A | 11/2016 |
| DE | 1161639 B | 1/1964 |
| DE | 3236071 A1 | 1/1984 |
| DE | 3525630 A1 | 1/1987 |
| DE | 3729000 A1 | 3/1989 |
| DE | 4019710 A1 | 1/1992 |
| DE | 4032569 A1 | 4/1992 |
| DE | 4041672 A1 | 6/1992 |
| DE | 9312710 U1 | 10/1993 |
| DE | 4232356 A1 | 3/1994 |
| DE | 4325436 A1 | 2/1995 |
| DE | 4328511 A1 | 3/1995 |
| DE | 19515786 A1 | 11/1995 |
| DE | 19502762 A1 | 8/1996 |
| DE | 19614861 A1 | 7/1997 |
| DE | 19609189 A1 | 9/1997 |
| DE | 19618882 A1 | 11/1997 |
| DE | 19701897 A1 | 7/1998 |
| DE | 19718046 A1 | 11/1998 |
| DE | 19732218 C1 | 3/1999 |
| DE | 19737286 A1 | 3/1999 |
| DE | 19838230 A1 | 2/2000 |
| DE | 19846818 A1 | 4/2000 |
| DE | 19859732 A1 | 6/2000 |
| DE | 19904561 C1 | 8/2000 |
| DE | 19928809 A1 | 1/2001 |
| DE | 019937410 A1 | 2/2001 |
| DE | 19961705 A1 | 7/2001 |
| DE | 10064039 A1 | 12/2001 |
| DE | 10060108 A1 | 6/2002 |
| DE | 10103431 A1 | 8/2002 |
| DE | 10136147 A1 | 2/2003 |
| DE | 10219956 A1 | 4/2003 |
| DE | 10222621 A1 | 11/2003 |
| DE | 202004001246 U1 | 4/2004 |
| DE | 10345302 A1 | 4/2005 |
| DE | 102004043478 A1 | 4/2005 |
| DE | 102004053942 A1 | 5/2006 |
| DE | 102004037446 A1 | 6/2006 |
| DE | 69734495 T2 | 7/2006 |
| DE | 69735169 T2 | 8/2006 |
| DE | 102005012213 A1 | 8/2006 |
| DE | 102005018173 A1 | 10/2006 |
| DE | 20 2005 020161 U1 | 11/2006 |
| DE | 102005036153 A1 | 12/2006 |
| DE | 102005030907 A1 | 1/2007 |
| DE | 102005032864 A1 | 1/2007 |
| DE | 102006023563 A1 | 11/2007 |
| DE | 102006026073 A1 | 12/2007 |
| DE | 202007002077 U1 | 4/2008 |
| DE | 102006060815 A1 | 6/2008 |
| DE | 602004011201 T2 | 12/2008 |
| DE | 102007051134 A1 | 3/2009 |
| DE | 202008012345 U1 | 3/2009 |
| DE | 102007037130 B3 | 4/2009 |
| DE | 102007050031 B3 | 4/2009 |
| DE | 202009007318 U1 | 8/2009 |
| DE | 102008042199 A1 | 4/2010 |
| DE | 102008057874 A1 | 5/2010 |
| DE | 102009051186 A1 | 5/2010 |
| DE | 102009022569 A1 | 12/2010 |
| DE | 102010023549 A1 | 12/2011 |
| DE | 102013101314 A1 | 8/2014 |
| DE | 102013106255 A1 | 12/2014 |
| DE | 102013106808 A1 | 12/2014 |
| EP | 0027405 A1 | 4/1981 |
| EP | 169673 A1 | 1/1986 |
| EP | 0178757 A2 | 4/1986 |
| EP | 0206253 A1 | 12/1986 |
| EP | 0231211 A1 | 8/1987 |
| EP | 0293219 A2 | 11/1988 |
| EP | 0340006 A2 | 11/1989 |
| EP | 0418612 A1 | 3/1991 |
| EP | 419093 A2 | 3/1991 |
| EP | 420295 A1 | 4/1991 |
| EP | 0521467 A2 | 1/1993 |
| EP | 0576271 S2 | 12/1993 |
| EP | 0577334 A2 | 1/1994 |
| EP | 604777 A1 | 7/1994 |
| EP | 0628901 A2 | 12/1994 |
| EP | 0642199 A1 | 3/1995 |
| EP | 653692 A2 | 5/1995 |
| EP | 0670915 A1 | 9/1995 |
| EP | 677749 A2 | 10/1995 |
| EP | 0677749 A3 | 1/1996 |
| EP | 756178 A2 | 1/1997 |
| EP | 0756372 A1 | 1/1997 |
| EP | 0780750 A2 | 6/1997 |
| EP | 0809293 A1 | 11/1997 |
| EP | 824273 A2 | 2/1998 |
| EP | 827254 A2 | 3/1998 |
| EP | 0895146 A1 | 2/1999 |
| EP | 0906660 A1 | 4/1999 |
| EP | 0947905 A2 | 10/1999 |
| EP | 964415 A1 | 12/1999 |
| EP | 964457 A2 | 12/1999 |
| EP | 0978884 A3 | 3/2000 |
| EP | 1012886 A1 | 6/2000 |
| EP | 1024575 A2 | 8/2000 |
| EP | 1034465 A1 | 9/2000 |
| EP | 1035640 A1 | 9/2000 |
| EP | 1039361 A1 | 9/2000 |
| EP | 1039620 A2 | 9/2000 |
| EP | 1039621 A2 | 9/2000 |
| EP | 1047179 A1 | 10/2000 |
| EP | 1130770 A2 | 9/2001 |
| EP | 1143594 A2 | 10/2001 |
| EP | 1187291 A2 | 3/2002 |
| EP | 1235339 A2 | 8/2002 |
| EP | 1239573 A1 | 9/2002 |
| EP | 1239576 A2 | 9/2002 |
| EP | 1254505 A2 | 11/2002 |
| EP | 1271742 A2 | 1/2003 |
| EP | 1291997 A2 | 3/2003 |
| EP | 1330009 A2 | 7/2003 |
| EP | 1339153 A2 | 8/2003 |
| EP | 1369983 A1 | 12/2003 |

(56) References Cited

FOREIGN PATENT DOCUMENTS

| | | |
|---|---|---|
| EP | 1376706 A2 | 1/2004 |
| EP | 1388774 A1 | 2/2004 |
| EP | 1400988 A2 | 3/2004 |
| EP | 1407534 A2 | 4/2004 |
| EP | 1120895 A3 | 5/2004 |
| EP | 1418482 A1 | 5/2004 |
| EP | 1429393 A2 | 6/2004 |
| EP | 1442473 A2 | 8/2004 |
| EP | 1447561 A1 | 8/2004 |
| EP | 1457857 A2 | 9/2004 |
| EP | 1463188 A2 | 9/2004 |
| EP | 1475882 A2 | 11/2004 |
| EP | 1503490 A1 | 2/2005 |
| EP | 1521345 A1 | 4/2005 |
| EP | 1526633 A2 | 4/2005 |
| EP | 1531542 A2 | 5/2005 |
| EP | 1531545 A2 | 5/2005 |
| EP | 1532727 A2 | 5/2005 |
| EP | 1552563 A2 | 7/2005 |
| EP | 1562281 A1 | 8/2005 |
| EP | 1580862 A1 | 9/2005 |
| EP | 1603212 A2 | 12/2005 |
| EP | 1610571 A2 | 12/2005 |
| EP | 1623495 A1 | 2/2006 |
| EP | 1642355 A2 | 4/2006 |
| EP | 0964457 A3 | 5/2006 |
| EP | 1657557 A1 | 5/2006 |
| EP | 1657797 A1 | 5/2006 |
| EP | 1691246 A2 | 8/2006 |
| EP | 1706937 A1 | 10/2006 |
| EP | 1708070 A1 | 10/2006 |
| EP | 1716272 A1 | 11/2006 |
| EP | 1728413 A1 | 12/2006 |
| EP | 1734373 A2 | 12/2006 |
| EP | 1750193 A1 | 2/2007 |
| EP | 1766490 A1 | 3/2007 |
| EP | 1782146 A2 | 5/2007 |
| EP | 1785800 A1 | 5/2007 |
| EP | 1837985 A2 | 9/2007 |
| EP | 1842121 A2 | 10/2007 |
| EP | 1609250 B1 | 1/2008 |
| EP | 1887675 A2 | 2/2008 |
| EP | 1901419 A2 | 3/2008 |
| EP | 1902349 A2 | 3/2008 |
| EP | 1911101 A1 | 4/2008 |
| EP | 1914857 A1 | 4/2008 |
| EP | 2048679 A1 | 4/2009 |
| EP | 2054944 A2 | 5/2009 |
| EP | 2061088 A2 | 5/2009 |
| EP | 2092625 A2 | 8/2009 |
| EP | 2092631 A2 | 8/2009 |
| EP | 2130286 A1 | 12/2009 |
| EP | 2135296 A2 | 12/2009 |
| EP | 2135348 A2 | 12/2009 |
| EP | 2144133 A1 | 1/2010 |
| EP | 2179451 A1 | 4/2010 |
| EP | 2206159 A2 | 7/2010 |
| EP | 2232690 A1 | 9/2010 |
| EP | 2234237 A1 | 9/2010 |
| EP | 2249457 A1 | 11/2010 |
| EP | 2256819 A1 | 12/2010 |
| EP | 2315328 A2 | 4/2011 |
| EP | 2355268 A1 | 8/2011 |
| EP | 2374190 A1 | 10/2011 |
| EP | 2386122 A2 | 11/2011 |
| EP | 2393178 A2 | 12/2011 |
| EP | 2395648 A2 | 12/2011 |
| EP | 2495766 A1 | 9/2012 |
| EP | 2515424 A2 | 10/2012 |
| EP | 2533299 A1 | 12/2012 |
| EP | 2549635 A1 | 1/2013 |
| EP | 2561596 A2 | 2/2013 |
| EP | 2581941 A2 | 4/2013 |
| EP | 2615644 A2 | 7/2013 |
| EP | 2621045 A2 | 7/2013 |
| EP | 2666222 A1 | 11/2013 |
| EP | 2722979 A1 | 4/2014 |
| EP | 2779251 A1 | 9/2014 |
| EP | 3176933 A1 | 6/2017 |
| EP | 2139104 B1 | 10/2017 |
| ES | 2249147 A1 | 3/2006 |
| ES | 2249149 A1 | 3/2006 |
| FR | 2796216 A1 | 1/2001 |
| FR | 2819653 A1 | 7/2002 |
| FR | 2894401 A1 | 6/2007 |
| GB | 310362 A | 9/1929 |
| GB | 612859 A | 11/1948 |
| GB | 1211885 A | 11/1970 |
| GB | 1231961 A | 5/1971 |
| GB | 1261838 A | 1/1972 |
| GB | 1571681 A | 7/1980 |
| GB | 1597508 A | 9/1981 |
| GB | 2128017 A | 4/1984 |
| GB | 2327208 A | 1/1999 |
| GB | 2339465 A | 1/2000 |
| GB | 2376801 A | 12/2002 |
| GB | 2399463 A | 9/2004 |
| GB | 2399465 A | 9/2004 |
| GB | 2415841 A | 1/2006 |
| GB | 2419968 A | 5/2006 |
| GB | 2421847 A | 7/2006 |
| GB | 2434490 A | 7/2007 |
| GB | 2476508 A | 6/2011 |
| GB | 2480015 A | 11/2011 |
| GB | 2480015 B | 11/2011 |
| GB | 2482653 A | 2/2012 |
| GB | 2483317 A | 3/2012 |
| GB | 2485527 A | 5/2012 |
| GB | 2486408 A | 6/2012 |
| GB | 2487368 A | 7/2012 |
| GB | 2497275 A | 6/2013 |
| GB | 2498365 A | 7/2013 |
| GB | 2498790 A | 7/2013 |
| GB | 2498791 A | 7/2013 |
| GB | 2499991 A | 9/2013 |
| JP | S56042365 A | 4/1981 |
| JP | S60027964 A | 2/1985 |
| JP | S60148172 A | 8/1985 |
| JP | 61065320 A | 4/1986 |
| JP | S62154121 A | 7/1987 |
| JP | S62154122 A | 7/1987 |
| JP | H01311874 A | 12/1989 |
| JP | H04219982 A | 8/1992 |
| JP | H04364378 A | 12/1992 |
| JP | H05003678 A | 1/1993 |
| JP | H06035555 A | 2/1994 |
| JP | H06141261 A | 5/1994 |
| JP | H07026849 A | 1/1995 |
| JP | H07058843 A | 3/1995 |
| JP | H07-222436 A | 8/1995 |
| JP | 8009557 A | 1/1996 |
| JP | H08033347 A | 2/1996 |
| JP | H08066050 A | 3/1996 |
| JP | H0897460 A | 4/1996 |
| JP | H08116628 A | 5/1996 |
| JP | H08181343 A | 7/1996 |
| JP | H08185235 A | 7/1996 |
| JP | H08204220 A | 8/1996 |
| JP | H08227324 A | 9/1996 |
| JP | H08316517 A | 11/1996 |
| JP | H08317664 A | 11/1996 |
| JP | H094692 A | 1/1997 |
| JP | H09097918 A | 4/1997 |
| JP | H09148611 A | 6/1997 |
| JP | H09148613 A | 6/1997 |
| JP | H09275644 A | 10/1997 |
| JP | 2676789 B2 | 11/1997 |
| JP | H1017445 A | 1/1998 |
| JP | H1075580 A | 3/1998 |
| JP | H10201086 A | 7/1998 |
| JP | H10201105 A | 7/1998 |
| JP | H10308523 A | 11/1998 |
| JP | 11041832 A | 2/1999 |
| JP | H1146457 A | 2/1999 |

(56) References Cited

FOREIGN PATENT DOCUMENTS

| | | | |
|---|---|---|---|
| JP | 11103538 A | 4/1999 |
| JP | 2892183 B2 | 5/1999 |
| JP | 11206038 A | 7/1999 |
| JP | H11266545 A | 9/1999 |
| JP | 11289891 A | 10/1999 |
| JP | 11318042 A | 11/1999 |
| JP | 2000020150 A | 1/2000 |
| JP | 2000051074 A | 2/2000 |
| JP | 3015512 B2 | 3/2000 |
| JP | 2000-112545 A | 4/2000 |
| JP | 2000-116010 A | 4/2000 |
| JP | 2000160789 A | 6/2000 |
| JP | 2000166097 A | 6/2000 |
| JP | 2000174307 A | 6/2000 |
| JP | 2000232791 A | 8/2000 |
| JP | 2000232793 A | 8/2000 |
| JP | 2000316282 A | 11/2000 |
| JP | 2000324852 A | 11/2000 |
| JP | 2000339044 A | 12/2000 |
| JP | 2000341974 A | 12/2000 |
| JP | 2000347753 A | 12/2000 |
| JP | 2000358330 A | 12/2000 |
| JP | 2001060120 A | 3/2001 |
| JP | 2001075662 A | 3/2001 |
| JP | 2001086765 A | 3/2001 |
| JP | 2001178145 A | 6/2001 |
| JP | 2001189476 A | 7/2001 |
| JP | 2001224142 A | 8/2001 |
| JP | 2001238466 A | 8/2001 |
| JP | 2001250964 A | 9/2001 |
| JP | 2002073184 A | 3/2002 |
| JP | 2002231578 A | 8/2002 |
| JP | 2002238246 A | 8/2002 |
| JP | 2002-262461 A | 9/2002 |
| JP | 2002270876 A | 9/2002 |
| JP | 2002300735 A | 10/2002 |
| JP | 2002339591 A | 11/2002 |
| JP | 2002354677 A | 12/2002 |
| JP | 2003102134 A | 4/2003 |
| JP | 2003124492 A | 4/2003 |
| JP | 2003134661 A | 5/2003 |
| JP | 2003134667 A | 5/2003 |
| JP | 2003282916 A | 10/2003 |
| JP | 2003289674 A | 10/2003 |
| JP | 3499941 B2 | 2/2004 |
| JP | 2004055603 A | 2/2004 |
| JP | 2004-096090 A | 3/2004 |
| JP | 2004111754 A | 4/2004 |
| JP | 2004-147465 A | 5/2004 |
| JP | 2004194500 A | 7/2004 |
| JP | 2004260944 A | 9/2004 |
| JP | 2004312994 A | 11/2004 |
| JP | 2004334704 A | 11/2004 |
| JP | 2005-151662 A | 6/2005 |
| JP | 3656531 B2 | 6/2005 |
| JP | 2005192314 A | 7/2005 |
| JP | 2005-235082 A | 9/2005 |
| JP | 2005251039 A | 9/2005 |
| JP | 2005-276942 A | 10/2005 |
| JP | 2005-312287 A | 11/2005 |
| JP | 2006041440 A | 2/2006 |
| JP | 2006262619 A | 9/2006 |
| JP | 2006278755 A | 10/2006 |
| JP | 2007058845 A | 3/2007 |
| JP | 2007104872 A | 4/2007 |
| JP | 2007225625 A | 9/2007 |
| JP | 4174227 B2 | 10/2008 |
| JP | 2010-146047 A | 7/2010 |
| JP | 2010245532 A | 10/2010 |
| JP | 2011-249790 A | 12/2011 |
| JP | 2012-60714 A | 3/2012 |
| JP | 2012511299 A | 5/2012 |
| JP | 2012178535 A | 9/2012 |
| KR | 20010044490 A | 6/2001 |
| KR | 20040086088 A | 10/2004 |
| KR | 100468127 B1 | 1/2005 |
| KR | 200402282 Y1 | 11/2005 |
| KR | 20060060825 A | 6/2006 |
| KR | 20070036528 A | 4/2007 |
| KR | 100725755 B1 | 5/2007 |
| KR | 20080092747 A | 10/2008 |
| KR | 100912892 B1 | 8/2009 |
| KR | 101073143 B1 | 10/2011 |
| NL | 1011483 C2 | 9/2000 |
| TW | 497326 B | 8/2002 |
| TW | 200913291 A | 3/2009 |
| WO | 8202134 A1 | 6/1982 |
| WO | 1982002134 A1 | 6/1982 |
| WO | 1984003402 A1 | 8/1984 |
| WO | 1988004801 A1 | 6/1988 |
| WO | 9003680 A1 | 4/1990 |
| WO | 1992007418 A1 | 4/1992 |
| WO | 1993013587 A1 | 7/1993 |
| WO | 95/25374 A1 | 9/1995 |
| WO | 95/34121 A1 | 12/1995 |
| WO | 1996007130 A1 | 3/1996 |
| WO | 1996013093 A1 | 5/1996 |
| WO | 1998023021 A2 | 5/1998 |
| WO | 1999028801 A1 | 6/1999 |
| WO | 00/00839 A1 | 1/2000 |
| WO | 00/21178 A1 | 4/2000 |
| WO | 0042689 A1 | 7/2000 |
| WO | 0075947 A1 | 12/2000 |
| WO | 0077522 A1 | 12/2000 |
| WO | 01/13502 A1 | 2/2001 |
| WO | 01047095 A2 | 6/2001 |
| WO | 02/17469 A1 | 2/2002 |
| WO | 0231517 | 4/2002 |
| WO | 02056126 A1 | 7/2002 |
| WO | 2002073785 A1 | 9/2002 |
| WO | 0278164 A1 | 10/2002 |
| WO | 02078164 A1 | 10/2002 |
| WO | 02093655 A1 | 11/2002 |
| WO | 03012569 A1 | 2/2003 |
| WO | 2003012569 | 2/2003 |
| WO | 03/026114 A2 | 3/2003 |
| WO | 2003036688 A2 | 5/2003 |
| WO | 2003050938 A2 | 6/2003 |
| WO | 2003071655 A1 | 8/2003 |
| WO | 03084041 A1 | 10/2003 |
| WO | 2003098703 | 11/2003 |
| WO | 2004001942 A1 | 12/2003 |
| WO | 2004006342 A1 | 1/2004 |
| WO | 2004008619 A2 | 1/2004 |
| WO | 2004023278 A2 | 3/2004 |
| WO | 2004053993 A1 | 6/2004 |
| WO | 2004090993 A2 | 10/2004 |
| WO | 2004098261 A2 | 11/2004 |
| WO | 2004100344 A2 | 11/2004 |
| WO | 2004100348 A1 | 11/2004 |
| WO | 2004107543 A2 | 12/2004 |
| WO | 2005015584 A2 | 2/2005 |
| WO | 2005027300 A1 | 3/2005 |
| WO | 2005036725 A1 | 4/2005 |
| WO | 2005053189 A1 | 6/2005 |
| WO | 2005069096 A1 | 7/2005 |
| WO | 2005076444 A1 | 8/2005 |
| WO | 2005076445 A1 | 8/2005 |
| WO | 2005089030 A1 | 9/2005 |
| WO | 2005112551 A2 | 12/2005 |
| WO | 2005119278 A1 | 12/2005 |
| WO | 2005119609 A2 | 12/2005 |
| WO | 2005124498 A1 | 12/2005 |
| WO | 2006002380 A2 | 1/2006 |
| WO | 2006005125 A1 | 1/2006 |
| WO | 2006007198 A1 | 1/2006 |
| WO | 2006011071 A2 | 2/2006 |
| WO | 2006011359 A1 | 2/2006 |
| WO | 2006013600 A2 | 2/2006 |
| WO | 2006033143 A1 | 3/2006 |
| WO | 2006/013600 A3 | 5/2006 |
| WO | 2006048688 A1 | 5/2006 |
| WO | 2006048689 A2 | 5/2006 |
| WO | 2006/074561 A1 | 7/2006 |

(56) References Cited

FOREIGN PATENT DOCUMENTS

| | | |
|---|---|---|
| WO | 2006071436 A2 | 7/2006 |
| WO | 2006078685 A2 | 7/2006 |
| WO | 2006079503 A2 | 8/2006 |
| WO | 2006089778 A2 | 8/2006 |
| WO | 2006110613 A2 | 10/2006 |
| WO | 2006/125664 A1 | 11/2006 |
| WO | 2006117551 A2 | 11/2006 |
| WO | 2006130520 A2 | 12/2006 |
| WO | 2006137948 A2 | 12/2006 |
| WO | 2007006564 A2 | 1/2007 |
| WO | 2007007360 A2 | 1/2007 |
| WO | 2007010326 A1 | 1/2007 |
| WO | 2007/020419 A1 | 2/2007 |
| WO | 2007048421 A2 | 5/2007 |
| WO | 2007072517 A1 | 6/2007 |
| WO | 2007073951 A1 | 7/2007 |
| WO | 2007080429 A2 | 7/2007 |
| WO | 2007084196 A2 | 7/2007 |
| WO | 2007090476 A2 | 8/2007 |
| WO | 2007113358 A1 | 10/2007 |
| WO | 2007124518 A1 | 11/2007 |
| WO | 2007129808 A1 | 11/2007 |
| WO | 2007142693 A2 | 12/2007 |
| WO | 2008008528 A2 | 1/2008 |
| WO | 2008026207 A2 | 3/2008 |
| WO | 2008/046370 A1 | 4/2008 |
| WO | 2008077473 A2 | 7/2008 |
| WO | 2008069926 A3 | 8/2008 |
| WO | 2008097591 A2 | 8/2008 |
| WO | 2008119034 A1 | 10/2008 |
| WO | 2008121266 A2 | 10/2008 |
| WO | 2008125915 A2 | 10/2008 |
| WO | 2008132551 A2 | 11/2008 |
| WO | 2008132553 A2 | 11/2008 |
| WO | 2008142480 A2 | 11/2008 |
| WO | 2009003680 A1 | 1/2009 |
| WO | 2009006879 A2 | 1/2009 |
| WO | 2009007782 A2 | 1/2009 |
| WO | 2009011780 A2 | 1/2009 |
| WO | 2009020917 A2 | 2/2009 |
| WO | 2009/026602 A1 | 3/2009 |
| WO | 2009007782 A3 | 3/2009 |
| WO | 2009046533 A1 | 4/2009 |
| WO | 2009051221 A1 | 4/2009 |
| WO | 2009051222 A1 | 4/2009 |
| WO | 2009051853 A1 | 4/2009 |
| WO | 2009051854 A1 | 4/2009 |
| WO | 2009051870 A1 | 4/2009 |
| WO | 2009055474 A1 | 4/2009 |
| WO | 2009/059877 A1 | 5/2009 |
| WO | 2009056957 A2 | 5/2009 |
| WO | 2009059028 A2 | 5/2009 |
| WO | 2009064683 A2 | 5/2009 |
| WO | 2009/072075 A2 | 6/2009 |
| WO | 2009/073867 A1 | 6/2009 |
| WO | 2009072076 A2 | 6/2009 |
| WO | 2009072077 A1 | 6/2009 |
| WO | 2009073995 A1 | 6/2009 |
| WO | 2009075985 A2 | 6/2009 |
| WO | 2009/075985 A3 | 7/2009 |
| WO | 2009114341 A2 | 9/2009 |
| WO | 2009118682 A2 | 10/2009 |
| WO | 2009118683 A2 | 10/2009 |
| WO | 2009073868 A1 | 11/2009 |
| WO | 2009118683 A3 | 11/2009 |
| WO | 2009136358 A1 | 11/2009 |
| WO | 2009140536 A2 | 11/2009 |
| WO | 2009140539 A1 | 11/2009 |
| WO | 2009140543 A2 | 11/2009 |
| WO | 2009140551 A2 | 11/2009 |
| WO | 2009118682 A3 | 12/2009 |
| WO | 2009155392 A1 | 12/2009 |
| WO | 2010/002960 A1 | 1/2010 |
| WO | 2010/003941 A2 | 1/2010 |
| WO | 2009136358 A4 | 1/2010 |
| WO | 2009/140536 A3 | 2/2010 |
| WO | 2009/140543 A3 | 2/2010 |
| WO | 2009/140551 A3 | 2/2010 |
| WO | 2010014116 A1 | 2/2010 |
| WO | 2010020385 A2 | 2/2010 |
| WO | 2010/042124 A1 | 4/2010 |
| WO | 2010037393 A1 | 4/2010 |
| WO | 2010056777 A1 | 5/2010 |
| WO | 2010/071855 A2 | 6/2010 |
| WO | 2010062410 A1 | 6/2010 |
| WO | 2010062662 A2 | 6/2010 |
| WO | 2010065043 A1 | 6/2010 |
| WO | 2010065388 A1 | 6/2010 |
| WO | 2010072717 A1 | 7/2010 |
| WO | 2010078303 A2 | 7/2010 |
| WO | 2010080672 A2 | 7/2010 |
| WO | 2010091025 A2 | 8/2010 |
| WO | 2010094012 A1 | 8/2010 |
| WO | 2010118503 A1 | 10/2010 |
| WO | 2010120315 A1 | 10/2010 |
| WO | 2010/132369 A1 | 11/2010 |
| WO | 2010134057 A1 | 11/2010 |
| WO | 20100134057 A1 | 11/2010 |
| WO | 2011005339 A1 | 1/2011 |
| WO | 2011011711 A2 | 1/2011 |
| WO | 2011014275 A1 | 2/2011 |
| WO | 2011017721 A1 | 2/2011 |
| WO | 2011019936 A1 | 2/2011 |
| WO | 2011023732 A2 | 3/2011 |
| WO | 2011028456 A2 | 3/2011 |
| WO | 2011028457 A2 | 3/2011 |
| WO | 2011044641 A1 | 4/2011 |
| WO | 2011049985 A1 | 4/2011 |
| WO | 2011059067 A1 | 5/2011 |
| WO | 2011074025 A1 | 6/2011 |
| WO | 2011076707 A2 | 6/2011 |
| WO | 2011085259 A2 | 7/2011 |
| WO | 2011089607 A1 | 7/2011 |
| WO | 2011109746 A2 | 9/2011 |
| WO | 2011119587 A2 | 9/2011 |
| WO | 2011133843 A2 | 10/2011 |
| WO | 2011133928 A2 | 10/2011 |
| WO | 2011151672 A1 | 12/2011 |
| WO | 2012024538 A3 | 5/2012 |
| WO | 2012100263 A2 | 7/2012 |
| WO | 2013015921 A1 | 1/2013 |
| WO | 2013019899 A2 | 2/2013 |
| WO | 1998023021 A | 7/2013 |
| WO | 2013130563 A1 | 9/2013 |
| WO | 2014143021 A1 | 9/2014 |
| WO | 2017/125375 A1 | 7/2017 |
| WO | 2018122835 A1 | 7/2018 |

OTHER PUBLICATIONS

Jan. 20, 2005; Duncan, Joseph, A Global Maximum Power Point Tracking DC-DC Converter, Massachussetts Institute of Technology, Dept. of Electrical Engineering and Computer Science Dissertation; 8 pages.

2005; Edelmoser, K.H. et al.; High Efficiency DC-to-AC Power Inverter with Special DC Interface; Professional Paper, ISSN 0005-1144, Automatika 46 (2005) 3-4, 143-148, 6 pages.

2006; Esmaili, Gholamreza; "Application of Advanced Power Electronics in Renewable Energy Sources and Hygrid Generating Systems" Ohio State Univerty, Graduate Program in Electrical and Computer Engineering, Dissertation. 169 pages.

Nov. 13, 2007; Gomez, M; "Consulting in the Solar Power Age," IEEE-CNSV: Consultants' Network of Scilion Valley; 30 pages.

Jul. 25, 1995-Jun. 30, 1998; Kern, G; "SunSine (TM)300: Manufacture of an AC Photovoltaic Module," Final Report, Phases I & II; National Renewable Energy Laboratory, Mar. 1999; NREL-SR-520-26085; 33 pages.

May 1, 2000; Kroposki, H. Thomas and Witt, B & C; "Progress in Photovoltaic Components and Systems," National Renewable Energy Laboratory; NREL-CP-520-27460; 7 pages.

Jan. 22-23, 1998 Oldenkamp, H. et al; "AC Modules: Past, Present and Future" Workshop Installing the Solar Solution; Hatfield, UK; 6 pages.

(56) References Cited

OTHER PUBLICATIONS

Linear Technology Specification Sheet, LTC3443—"High Current Micropower 600kHz Synchronous Buck-Boost DC/DC Converter"—2004.
Linear Technology Specification Sheet, LTC3780—"High Efficiency Synchronous, 4-Switch Buck-Boost Controller"—2005.
Apr. 22, 2004—MICREL—MIC2182 High Efficiency Synchronous Buck Controller.
Apr. 1972—Methods for Utilizing Maximum Power From a Solar Array—Decker, DK.
2000—Evaluating MPPT converter topologies using a MATLAB PV model—Walker, Geoffrey.
Jun. 30, 2008—Wang, Ucilia; Greentechmedia; "National Semi Casts Solarmagic"; www.greentechmedia.com; 3 pages; accessed Oct. 24, 2017.
Sep. 2004; Yuvarajan, S; Dchuan Yu; Shanguang, Xu; "A Novel Power Converter for PHotovoltaic Applications," Journal of Power Sources; vol. 135, No. 1-2, pp. 327-331.
Jun. 1998—Stern M., et al., "Development of a Low-Cost Integrated 20-kW-AC Solar Tracking Subarray for Grid-Connected PV Power System Applications—Final Technical Report"—National Renewable Energy Laboratory; 41 pages.
1997; Verhoeve, C.W.G., et al., "Recent Test Results of AC_Module inverters," Netherlands Energy Research Foundation ECN, 1997; 3 pages.
2004—Nobuyoshi, M. et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.
Feb. 23-27, 1992—Miwa, Brett et al., "High Efficiency Power Factor Correction Using Interleaving Techniques"—Applied Power Electronics Conference and Exposition, 1992. APEC '92. Conference Proceedings 1992., Seventh Annual.
Mar. 4-8, 2001—Andersen Gert, et al.,—Aalborg University, Institute of Energy Technology, Denmark—"Currect Programmed Control of a Single Phase Two-Switch Buck-Boost Power Factor Correction Circut"—Applied Power Electronics Conference and Exposition, 2001. APEC 2001. Sixteenth Annual IEEE.
Feb. 22-26, 2004—Andersen, Gert et al.,—"Utilizing the free running Current Programmed Control as a Power Factor Correction Technique for the two switch Buck-Boost converter"—Applied Power Electronic Conference and Exposition, 2004. APEC '04. Nineteenth Annual IEEE.
Mar. 3-7, 1996—Caricchi F et al.,—"Prototype of Innovative Wheel Direct Drive With Water-Cooled Exial-Flux Motor for Electric Vehicle Applications"—Applied Power Electronics Conference and Expositions, 1996. APEC '96. Conference Proceedings 1996., Eleventh Annual IEEE.
Feb. 15-19, 1998—Caricchi, F. et al.,—"Study of Bi-Directional Buck-Boost Converter Topologies for Application in Electrical Vehicle Motor Drives"—Applied Power Electronics Conference and Exposition, 1998, APEC '98. COnference Proeedings 1998., Thirteenth Annual IEEE.
Nov. 27-30, 1990—Ensling, JHR—"Maximum Power Point Tracking: A Cost Saving Necessity in Solar Energy Systems"—Industrial Electornics Society, 1990. IECON '90., 16th Annual Conference of IEEE.
Feb. 22-26, 2004—Gaboriault, Mark et al.,—"A High Efficiency, Non-Inverting, Buck-Boost DC-DC Converter"—Applied Power Electronics Conference and Exposition, 2004. APEC '04. Nineteenth Annual IEEE.
Feb. 15-19, 1998—Hua, et al.,—"Comparative Study of Peak Power Tracking Techniques for Solar Storage System"—Applied POwer Electronics Conference and Exposition, 1998. APEC'98. Conferenced Proceedings 1998., Thirteenth Annual IEEE.
Jun. 20-24. 1993—Sullivan, et al., "A High-Efficiency Maximum Power Point Tracker for Photovoltaic Arrays in a Solar-Powered Race Vehicle"—University of California, Berkeley, Department of Electrical Engineering and OCmputer Sciences—Power Electronics Specialists Conference, 1993. PESC '93 Record., 24th Annual IEEE.
May 19-24, 2002—Bower et at.,—"Certification of Photovoltaic Inverters: The Initial Step Toward PV System certification"—Photovoltaic Specialists Conferences, 2002. Conference Record of the Twenty-Ninth IEEE.
Jun. 17-21, 2001—Tse et al., "A Novel Maximum Power Point Tracking Technique for PV Panels"—Power Electronics Specialists Conferences, 2001. PESC. 2001 IEEE 32nd Annual.
May 12-18, 2008—Cuadras et al., "Smart Interfaces for Low Power Energy Harvesting Systems"—Instrumentation and Measurement Technology Conferences Proceedings, 2008. IMTC 2008. IEEE.
Dec. 5-9, 1994—Haan, et al., "Test Results of a 130 W AC Module; a modular solar as power station"—Photovoltaic Energy Conversion 1994. Conference Record of the Twenty Fourth. IEEE Phtovoltaic Specialists Conference—1994.
Sep. 1-3, 2008—Jung, et al., "Soft Switching Boost Converter for Photovoltaic Power Generation System"—Power Electronics and Motion Control Conference, 2008. EPE-PEMC 2008.
Jun. 3-5, 2008—Duan, et al., "A Novel High-Efficiency Inverter for Stand Alone and Grid-Connected Systems"—Industrial Electronics and Applications, 2008. ICIEA 2008.
Nov. 7, 2002—Ertl, et al., "A Novel Multicell DC-AC Converter for Applicaiton in Renewable Energy Systems"—IEEE Transactions on Industrial Electronics (vol. 49, Issue 5, Oct. 2002).
Oct. 8-12, 2000 Hashimoto, et al., "A Novel High Peforamance Utility Interactive Photovoltain Inverter System"—Industry Applications Conference, 2000. Conference Record of the 2000 IEEE.
Feb. 22-26, 2004—Ho, et al., "An Integrated Inverter with Maximum Poer Tracking for Grid-Connected PV Systems"—Applied Power Electronics Conference and Exposition, 2004. APEC '04. Nineteenth Annual IEEE.
Nov. 14, 1997, Hua et al., "Control of DC/DC Converters for Solar Energy System with Maximum Power Tracking"—Industrial Electronics, Control and Instrumentation, 1997. IECON 97. 23rd International Conference on Industrial Electronics, Control and Instrumentation vol. 4 of 4.
Sep. 1-3, 2008, Lee et al., "Soft Switching Mutli-Phase Boost Converter for Photovoltaic System"—Power Electronics and Motnion Control Conference, 2008. EPE-PEMC 2008.
Jul. 5, 2005, Yao et al., "Tapped-Inductor Buck Converter for High-Step-Down DC-DC Conversion" IEEE Transactions on Power Electronics (vol. 20, Issue 4, Jul. 2005).
Sep. 21-23, 1998, Kretschmar, et al., "An AC Converter with a Small DC Link Capacitor for a 15KW Permanent Magnet Synchronous Integral Motor"—Power Electronics and Variable Speed Drives, 1998. Sevent International Converterest (Conf. Publ. No. 456).
May 25, 2000—Hong Lim, et al., "Simple Maximum Power Point Tracker for Photovoltaic Arrays"—Electronics Letters (vol. 36, Issue 11, May 25, 2000).
Aug. 14-16, 2004, Nishida et al., "A Novel Type of Utility-Interactive Inverter for Phtovoltaic System"—Power Electronics and Mtion Control Conference, 2004. IPEMC 2004.
May 30-Jun. 3, 2011, Jung, et al., "DC-Link Ripple Reduction of Series-connected Module Integrated Converter for Photovoltaic Systems."—Power Electronics and ECCE Asia (ICPE & ECCE).
Jan. 8, 2007, Li et al., "An Analysis of ZVS Two-Inductor Boost Converter under Variable Frequency Operation"—IEEE Transactions on Power Electronics (vol. 22, Issue 1, Jan. 2007).
Sep. 17, 2007, Rodriguez et al., "Analytic Solution to the Photovoltaic Maximum Power Point Problem"—IEEE Transactions on Circuits and Systems I: Regular Papers (vol. 54, Issue 9, Sep. 2007).
Jun. 27, 1997, Reimann et al., "A Novel Control Principle of Bi-Directional DC-DC Power Conversion"—Powre Electronics Specialists Conference 1997. PESC '97 Record.
Sep. 15-22, 2000, Russell et al., "The Massachusetts Electric Solar Project: A Pilot Project to Commercialize Residential PV Systems"—Photovoltaic Specialists Conference, 2000, Conference Record of the Twenty-Eighth IEEE Photovoltaic Specialists Conference—2000.

(56) References Cited

OTHER PUBLICATIONS

May 2001, Shimizu et al., "Generation Control Circuit for Photvoltaic Modules"—IEEE Transactions of Power Electronics (vol. 16, Issue 3, May 2001).
Feb. 6-10, 2000, Siri, Kasemsan "Study of System Instability in Current-Mode Converter Power Systems Operating in Solar Array Voltage Regulation Mode"—Applied Power Electronics Conference and Exposition, 2000. APEC 2000. Fiftheenth Annual IEEE.
Aug. 13-16, 1990—Rajan, Anita "A Maximum Power Point Tracker Optimized for Solar Powered Cars"—Future Transportation Technology Conference and Expostion.
Storfer, Lior, "Enhancing Cable Modem TCP Performance," Texas Instruments Inc. white paper, Jul. 2003.
Philips Semiconductors, Data Sheet PSMN005-55B; PSMN005-55P N-channel logic trenchMOS transistor, Oct. 1999, Product specification, pp. 1-11.
International Preliminary Report on Patentability Issued in corresponding international application No. PCT/US04/16668, filed May 27, 2004.
International Application No. PCT/US13/27965, International Preliminary Examination Report, dated Sep. 2, 2014.
International Patent Application PCT/US13/027965, International Search Report and Written Opinion, dated Jun. 2, 2013.
International Application No. PCT/US12/44045, International Preliminary Examination Report, dated Jan. 28, 2014.
International Patent Application No. PCT/US2012/044045, International Search Report and Written Opinion, dated Jan. 2, 2013.
International Patent Application No. PCT/US2009/047734, International Search Report and Written Opinion, dated May 4, 2010.
Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.
International Patent Application No. PCT/US2010/029929, International Search Report and Written Opinion, dated Oct. 27, 2010.
Lowe, Electronics Basis: What is a Latch Circuit, http://www.dummies.com/how-to/content/electronics-basics-what-is-a-latch-circuit.html, from Electronics All-in-One for Dummies, Feb. 2012, downloaded Jul. 13, 2014.
International Patent Application No. PCT/US2011/020591, International Search Report and Written Opinion, dated Aug. 8, 2011.
International Patent Application No. PCT/US2011/033544, International Search Report and Written Opinion, dated Nov. 24, 2011.
J. Keller and B. Kroposki, titled, "Understanding Fault Characteristics of Inverter-Based Distributed Energy Resources", in a Technical Report NREL/TP-550-46698, published Jan. 2010, pp. 1 through 48.
International Patent Application No. PCT/US2008/081827, International Search Report and Written Opinion, dated Jun. 24, 2009.
International Patent Application No. PCT/US2010/046274 International Search Report and Written Opinion, dated Apr. 22, 2011.
International Patent Application No. PCT/US2011/033658, International Search Report and Written Opinion, dated Jan. 13, 2012.
International Patent Application No. PCT/US2011/029392, International Search Report and Written Opinion, dated Oct. 24, 2011.
European Patent Application No. 09829487.9, Extended Search Report, dated Apr. 21, 2011.
International Patent Application No. PCT/US2009/062536, International Search Report and Written Opinion, dated Jun. 17, 2010.
International Patent Application No. PCT/US2010/022915, International Search Report and Written Opinion, dated Aug. 23, 2010.
International Patent Application No. PCT/US2010/046272, International Search Report and Written Opinion, dated Mar. 31, 2011.
Exell et al., "The Design and Development of a Solar Powered Refridgerator", [retrieved on Feb. 13, 2013], Retrieved from the Internet <URL: http://www.appropedia.org/The_Design_and_Development_of_a_Solar_Powered_Refrigerator>, pp. 1-64.
"Development of Water-Lithium Bromide Low-Temperature Absorption Refridgerating Machine", 2002 Energy & Environment on Database on Noteworthy contributions for Science and Technology (Japan), Research Data (No. 1748) [online], [retrieved on Aug. 29, 2012]. Retrieved from the Internet: <URL: http://dbnstl.nii.ac.jp/english/detail/1748>, pp. 1-4.
Dictionary.corn, "air conditioning" [online], [retrieved on Aug. 28, 2012]. Retrieved from the Internet: <URL: http://dictionary.reference.com/browse/air+conditioning?s=t>, pp. 1-3.
International Patent Application No. PCT/US2010/029936, International Search Report and Written Opinion, dated Nov. 12, 2010.
International Patent Application No. PCT/US08/75127, International Search Report and Written Opinion, dated Apr. 28, 2009.
International Patent Application No. PCT/US09/35890, International Search Report and Written Opinion, dated Oct. 1, 2009.
European Patent Application No. 08845104.2, Extended Search Report, dated Jul. 31, 2014.
European Patent Application No. 11772811.3, Extended Search Report, dated Dec. 15, 2014.
International Patent Application No. PCT/US2008/082935, International Search Report and Written Opinion, dated Jun. 25, 2009.
Bhatnagar et al., Silicon Carbide High Voltage (400 V) Shottky Barrier Diodes, IEEE Electron Device Letters, vol. 13(10) p. 501-503 Oct. 10, 1992.
Rodriguez, C., and G. A. J. Amaratunga. "Dynamic stability of grid-connected photovoltaic systems." Power Engineering Society General Meeting, 2004. IEEE, pp. 2194-2200.
Kikuchi, Naoto, et al. "Single phase amplitude modulation inverter for utility interaction photovoltaic system." Industrial Electronics Society, 1999. IECON'99 Proceedings. The 25th Annual Conference of the IEEE. vol. 1. IEEE, 1999.
Nonaka, Sakutaro, et al. "Interconnection system with single phase IGBT PWM CSI between photovoltaic arrays and the utility line." Industry Applications Society Annual Meeting, 1990., Conference Record of the 1990 IEEE.
Calais, Martina, et al. "Inverters for single-phase grid connected photovoltaic systems—an overview." Power Electronics Specialists Conference, 2002. pesc 02.2002 IEEE 33rd Annual. vol. 4. IEEE, 2002.
Marra, Enes Goncalves, and José Antenor Pomilio. "Self-excited induction generator controlled by a VS-PWM bidirectional converter for rural applications." Industry Applications, IEEE Transactions on 35.4 (1999): 877-883.
Xiaofeng Sun, Weiyang Wu, Xin Li, Qinglin Zhao: A Research on Photovoltaic Energy Controlling System with Maximum Power Point Tracking:; Proceedings of the Power Conversion Conference—Osaka 2002 (Cat. No. 02TH8579) IEEE—Piscataway, NJ, USA, ISBN 0-7803-7156-9, vol. 2, p. 822-826, XP010590259: the whole document.
International Search Report for corresponding PCT/GB2005/050198 completed Jun. 28, 2006 by C. Wirner of the EPO.
Brunello, Gustavo, et al., "Shunt Capacitor Bank Fundamentals and Protection," 2003 Conference for Protective Relay Engineers, Apr. 8-10, 2003, pp. 1-17, Texas A&M University, College Station, TX, USA.
Cordonnier, Charles-Edouard, et al., "Application Considerations for Sensefet Power Devices," PCI Proceedings, May 11, 1987, pp. 47-65.
Kotsopoulos, Andrew, et al., "Predictive DC Voltage Control of Single-Phase PV Inverters with Small DC Link Capacitance," IEEE International Symposium, Month Unknown, 2003, pp. 793-797.
Meinhardt, Mike, et al., "Multi-String-Converter with Reduced Specific Costs and Enhanced Functionality," Solar Energy, May 21, 2001, pp. 217-227, vol. 69, Elsevier Science Ltd.
Kimball, et al.: "Analysis and Design of Switched Capacitor Converters"; Grainger Center for Electric Machinery and Electromechanics, University of Illinois at Urbana-Champaign, 1406 W. Green St, Urbana, IL 61801 USA, © 2005 IEEE; pp. 1473-1477.
Martins, et al.: "Interconnection of a Photovoltaic Panels Array to a Single-Phase Utility Line From a Static Conversion System"; Power Electronics Specialists Conference, 2000. PESC 00. 2000 IEEE 31st Annual; Jun. 18, 2000-Jun. 23, 2000; ISSN: 0275-9306; pp. 1207-1211, vol. 3.
International Search Report for corresponding PCT/GB2005/050197, completed Dec. 20, 2005 by K-R Zettler of the EPO.

(56) References Cited

OTHER PUBLICATIONS

Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.
Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist Conference, Month Unknown, 2002, pp. 1483-1488, vol. 3, IEEE.
Written Opinion of PCT/GB2005/050197, dated Feb. 14, 2006, Enecsys Limited.
Yatsuki, Satoshi, et al., "A Novel AC Photovoltaic Module System based on the Impedance-Admittance Conversion Theory," IEEE 32nd Annual Power Electronics Specialists Conference, Month Unknown, 2001, pp. 2191-2196, vol. 4, IEEE.
International Search Report for corresponding PCT/GB2004/001965, completed Aug. 16, 2004 by A. Roider.
Naik et al., A Novel Grid Interface for Photovoltaic, Wind-Electric, and Fuel-Cell Systems With a Controllable Power Factor or Operation, IEEE, 1995, pp. 995-998.
Petkanchin, Processes following changes of phase angle between current and voltage in electric circuits, Aug. 1999, Power Engineering Review, IEEE vol. 19, Issue 8, pp. 59-60.
Mumtaz, Asim, et al., "Grid Connected PV Inverter Using a Commercially Available Power IC," PV in Europe Conference, Oct. 2002, 3 pages, Rome, Italy.
Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.
European Search Report—EP App. 14159457.2—dated Jun. 12, 2015.
European Search Report and Written Opinion—EP Appl. 12150819.6—dated Jul. 6, 2015.
Alonso, O. et al. "Cascaded H-Bridge Multilevel Converter for Grid Connected Photovoltaic Generators With Independent Maximum Power Point Tracking of Each Solar Array." IEEE 34th Annual Power Electronics Specialists Conference. vol. 2, Jun. 15, 2003.
Alonso, et al., "Cascaded H-Bridge Multilevel Converter for Grid Connected Photovoltaic Generators With Independent Maximum Power Point Tracking of Each Solor Array", 2003 IEEE 34th, Annual Power Electronics Specialists conference, Acapulco, Mexico, Jun. 15-19, 2003, pp. 731-735, vol. 2.
Chinese Office Action—CN Appl. 201280006369.2—dated Aug. 4, 2015.
Chinese Office Action—CN Appl. 201210253614.1—dated Aug. 18, 2015.
Extended European Search Report, EP Application 04753488.8, dated Apr. 29, 2015.
International Search Report from PCT/US04/16668, form PCT/ISA/220, filed May 27, 2004.
Office Action U.S. Appl. No. 13/785,857, dated Jun. 6, 2013.
Partial Extended European Search Report, EP Application 04753488.8, dated Feb. 2, 2015.
The International Search Report (Form PCT /ISA/220) Issued in corresponding international application No. PCT/US04/16668, filed May 27, 2004.
International Search Report—PCT/US2004/016668, form PCT/ISA/220—filed May 27, 2004—dated Jan. 19, 2005.
Written Opinion of the International Searching Authority—PCT/US2004/016668, form PCT/ISA/220—filing date May 27, 2004—dated Jan. 19, 2005.
Extended European Search Report—EP Appl. 04753488.8—dated Apr. 29, 2015.
Supplementary Partial European Search Report—EP Appl. 04753488.8—dated Feb. 2, 2015.
U.S. Office Action—U.S. Appl. No. 13/785,857—dated Jun. 6, 2013.
European Office Action—EP Appl. 09725443.7—dated Aug. 18, 2015.
Definition of Isomorphism by Merriam-Webster, <http://www.merriaum-webster.com/dictionary/isomorphism, dated Oct. 20, 2015.
Definition of Isomorphic by Merriam-Webster, <http://www.merriam-webster.com/dictionary/isomorphic, dated Oct. 20, 2015.
Chinese Office Action—CN Appl. 201110349734.7—dated Oct. 13, 2015.
Chinese Office Action—CN Appl. 201210007491.3—dated Nov. 23, 2015.
European Office Action—EP Appl. 12176089.6—dated Dec. 16, 2015.
Chinese Office Action—CN Appl. 201310035223.7—dated Dec. 29, 2015.
Chinese Office Action—CN Application 201210334311.2—dated Jan. 20, 2016.
European Search Report—EP Appl. 13800859.4—dated Feb. 15, 2016.
Chinese Office Action—CN App. 201310035221.8—dated Mar. 1, 2016.
PCT/2008/058473 International Preliminary Report, 6 pages, dated Nov. 2, 2009.
International Search Report and Written Opinion, WO 2010080672, dated Aug. 19, 2010.
PCT/US2010/045352 International Search Report and Written Opinion; 12 pages; dated Oct. 26, 2010.
International Search Report and Written Opinion dated Feb. 6, 2009,. In counteprart PCT/US2008/008451, 13 pages.
European Search Report: dated Jan. 10, 2013 in corresponding EP application No. 09838022.3, 7 pages.
D. Ton and W. Bower; Summary Report of the DOE High-Tech Inverter Workshop; Jan. 2005.
First Action Interview Pre-Interview Communication from U.S. Appl. No. 13/174,495 dated Jun. 18, 2014, 7 pgs.
Johnson et al., "Arc-fault detector algorithm evaluation method utilizing prerecorded arcing signatures", Photovoltaic Specialists Conference (PVSC), Jun. 2012.
Philippe Welter, et al. "Electricity at 32 kHz," Photon International, The Photovoltaic Magazine, Http://www.photon-magazine.com/archiv/articles.aspx?criteria=4&HeftNr=0807&Title=Elec . . . printed May 27, 2011).
PCT/US2009/069582 Int. Search Report—dated Aug. 19, 2010.
Chinese Office Action—CN Appl. 201210007491.3—dated Apr. 25, 2016.
CN Office Action—CN Appl. 201310004123.8—dated May 5, 2016.
Law et al, "Design and Analysis of Switched-Capacitor-Based Step-Up Resonant Converters," IEEE Transactions on Circuits and Systems, vol. 52, No. 5, published May 2005.
CN Office Action—CN Appl. 201310066888.4—dated May 30, 2016.
European Search Report—EP Appl. 13152966.1—dated Jul. 21, 2016.
European Search Report—EP Appl. 12183811.4—dated Aug. 4, 2016.
European Notice of Opposition—EP Patent 2374190—dated Jul. 19, 2016.
"Es werde Dunkelheit. Freischaltung von Solarmodulen im Brandfall"—"Let there be Darkness: Quality control of Solar Modules in Case of Fire"; Photon, May 2005, 75-77, ISSN 1430-5348, English translation provided.
Chinese Office Action—CN Appl. 201380029450.7—dated Jul. 28, 2016.
Dec. 14, 2017—EP Search Report App No. 17188362.2.
Dec. 15, 2017—EP Search Report App No. 17188365.5.
Jun. 29, 2018—EP Search Report—EP App No. 18175980.4.
Aug. 9, 2010, Hong, Wei, et al., "Charge Equalization of Battery POwer Modules in Series" The 2010 International Power Electronics Conference, IEEE, p. 1568-1572.
Chinese Office Action—CN Appl. 201310035221.8—dated Aug. 11, 2016.

(56) References Cited

OTHER PUBLICATIONS

Zhou, Wilson and Theo Phillips—"Industry's First 4-Switch Buck-Boost Controller Achieves Highest Efficiency Using a Single Inducutor—Design Note 369"—Linear Technology Corporation—www.linear.com—2005.

"Micropower Synchronous Buck-Boost DC/DC Converter"—Linear Technology Corporation—www.linear.com/LTC3440—2001.

Caricchi, F et al—20 kW Water-Cooled Prototype of a Buck-Boost Bidirectional DC-DC Converter Topology for Electrical Vehicle Motor Drives—University of Rome—IEEE 1995—pp. 887-892.

Roy, Arunanshu et al—"Battery Charger using Bicycle"—EE318 Electronic Design Lab Project Report, EE Dept, IIT Bombay, Apr. 2006.

Viswanathan, K. et al—Dual-Mode Control of Cascade Buck-Boost PFC Converter—35th Annual IEEE Power Electronics Specialists Conference—Aachen, Germany, 2004.

Zhang, Pei et al.—"Hardware Design Experiences in ZebraNet"—Department of Electrical Engineering, Princeton University—SenSys '04, Nov. 3-5, 2004.

"High Efficiency, Synchronous, 4-Switch Buck-Boost Controller"—Linear Technology Corporation—www.linear.com/LTC3780—2005.

Chomsuwan, Komkrit et al. "Photovoltaic Grid-Connected Inverter Using Two-Switch Buck-Boost Converter"—Department of Electrical Engineering, King Mongkut's Institute of Technology Ladkrabang, Thailand, National Science and Technology Development Agency, Thailand—IEEE—2002.

Midya, Pallab et al.—"Buck or Boost Tracking Power Converter"—IEEE Power Electronics Letters, vol. 2, No. 4—Dec. 2004.

Chinese Office Action—CN Appl. 201510111948.9—dated Sep. 14, 2016.

Chinese Office Action—CN Appl. 201310066888.4—dated Nov. 2, 2016.

"Power-Switching Converters—the Principle, Simulation and Design of the Switching Power (the Second Edition)", Ang, Oliva, et al., translated by Xu Dehong, et al., China Machine Press, Aug. 2010, earlier publication 2005.

European Notice of Opposition—EP Patent 2092625—dated Nov. 29, 2016.

Vishay Siliconix "Si 7884DP—n-Channel 40-V (D-S) MOSFET" (2003).

Chinese Office Action—CN 201510423458.2—dated Jan. 3, 2017 (english translation provided).

Chinese Office Action—CN 201410098154.9—dated Mar. 3, 2017 (enligsh translation provided).

European Search Report—EP Appl. 13150911.9—dated Apr. 7, 2017.

Howard et al, "Relaxation on a Mesh: a Formalism for Generalized Localization." Proceedings of the IEEE/RSJ International Conference on Intelligent Robots and Systems (IROS 2001). Wailea, Hawaii, Oct. 2001.

Chinese Office Action and Search Report—CN 201510578586.4—dated Apr. 19, 2017.

Jul. 12, 2019—European Search Report—EP 19170538.3.

Aug. 4, 2017—European Search Report—EP 17165027.

Jul. 10, 1995—"Battery I.D. chip from Dallas Semiconductor monitors and reports battery pack temperature"—Business Wire.

Nov. 3, 1999—Takahashi et al., "Development of a Long-Life Three-Phase Flywheel UPS Using an Electrolytic Capacitorless Converter/Inverter"—Electrical Engineering in Japan, vol. 127.

Jan. 2001—Walker, Geoffrey "Evaluating MPPT Converter Topologies Using a Matlab PV Model"—"Journal of Electrical and Electronics Engineering, Australia".

Feb. 13, 2007—Roman et al., "Experimental Results of Controlled PV Module for Building Integrated PV Systems"—Solar Energy 82 (2008) 471-480.

2006—Bower et al., "Innovative PV Micro-Inverter Topology Eliminates Electrolytic Capacitors for Longer Lifetime"—IEEE 1-4244-0016-3/06/ pp. 2038-2041.

Aug. 23-27, 1993—Case et al., "A Minimum Component Photovoltaic Array Maximum Power Point Tracker"—European Space Power Conference vol. 1. Power Systems, Power Electronics.

Jun. 4, 1997—Maranda et al., "Optimization of the Master-Slave Inverter System for Grid-Connected Photovoltaic Plants"—Energy Convers. Mgmt. vol. 39, No. 12 pp. 1239-1246.

2005—Kang et al., "Photovoltaic Power Interface Circuit Incorporated with a Buck-Boost Converter and a Full-Bridge Inverter"—Applied Energy 82, pp. 266-283.

Nov. 21, 1997—Feuermann et al., "Reversable Low Soalr Heat Gain Windows for Energy Savings"—Solar Energy vol. 62, No. 3 pp. 169-175.

May 16, 2005—Enrique et al., "Theoretical assessment of the maximum power point tracking efficiency of photovoltaic facilities with different converter topologies"—Solar Energy 81 (2007) p. 31-38.

Dehbonei, Hooman "Power Conditioning for Distrbuted Renewable Energy Generation"—Curtin University of Technology, School of Electrical and Computer Engineering, 2003 568 pages Dissertation: Thesis. Abstract, 1 page—retrieved on Nov. 13, 2017 on https://books.google.com/books/about/Power_Conditioning_for_Distributed_Renew.html?id=3wVXuAAACAAJ.

Korean Patent Application No. 102005-7008700, filed May 13, 2015. Applicant: Exar Corporation.

Jan. 23, 2018—EP Search Report, EP App No. 17187230.2.

QT Technical Application Papers, "ABB Circuit-Breakers for Direct current Applications", ABB SACE S.p.A., An ABB Group Company, L.V. Breakers, Via Baioni, 35, 24123 Bergamo-Italy, Tel.: +39 035.395.111—Telefax: +39 035.395306-433, Sep. 2007.

Woyte et al. "Mains Monitoring and Protection in a European Context", 17th European Photovoltaic Solar Energy Conference and Exhibition, Munich, Germany, Oct. 22-26, 2001, Achim, Woyte, et al., pp. 1-4.

"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.

Fairchild Semiconductor, Application Note 9016, IGBT Basics 1, by K.S. Oh Feb. 1, 2001.

"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.

Walker, "A DC Circuit Breaker for an Electric Vehicle Battery Pack", Australasian Universities Power Engineering Conference and IEAust Electric Energy Conference, Sep. 26-29, 1999.

Combined Search and Examination Report for GB1018872.0 dated Apr. 15, 2011, 2 pages.

International Search Report and Opinion of International Patent Application PCT/2009/051221, dated Oct. 19, 2009.

International Search Report and Opinion of International Patent Application PCT/2009/051222, dated Oct. 7, 2009.

Communication in EP07874025.5 dated Aug. 17, 2011.

IPRP for PCT/IB2008/055095 dated Jun. 8, 2010, with Written Opinion.

ISR for PCT/IB2008/055095 dated Apr. 30, 2009.

ISR for PCT/IL07/01064 dated Mar. 25, 2008.

IPRP for PCT/IB2007/004584 dated Jun. 10, 2009, with Written Opinion.

IPRP for PCT/IB2007/004591 dated Jul. 13, 2010, with Written Opinion.

IPRP for PCT/IB2007/004643 dated Jun. 10, 2009, with Written Opinion.

Written Opinion for PCT/IB2008/055092 submitted with IPRP dated Jun. 8, 2010.

IPRP for PCT/US2008/085754 dated Jun. 8, 2010, with Written Opinion dated Jan. 21, 2009.

IPRP for PCT/US2008/085755 dated Jun. 8, 2010, with Written Opinion dated Jan. 20, 2009.

IPRP for PCT/IB2009/051221 dated Sep. 28, 2010, with Written Opinion.

IPRP for PCT/IB2009/051222 dated Sep. 28, 2010, with Written Opinion.

(56) References Cited

OTHER PUBLICATIONS

IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011.
UK Intellectual Property Office, Patents Act 1977: Patents Rules Notification of Grant: Patent Serial No. GB2480015, dated Nov. 29, 2011.
Walker, et al. "PV String Per-Module Maximum Power Point Enabling Converters", School of Information Technology and Electrical Engineering the University of Queensland, Sep. 28, 2003.
Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.
Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.
IPRP for PCT/IL2007/001064 dated Mar. 17, 2009, with Written Opinion dated Mar. 25, 2008.
IPRP for PCT/IB2007/004586 dated Jun. 10, 2009, with Written Opinion.
Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.
IPRP PCT/IB2007/004610—dated Jun. 10, 2009.
Extended European Search Report—EP12176089.6—dated Nov. 8, 2012.
Gwon-Jong Yu et al: "Maximum power point tracking with temperature compensation of photovoltaic for air conditioning system with fuzzy controller", May 13, 1996; May 13, 1996-May 17, 1996, May 13, 1996 ( May 13, 1996), pp. 1429-1432, XP010208423.
Extended European Search Report—EP12177067.1—dated Dec. 7, 2012.
GB Combined Search and Examination Report—GB1200423.0—dated Apr. 30, 2012.
GB Combined Search and Examination Report—GB1201499.9—dated May 28, 2012.
GB Combined Search and Examination Report—GB1201506.1—dated May 22, 2012.

"Study of Energy Storage Capacitor Reduction for Single Phase PWM Rectifier", Ruxi Wang et al., Virginia Polytechnic Institute and State University, Feb. 2009.
"Multilevel Inverters: A Survey of Topologies, Controls, and Applications", José Rodriguez et al., IEEE Transactions on Industrial Electronics, vol. 49, No. 4, Aug. 2002.
Extended European Search Report—EP 08878650.4—dated Mar. 28, 2013.
Satcon Solstice—Satcon Solstice 100 kW System Solution Sheet—2010.
John Xue, "PV Module Series String Balancing Converters", University of Queensland—School of Information Technology & Electrical Engineering, Nov. 6, 2002.
Robert W. Erickson, "Future of Power Electronics for Photovoltaics", IEEE Applied Power Electronics Conference, Feb. 2009.
Apr. 16, 2018—EP Examination Report 12707899.6.
Sep. 28, 2017—European Office Action—EP 08857835.6.
Nov. 2, 2017—EP Search Report App No. 13157876.7.
Nov. 11, 2017—EP Search Report—App No. 17171489.2.
Dec. 24, 2019—CN Office Action—CN Application 201610946835.5.
Jan. 29, 2019—European Search Report for EP App No. 18199117.5.
Aug. 6, 2019—Notice of Opposition of European Patent 2232663—Fronius International GmbH.
Sep. 5, 2019—Notice of Opposition of European Patent 2549635—Huawei Technologies Co.
Sep. 5, 2019—Notice of Opposition of European Patent 2549635—Fronius International GmbH.
Solide Arbeit, Heinz Neuenstein, Dec. 2007.
Spitzenwirkungsgrad mit drei Spitzen, Heinz Neuenstien and Andreas Schlumberger, Jan. 2007.
Technical Information, Temperature Derating for Sunny Boy, Sunny Mini Central, Sunny Tripower, Aug. 9, 2019.
Prinout from Energy Matters online Forum, Jul. 2011.
Wayback Machine Query for Energy Matters Online Forum Jul. 2011.
GB Combined Search and Examination Report—GB1203763.6—dated Jun. 25, 2012.
Mohammad Reza Amini et al., "Quasi Resonant DC Link Inverter with a Simple Auxiliary Circuit", Journal of Power Electronics, vol. 11, No. 1, Jan. 2011.
Khairy Fathy et al., "A Novel Quasi-Resonant Snubber-Assisted ZCS-PWM DC-DC Converter with High Frequency Link", Journal of Power Electronics, vol. 7, No. 2, Apr. 2007.
Cheng K.W.E., "New Generation of Switched Capacitor Converters", Department of Electrical Engineering, The Hong Kong Polytechnic University, Hung Hom, Hong Kong, Power Electronics Conference, 1998, PESC 98.
Per Karlsson, "Quasi Resonant DC Link Converters—Analysis and Design for a Battery Charger Application", Universitetstryckeriet, Lund University, 1999, ISBN 91-88934-14-4.
Hsiao Sung-Hsin et al., "ZCS Switched-Capacitor Bidirectional Converters with Secondary Output Power Amplifier for Biomedical Applications", Power Electronics Conference (IPEC) Jun. 21, 2010.
Yuang-Shung Lee et al.,"A Novel QR ZCS Switched-Capacitor Bidirectional Converter", IEEE, 2007.
Antti Tolvanen et al., "Seminar on Solar Simulation Standards and Measurement Principles", May 9, 2006 Hawaii.
J.A. Eikelboom and M.J. Jansen, "Characterisation of PV Modules of New Generations—Results of tests and simulations", Jun. 2000.
Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.
C. Liu et al., "Advanced Algorithm for MPPT Control of Photovoltaic Systems", Canadian Solar Buildings Conference, Montreal, Aug. 20-24, 2004.
Chihchiang Hua and Chihming Shen, "Study of Maximum Power Tracking Techniques and Control of DC/DC converters for Photovoltaic Power System", IEEE 1998.
Tore Skjellnes et al., "Load sharing for parallel inverters without communication", Nordic Workshop in Power and Industrial Electronics, Aug. 12-14, 2002.

(56) References Cited

OTHER PUBLICATIONS

Giorgio Spiazzi at el., "A New Family of Zero-Current-Switching Variable Frequency dc-dc Converters", IEEE 2000.
Nayar, C.V., M. Ashari and W.W.L Keerthiphala, "A Grid Interactive Photovoltaic Uninterruptible Power Supply System Using Battery Storage and a Back up Diesel Generator", IEEE Transactions on Energy Conversion, vol. 15, No. 3, Sep. 2000, pp. 348?353.
Ph. Strauss et al., "AC coupled PV Hybrid systems and Micro Grids-state of the art and future trends", 3rd World Conference on Photovoltaic Energy Conversion, Osaka, Japan May 11-18, 2003.
Nayar, C.V., abstract, Power Engineering Society Summer Meeting, 2000. IEEE, 2000, pp. 1280-1282 vol. 2.
D. C. Martins et al., "Analysis of Utility Interactive Photovoltaic Generation System using a Single Power Static Inverter", Asian J. Energy Environ., vol. 5, Issue 2, (2004), pp. 115-137.
Rafael C. Beltrame et al., "Decentralized Multi String PV System With Integrated ZVT Cell", Congresso Brasileiro de Automática / 12 a Sep. 16, 2010, Bonito-MS.
Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, Jul. 2008.
Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.
Office Action—JP 2011-539491—dated Mar. 26, 2013.
Supplementary European Search Report—EP08857456—dated Dec. 6, 2013.
Extended European Search Report—EP14151651.8—dated Feb. 25, 2014.
Iyomori H et al: "Three-phase bridge power block module type auxiliary resonant AC link snubber-assisted soft switching inverter for distributed AC power supply", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.
Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http:ijscholar.lib.vt.edu/theses/available/etd-012299-165108/unrestricted/THESIS. PDF, [retrieved on Mar. 5, 2013].
Yoshida M et al: "Actual efficiency and electromagnetic noises evaluations of a single inductor resonant AC link snubber-assisted three-phase soft-switching inverter", INTELEC 2003. 25th. International Telecommunications Energy Conference Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.
Third party observation—EP07874025.5—Mailing date: Aug. 6, 2011.
Extended European Search Report—EP 13152967.9—dated Aug. 28, 2014.
Extended European Search Report—EP 14159696—dated Jun. 20, 2014.
Gow Ja A et al: "A Modular DC-DC Converter and Maximum Power Tracking Controller for Medium to Large Scale Photovoltaic Generating Plant" 8th European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.
Chihchiang Hua et al: "Comparative Study of Peak Power Tracking Techniques for Solar Storage System" Applied Power Electronics Conference and Exposition, 1998. APEC '98. Conference Proceedings 1998, Thirteenth Annual Anaheim, CA USA Feb. 15-19, 1998, New York, NY, USA, IEEE, US, Feb. 15, 1998, pp. 679-685, XP010263666.
Matsuo H et al: "Novel Solar Cell Power Supply System Using the Multiple-input DC-DC Converter" 20th International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.
Chihchiang Hua et al: "DSP-based controller application in battery storage of photovoltaic system" Industrial Electronics, Control, and Instrumentation, 1996, Proceedings of the 1996 IEEE IECON 22nd International Conference on Taipei, Taiwan Aug. 5-10, 1996, New York, NY, USA, IEEE, US, Aug. 5, 1996, pp. 1705-1710, XP010203239.
Hua C et al: "Implementation of a DSP-Controlled Photovoltaic System with Peak Power Tracking" IEEE Transactions on industrial Electronics, IEEE, Inc. New York, US, vol. 45, No. 1, Feb. 1, 1998, pp. 99-107, XP000735209.
I. Weiss et al.: "A new PV system technology—the development of a magnetic power transmission from the PV module to the power bus" 16th European Photovoltaic Solar Energy Conference, vol. III, May 1-5, 2000, pp. 2096-2099, XP002193468 Glasgow,UK cited in the application.
Basso, Tim, "IEEE Standard for Interconnecting Distributed Resources With the Electric Power System," IEEE PES Meeting, Jun. 9, 2004.
Boostbuck.com, "The Four Boostbuck Topologies," located at http://www.boostbuck.com/TheFourTopologies.html, 2003.
Gautam, Nalin K. et al., "An Efficient Algorithm to Simulate the Electrical Performance of Solar Photovoltaic Arrays," Energy, vol. 27, No. 4, pp. 347-361, 2002.
Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.
Wiles, John, "Photovoltaic Power Systems and the National Electrical Code: Suggested Practices," Sandia National Laboratories, document No. SAND2001-0674, Mar. 2001.
Hewes, J. "Relays," located at http://web.archive.org/web/20030816010159/www.kpsec.freeuk.com/components/relay.htm, Aug. 16, 2003.
Definition of "remove" from Webster's Third New International Dictionary, Unabridged, 1993.
Definition of "removable" from Webster's Third New International Dictionary, Unabridged, 1993.
Advanced Energy Group, "The Basics of Solar Power Systems," located at http://web.archive.org/web/20010331044156/http://www.solar-power.com/solar-power-basics.html, Mar. 31, 2001.
International Patent Application No. PCT/AU2005/001017, International Search Report and Written Opinion, dated Aug. 18, 2005.
Baek, Ju-Won et al., "High Boost Converter using Voltage Multiplier," 2005 IEEE Conference, IECON 05, pp. 567-572, Nov. 2005.
Wikimedia Foundation, Inc., "Electric Power Transmission," located at http://web.archive.org/web/20041210095723/en.wikipedia.org/wiki/Electric-power-transmission, Nov. 17, 2004.
Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.
Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.
Jun. 6, 2018—EP Search Report EP App No. 18151594.1.
Nov. 27, 2019—European Search Report—3567562.
Baocheng, DC to AC Inverter with Improved One Cycle Control, 2003.
Brekken, Utility-Connected Power Converter for Maximizing Power Transfer From a Photovoltaic Source While Drawing Ripple-Free Current, 2002.
Cramer, Modulorientierter Stromrichter Geht in Serienfertigung , SPVSE, 1994.
Cramer, Modulorientierter Stromrichter, Juelich, Dec. 31, 1995.
Cramer, String-Wechselrichter Machen Solarstrom Billiger, Elektronik, Sep. 1996.
Dehbonei, A Combined Voltage Controlled and Current Controlled "Dual Converter" for a Weak Grid Connected Photovoltaic System with Battery Energy Storage, 2002.

(56) References Cited

OTHER PUBLICATIONS

Engler, Begleitende Untersuchungen zur Entwicklung eines Multi-String-Wechselrichters, SPVSE, Mar. 2002.
Seipel, Untersuchungen zur Entwicklung modulorientierter Stromrichter Modulorientierter Stromrichter für netzgekoppelte Photovoltaik-Anlagen, SPVSE, 1995.
Hoor, DSP-Based Stable Control Loops Design for a Single Stage Inverter, 2006.
Isoda, Battery Charging Characteristics in Small Scaled Photovoltaic System Using Resonant DC-DC Converter With Electric Isolation, 1990.
Jones, Communication Over Aircraft Power lines, Dec. 2006/ Jan. 2007.
Kalaivani, A Novel Control Strategy for the Boost DC-AC Inverter, 2006.
Lee, Powering the Dream, IET Computing & Control Engineering, Dec. 2006/ Jan. 2007.
Lee, A Novel Topology for Photovoltaic Series Connected DC/DC Converter with High Efficiency Under Wide Load Range, Jun. 2007.
Lin, LLC DC/DC Resonant Converter with PLL Control Scheme, 2007.
Niebauer, Solarenergie Optimal Nutzen, Stromversorgung, Elektronik, 1996.
Rodrigues, Experimental Study of Switched Modular Series Connected DC-DC Converters, 2001.
Sanchis, Buck-Boost DC-AC Inverter: Proposal for a New Control Strategy, 2004.
Sen, A New DC-To-AC Inverter With Dynamic Robust Performance, 1998.
Bhaojun, Research on a Novel Inverter Based on DC/DC Converter Topology, 2003.
Siri, Sequentially Controlled Distributed Solar-Array Power System with Maximum Power Tracking, 2004.
Walko, Poised for Power, IEE Power Engineer, Feb./ Mar. 2005.
White, Electrical Isolation Requirements in Power-Over-Ethernet (PoE) Power Sourcing Equipment (PSE), 2006.
Yu, Power Conversion and Control Methods for Renewable Energy Sources, May 2005.
Zacharias, Modularisierung in der PV-Systemtechnik—Schnittstellen zur Standardisierung der Komponenten, Institut für Solare Energieversorgungstechnik (ISET), 1996.
Jan. 30, 2020—EP Office Action—EP 18204177.2.
Feb. 3, 2020—Chinese Office Action—201710749388.9.
Ciobotaru, et al., Control of single-stage single-phase PV inverter, Aug. 7, 2006.
International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Conference, Feb. 2001, Colorado Power Electronics Center Publications.
Chen, et al., "Buck-Boost PWM Converters Having Two Independently Controlled Switches", IEEE Power Electronics Specialists Conference, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "Photovoltaic DC-DC Module Integrated Converter for Novel Cascaded and Bypass Grid Connection Topologies—Design and Optimisation", 37th IEEE Power Electronics Specialists Conference, Jun. 18-22, 2006, Jeju, Korea.
Geoffrey R. Walker Affidavit re: U.S. Appl. No. 11/950,307, submitted in an IDS for U.S. Appl. No. 11/950,271 on Mar. 9, 2010.
Geoffrey R. Walker Affidavit re: U.S. Appl. No. 11/950,271, submitted in an IDS for U.S. Appl. No. 11/950,271 on Mar. 9, 2010.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Fagade with 100 W AC Photovoltaic Modules", 1996 IEEE, 25th PVSC, May 13-17, 1996, pp. 1235-1238, Washington, DC.
Alonso, et al., "Cascaded Fi-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Lindgren, "Topology for Decentralised Solar Energy Inverters with a Low Voltage AC-Bus", Chalmers University of Technology, Department of Electrical Power Engineering, EPE '99 —Lausanne.
Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma, "A Modular Fuel Cell, Modular DC-DC Converter Concept for High Performance and Enhanced Reliability", IEEE 2007, pp. 2633-2638.
Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Matsui, et al., "A New Maximum Photovoltaic Power Tracking Control Scheme Based on Power Equilibrium at DC Link", IEEE, 1999, pp. 804-809.

(56) References Cited

OTHER PUBLICATIONS

Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
International Preliminary Report on Patentability for PCT/IB2008/055092 dated Jun. 8, 2010.
International Search Report for PCT/IB2008/055092 dated Sep. 8, 2009.
International Search Report and Opinion of International Patent Application WO2009136358 (PCT/IB2009/051831), dated Sep. 16, 2009.
Informal Comments to the International Search Report dated Dec. 3, 2009.
PCT/IB2010/052287 International Search Report and Written Opinion dated Sep. 2, 2010.
UK Intellectual Property office, Combined Search and Examination Report for GB1100450.4 under Sections 17 and 18(3), Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 I UC-1290 Unlimited Release, Printed Dec. 1996, "Photovoltaic Power Systems and the National Electrical Code: Suggested Practices", by John Wiles, Southwest Technology Development Institute New Mexico State University Las Cruces, NM.
United Kingdom Intellectual Property Office, Combined Search and Examination Report Under Sections 17 and 18(3), GB1020862.7, dated Jun. 16, 2011.
Jul. 13, 2017—Chinese Office Action—CN201210007491.3.
Jul. 31, 2014—Huimin Zhou et al.—"PV Balancers: Concept, Architectures, and Realization"—IEEE Transactions on Power Electronics, vol. 30, No. 7, pp. 3479-3487.
Sep. 15, 2012—Huimin Zhou et. al—"PV balancers: Concept, architectures, and realization"—Energy Conversion Congress and Exposition (ECCE), 2012 IEEE, IEEE pp. 3749-3755.
Jul. 17, 2017—International Search Report—PCT/US2017/031571.
Sep. 4, 2019—Extended European Search Report—EP 19181247.8.
Jul. 8, 2020—CN Office Action—CN 201710362679.2.
Apr. 20, 2020—European Search Report—EP 20151729.9.
Apr. 23, 2020—European Search Report—EP 19217486.0.
May 12, 2020—Extended European Search Report—EP 20161381.7.
Dec. 31, 2020—CN Invalidation Decision—CN 200780045351.2.
Dec. 31, 2020—CN Invalidation Decision—CN 201210253614.1.
Mar. 3, 2021—EP Office Action—EP 17188365.5.
May 7, 2021—Chinese Office Action—CN 20181025083.8.

\* cited by examiner

PHOTOVOLTAIC POWER DEVICE AND WIRING

RELATED APPLICATIONS

The present application claims priority benefit to, and incorporates by reference, in their entireties for all purposes, U.S. provisional application 62/395,461, filed Sep. 16, 2016, and U.S. provisional application 62/341,147, filed May 25, 2016.

BACKGROUND

A photovoltaic string may integrate photovoltaic power devices to allow operation at high efficiency. These power devices may be variously configured, and they may be integrated into the photovoltaic string in various ways. Photovoltaic power device may include optimization functionality, configured to maximize the power output by a photovoltaic generator it is coupled to. Typically, a photovoltaic power device may be coupled to one or more photovoltaic generators, and it may measure one or more circuit parameters (e.g. voltage or current) and control these parameters to obtain a more effective operating point.

One of the challenges of photovoltaic system design is proper design and integration of photovoltaic power devices (e.g. optimizers). Properly designed and well-integrated, optimization circuits may improve system performance without incurring excessive additional costs. Poorly designed power devices and/or systems may not be cost-effective. For instance, some designs may result in photovoltaic string currents which require installation of long, thick and expensive cables.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may employ photovoltaic strings including a photovoltaic (PV) power device (e.g. optimizer) with a specialized wiring configuration, which enables high string efficiency without incurring excessive wiring costs.

In illustrative systems, a circuit may be utilized to reduce the cost of the system. For example, an illustrative PV power device may divide the current of a photovoltaic string into two or more portions, creating smaller current portions that allow for cables which may be thinner and cheaper than those which would otherwise be needed. In some embodiments, the cabling savings may be substantial. In some embodiments, a cable built into photovoltaic generators may be used to carry one portion of the current, and the other portions of the current may be carried by direct-current (DC) or alternating-current (AC) cables bypassing the photovoltaic generators. In certain embodiments, the circuit may be implemented on a single integrated circuit with a photovoltaic generator, DC-DC converter, DC-AC inverter or micro-inverter. In some embodiments, the circuit can be coupled to one or more photovoltaic generators, DC-DC converters, DC-AC inverters or micro-inverters. In some embodiments, photovoltaic power devices may be coupled to one another with cables at the time of manufacturing and stored in a convenient manner (e.g. wound around a cylindrical reel) to allow fast and easy deployment in the field.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1A:
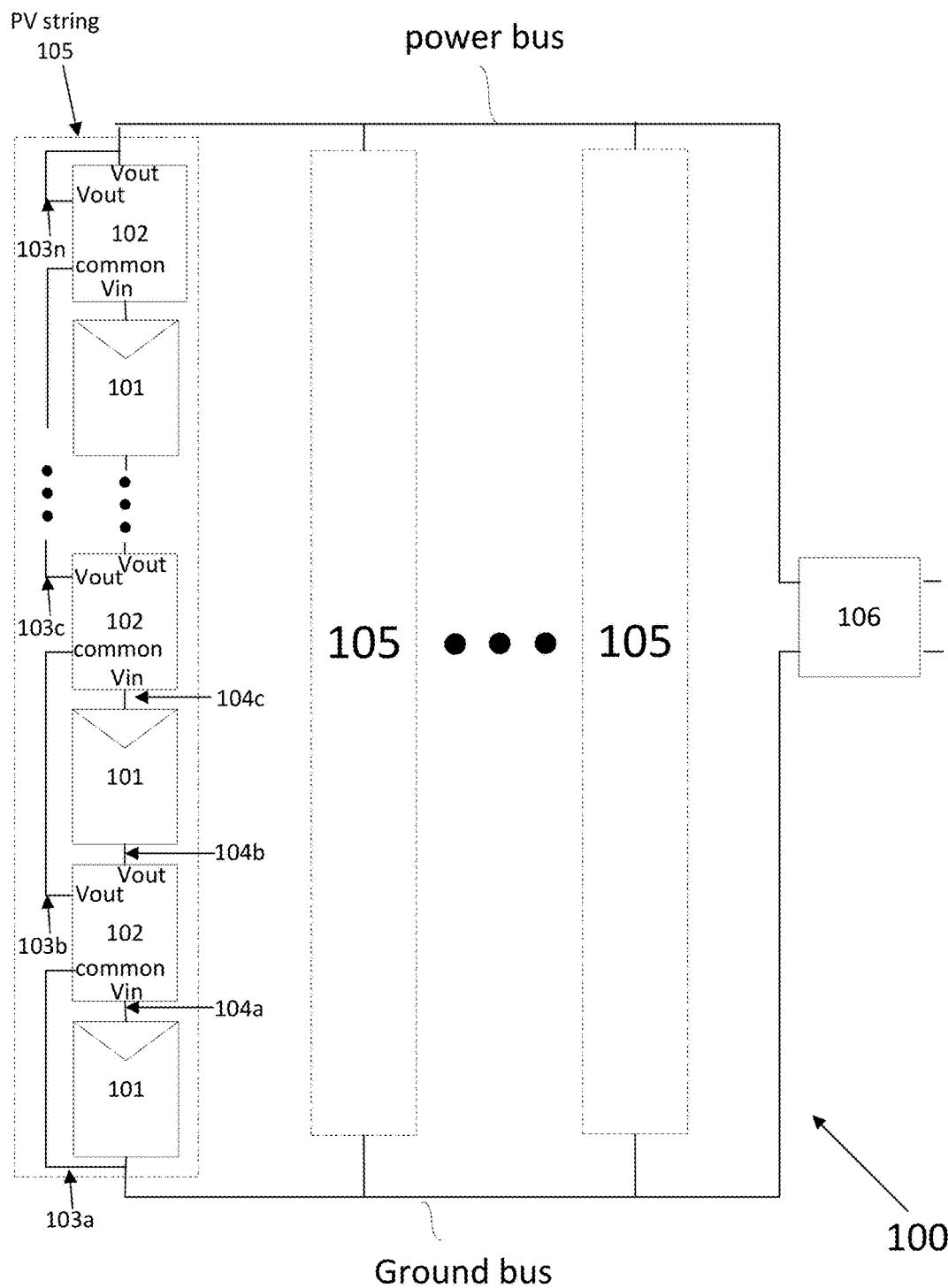
FIGS. 1A-1F are block diagrams according to various aspects of the present disclosure.

Referring to FIG. 1A, illustrative photovoltaic installation 100 may include one or more photovoltaic (PV) generators 101. Each PV generator may be coupled to a one or more photovoltaic (PV) power device(s) 102. Each PV generator 101 may comprise one or more solar cells, solar cell strings, solar panels or solar shingles. In some embodiments, PV power device 102 may comprise a power conversion circuit such as a direct current-direct current (DC/DC) converter such as a buck, boost, buck-boost, buck+boost, flyback and/or forward converter, or a charge-pump. In some embodiments, PV power device 102 may comprise a direct current—alternating current (DC/AC) converter, also known as an inverter or a micro-inverter. In some embodiments, PV power device 102 may comprise a maximum power point tracking (MPPT) circuit with a controller, configured to extract maximum power from one or more of the PV generator(s) to which the power device is coupled. PV power device 102 may further comprise a control device such as a microprocessor, Digital Signal Processor (DSP) and/or a Field Programmable Gate Array (FPGA). In some embodiments, the control device may implement MPPT control discussed above (e.g. "perturb and observe" methods, impedance matching) for determining an optimal or preferred operating point for a connected power source.

In some embodiments, PV power device 102 may comprise circuitry and/or sensors configured to measure parameters on or near the photovoltaic generator(s), such as the voltage and/or current output by the photovoltaic generator (s), the power output by the photovoltaic generator (s), the irradiance received by the module and/or the temperature on or near the photovoltaic generator (s).

In the illustrative embodiment depicted in FIG. 1A, a plurality of PV power devices 102 are coupled to a plurality of PV generators 101, to form a photovoltaic string 105. One terminal of the resultant photovoltaic string 105 may be coupled to a power (e.g., direct current) bus, and the other terminal of the string 105 may be coupled to a ground bus. In some embodiments, the power and ground buses may be input to system power device 106. In some embodiments, system power device 106 may include a DC/AC inverter and may output alternating current (AC) power to a power grid, home or other destinations. In some embodiments, system power device 106 may comprise a combiner box, transformer and/or safety disconnect circuit. For example, system power device 106 may comprise a DC combiner box for receiving DC power from a plurality of PV strings 105 and outputting the combined DC power. In some embodiments, system power device 106 may include a fuse coupled to each string 105 for overcurrent protection, and/or one or more disconnect switches for disconnecting one or more PV strings 105.

In some embodiments, system power device 106 may include or be coupled to a control device and/or a communication device for controlling or communicating with PV power devices 102. For example, system power device 106 may comprise a control device such as a microprocessor, Digital Signal Processor (DSP) and/or a Field Programmable Gate Array (FPGA) configured to control the operation of system power device 106. System power device 106 may further comprise a communication device (e.g. a Power Line Communication circuit and/or a wireless transceiver) configured to communicate with linked communication devices included in PV power devices 102. In some embodiments, system power device 106 may comprise both a control device and a communication device, the control device configured to determine desirable modes of operation for PV power devices (e.g. power devices 102), and the communication device configured to transmit operational commands and receive reports from communication devices included in the PV power devices.

In some embodiments, the power and ground buses may be further coupled to energy storage devices such as batteries, flywheels or other storage devices.

PV power devices 102 may be coupled to photovoltaic generators 101 such that each PV power device may be coupled to two PV generators and two other PV power devices, with the possible exception of one power device coupled to the ground or power bus. Similarly, each PV generator 101 may be coupled to two PV power devices 102, with the possible exception of one PV generator coupled to the ground or Power bus.

In some embodiments, the PV power devices may be "standalone" products, manufactured and packaged separately. In some embodiments, the PV power devices may be coupled to one another using conductors of appropriate length at the time of manufacturing, packaged and sold as an integrated unit, and deployed as an integrated unit when installing a PV system (e.g. photovoltaic installation 100). For example, power devices 102 may be assembled as an integrated string of power devices or part of a string of power devices, and may be coupled to one another during manufacturing. During installation, the integrated string may be simply strung out alongside photovoltaic generators 101 and each power device 102 may be coupled to a corresponding one of the photovoltaic generators 101 quickly and easily, forming photovoltaic string 105, or part of string 105.

Each PV power device 102 may comprise several terminals for coupling (e.g. connecting) to photovoltaic generators 101 and/or other PV power devices 102. In the illustrative embodiment of FIG. 1A, each PV power device 102 comprises four terminals: One "Vin" terminal for receiving power from the positive output of a PV generator 101, two "Vout" terminals for outputting power from the PV power device 102, and one "common" terminal for coupling to a "Vout" terminal of a different PV power device 102 or to a ground bus. In some embodiments, each PV power device 102 may feature a different number of terminals, and/or may feature four terminals configured differently, as will be illustrated in further embodiments.

Electrical current is routed along string 105 in two paths. A first path is formed by conductors coupling PV power devices 102 while bypassing photovoltaic generators 101, and a second path is formed by coupling photovoltaic generators 101 to PV power devices 102. For example, conductors 103b and 103c are connected between "Vout" and "common" terminals of PV power devices, without being directly connected to a PV generator. Conductors 104a, 104b and 104c are examples of conductors which connect PV generators 101 to terminals of a PV power device 102. Conductors deployed at either end of a PV string (e.g. PV string 105) may be connected in a manner different from the conductors forming the first and second paths. For example, conductor 103a is connected on one end to the ground bus and a terminal of a PV generator, and on the other end the "common" terminals of a PV power device 102. Conductor 103n connects the two "Vout" terminals of one PV power device 102 to each other and to the power bus, to combine the currents from the two paths and deliver the combined currents to the power bus.

Figure 1B:
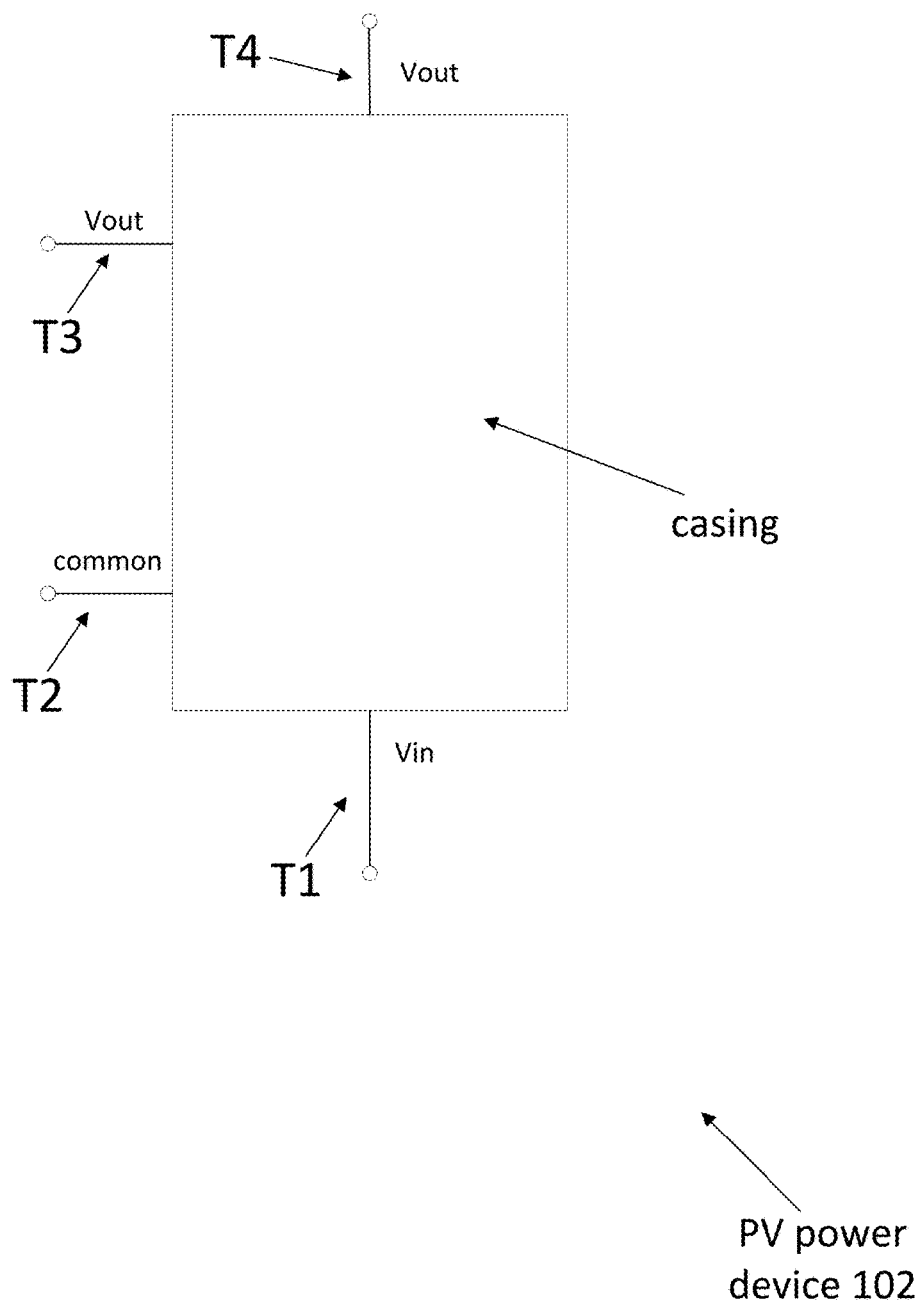

Reference is now made to FIG. 1B, which shows an illustrative embodiment of the external connection terminals of a photovoltaic power device 102, such as those featured in illustrative photovoltaic installation 100. PV power device 102 may include four terminals configured for electrically connecting to terminals labeled "Vin", "Vout" and "common" in FIG. 1A Terminal T1 may be configured to receive an input current from a photovoltaic generator or power device. Terminal T2 may be configured to be coupled to a photovoltaic generator and/or a photovoltaic power device, and may serve as a common terminal for both input and output. Terminals T3 and T4 may be configured to output electrical power (voltage and current) to additional PV generators and/or power devices. Terminals T3 and T4 may output the same voltage in reference to the common terminal T2, though they may output different current and different power. The physical location of the terminals in relation to the casing of the power device may be variously configured to allow for convenient coupling in a photovoltaic string. This illustrative embodiment features terminals T1 and T4 on opposite sides of the power device, with terminals T2, T3 along one side. Other configurations may be considered and implemented in alternative embodiments and are within the scope of embodiments included herein.

Figure 1C:
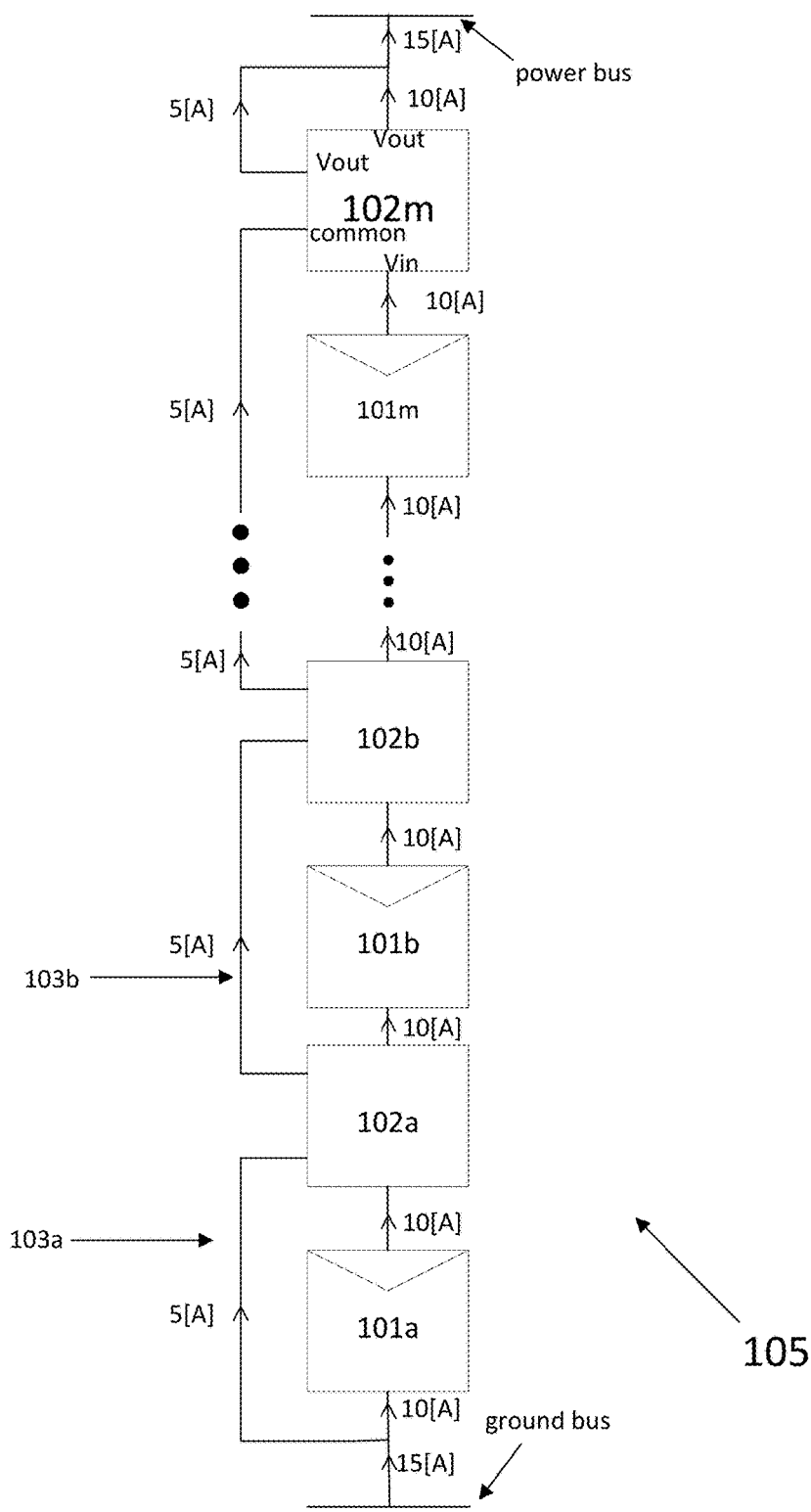

Reference is now made to FIG. 1C, which shows a numerical illustrative embodiment featuring a part of a photovoltaic string 105. Photovoltaic string 105 as depicted in this figure may be used as PV string 105 in FIG. 1A. PV string 105 may include a plurality of photovoltaic (PV) generators 101. Each PV generator 101 may be coupled to a one or more photovoltaic power device(s) 102. Each PV generator 101 may comprise one or more solar cells, one or more solar cell strings, one or more solar panels, one or more solar shingles, or combinations thereof. For example, a PV generator 101 may include a solar panel, two solar panels connected in series or in parallel, or eight solar panels connected in series. In some embodiments, PV power device 102 may comprise a power conversion circuit such as a direct-current-to-direct current (DC/DC) converter such as a buck, boost, buck+boost (e.g., a buck converter followed by a bust converter or a boost converter followed by a book converter), buck-boost, flyback and/or forward converter. In some embodiments, PV power device 102 may comprise a time-varying DC/DC converter, configured to output a different DC voltage at different times. For example, PV power device 102 may comprise a time-varying DC/DC converter configured to output a positive voltage triangular wave, or a voltage wave resembling a rectified sine wave. In some embodiments, PV power device 102 may comprise a direct current—alternating current (DC/AC) converter, also known as an inverter (e.g., a micro-inverter). In some embodiments, PV power device 102 may comprise a Maximum Power Point Tracking (MPPT) circuit with a controller, configured to extract maximum power from one or more of the PV generator(s) the PV power device is coupled to. PV power devices 102 may be coupled to photovoltaic generator 101 such that each PV power device may be coupled to two PV generators and two other PV power devices, with the possible exception of a PV power device coupled to the ground bus (e.g. beginning PV power device 102a) or a PV power device coupled to the power bus (e.g. ending PV power device 102m). Similarly, each PV generator 101 may be coupled to two PV power device 102, with the possible exception of one PV generator coupled to the ground or power bus, such as PV generator 101a depicted in FIG. 1C. The combined string current (i.e. the current flowing between the ground bus and the power bus) may be, in this illustrative embodiment, 15[A]. In other embodiments the string current may be higher or lower. Each photovoltaic generator 101 may operate at a current of 10[A]. The full string current may be routed through two paths, one path flowing through the PV generators 101 and carrying 10[A], the other path bypassing the PV generators and flowing from one PV power device to another. In the illustrative embodiment shown in FIG. 1C, the string bypass path may be comprised of conductors 103a, 103b etc. Conductor 103a may route 5[A] from the ground bus to beginning PV power device 102a, bypassing PV generator 101a. Bypass path 103b may be coupled to an output of PV beginning power device 102a and carry 5[A] to PV power device 102b, bypassing PV generator 101b. Additional bypass paths may be similarly coupled, to route 5[A] through the string while bypassing the PV generators. In some embodiments, the current flowing through the modules may vary from module to module and from time to time, and the current flowing through the bypass paths may similarly vary. FIG. 1C illustrates an illustrative embodiment in which all PV generators 101 (e.g. 101a, 101b etc.) are operating at a maximum power point current of 10[A]. In some operating conditions, different PV generators may have different maximum power points such that different PV generators conduct maximum-power currents of different magnitudes, as will be described in other embodiments disclosed herein.

Different PV generators may operate at different power points, even in the same PV installation. As a numerical example, two PV generators may be capable of outputting 300[W], with one PV generator operating at a maximum power point of 20[V] and 15[A], and another PV generator operating at a maximum power point of 30[V] and 10[A]. As a different example, two PV generators may be capable of generating different maximum power levels. For example, one PV generator may output 300[W] and operate at a maximum power point of 20[V] and 15[A], while a second PV generator may be partially shaded and/or dirty, and be capable of outputting only 266[W] at a maximum power point of 19[V] and 14[A]. An MPPT circuit may be configured to identify the maximum power point of one or more PV generators the MPPT circuit is coupled to, and to operate the PV generator at the PV generator's maximum power point independent of temperature, solar radiance, shading or other performance deterioration factors of other PV generators in the installation. In some PV installations, a plurality of PV generators may all be operating at their respective maximum power points, with each PV generator operating at a different current independent of the other generators. In illustrative embodiments, bypass paths (e.g. conductors 103a, 103b etc.) may carry differing currents to compensate for differing PV generator maximum power point currents.

Figure 1D:
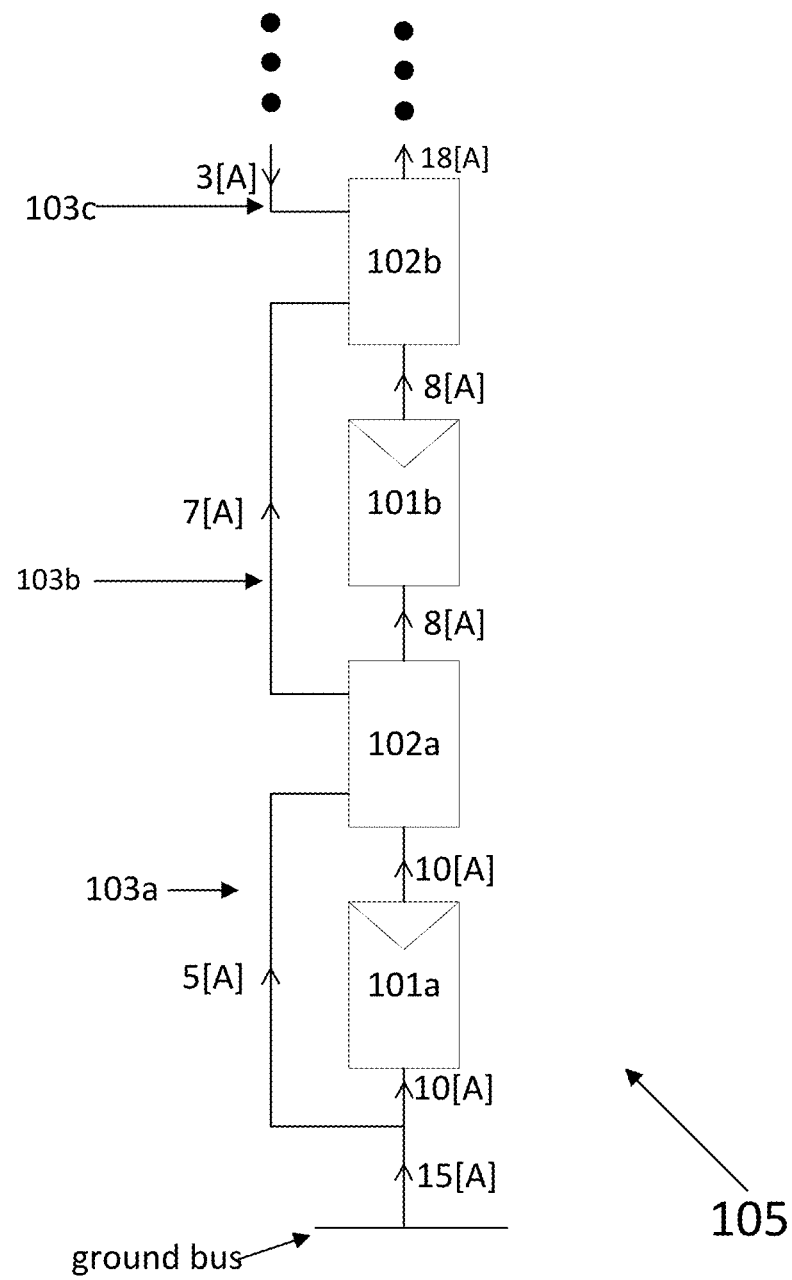

Reference is now made to FIG. 1D, which shows a portion of a photovoltaic string according to some illustrative embodiments. Photovoltaic string 105 comprises a plurality of PV generators 101 (e.g. 101a, 101b etc.) and PV power devices 102 (e.g. 102a, 102b etc.). Photovoltaic string 105 may be the same as or part of PV string 105 of FIG. 1A. The coupling method of the PV generators and PV power devices to one another may be similar to embodiments previously described herein. In this illustrative embodiment, the PV string 105 current may be 15[A]. PV generator 101a may operate at 10[A], with 5[A] bypassing the module via conductor 103a, which is coupled to beginning PV power device 102a. PV generator 101b may operate at 8[A], with 8[A] flowing to the PV generator from beginning PV power device 102a. Beginning PV power device 102a may further output 7[A] flowing over bypass path 103b, which is coupled to PV power device 102b. PV power device 102b may receive 8[A] from PV generator 101b and 7[A] via conductor 103b, and output 18[A] to the next PV generator in the string (not depicted) and output −3[A] over conductor 103c to the next PV power device in the string (not depicted). A negative bypass current simply indicates a reverse direct current (i.e. flowing in the opposite direction compared to the current portion flowing through the photovoltaic generators). In some embodiments, the bypass current may be an alternating current (AC), while the current portion which flows through the PV generators may be a direct current (DC) as further described below. In some embodiments, both the PV generator and bypass paths may carry a direct current.

By splitting the full string current into multiple portions and routing each portion along a different path, some embodiments may offer advantages. Conduction losses along a photovoltaic string may be expressed as $P_{loss}=I^2*R$, where $P_{loss}$ denotes the total conduction losses, I denotes the string current and R the combined resistance of the string conductors. Conductor resistance is calculated as $$R = \frac{\rho l}{A},$$

when ρ denotes the resistivity of the conducting material, l is the conductor length and A denotes the conductor cross section. As indicated by the first equation, a decrease in current results in a quadratic decrease in conduction losses. Therefore, it is beneficial to minimize current flowing through any single path in the system, as losses may decrease and higher efficiency may be obtained. Furthermore, many photovoltaic generators (e.g. solar panels) are sold already featuring cables which may be rated to support a current which is lower than the desired string current. In one type of PV installation featuring PV generators and PV power devices, PV generator cables may couple a PV generator to a PV power device while carrying the PV generator's maximum power point current, with the PV power device featuring additional cables to carry the entire string current. In certain PV installations, this may result in both higher losses (e.g. because of losses incurred by both the PV generator cables carrying the full generator currents and the PV power device cables carrying the full string current) and higher cabling costs (e.g. not taking advantage of the length of the PV generator cables to reduce the length of the PV power device cables). By splitting the string current into multiple portions, the included photovoltaic generator cables may be utilized to support a portion of the current, and an additional cable (which may also be required only to support a portion of the current, and may therefore be thinner and cheaper) may be added at a lower cost than the cost of replacing the entire photovoltaic generator cable. Additionally, the cost of conductors is not always linear, and the price of a cable rated to carry 15[A] may sometimes be higher than the combined costs of a 10[A]-rated cable and a 5[A]-rated cable.

Figure 1E:
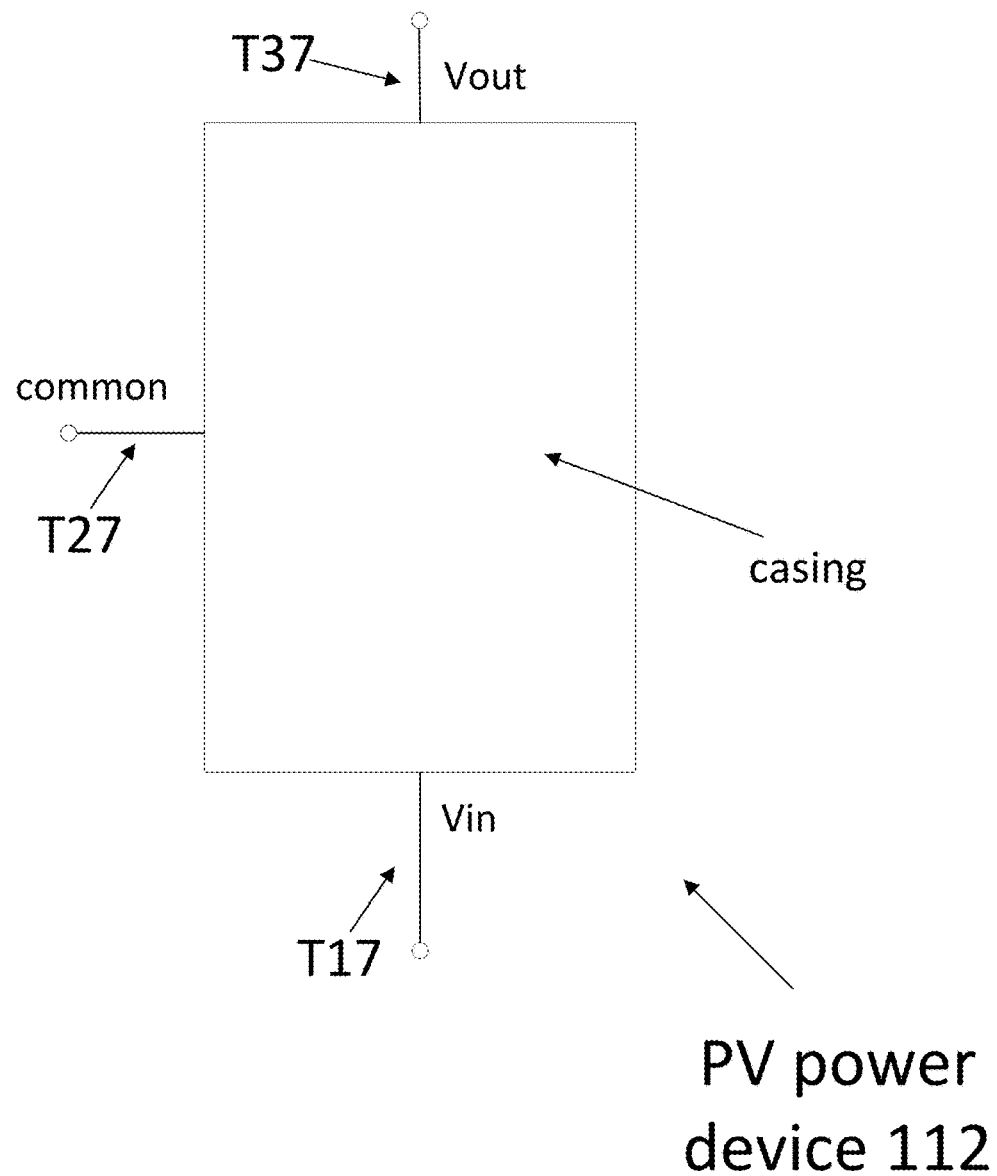

Referring now to FIG. 1E, illustrative photovoltaic power devices utilized in illustrative embodiments herein may feature different numbers of terminals. For example, power device 112 may include three terminals: terminal T17 may be utilized to receive an input voltage (Vin), terminal T37 may be utilized to output an output voltage (Vout), and terminal T27 may output a voltage level common to the input and output. The internal circuitry of power device 112 may be similar to that of other power devices discussed in detail herein, with only one output voltage terminal made available. If desirable, the output voltage terminal may be split during system deployment using a splitting device, such as a splice connector (e.g. a T-connector).

Figure 1F:
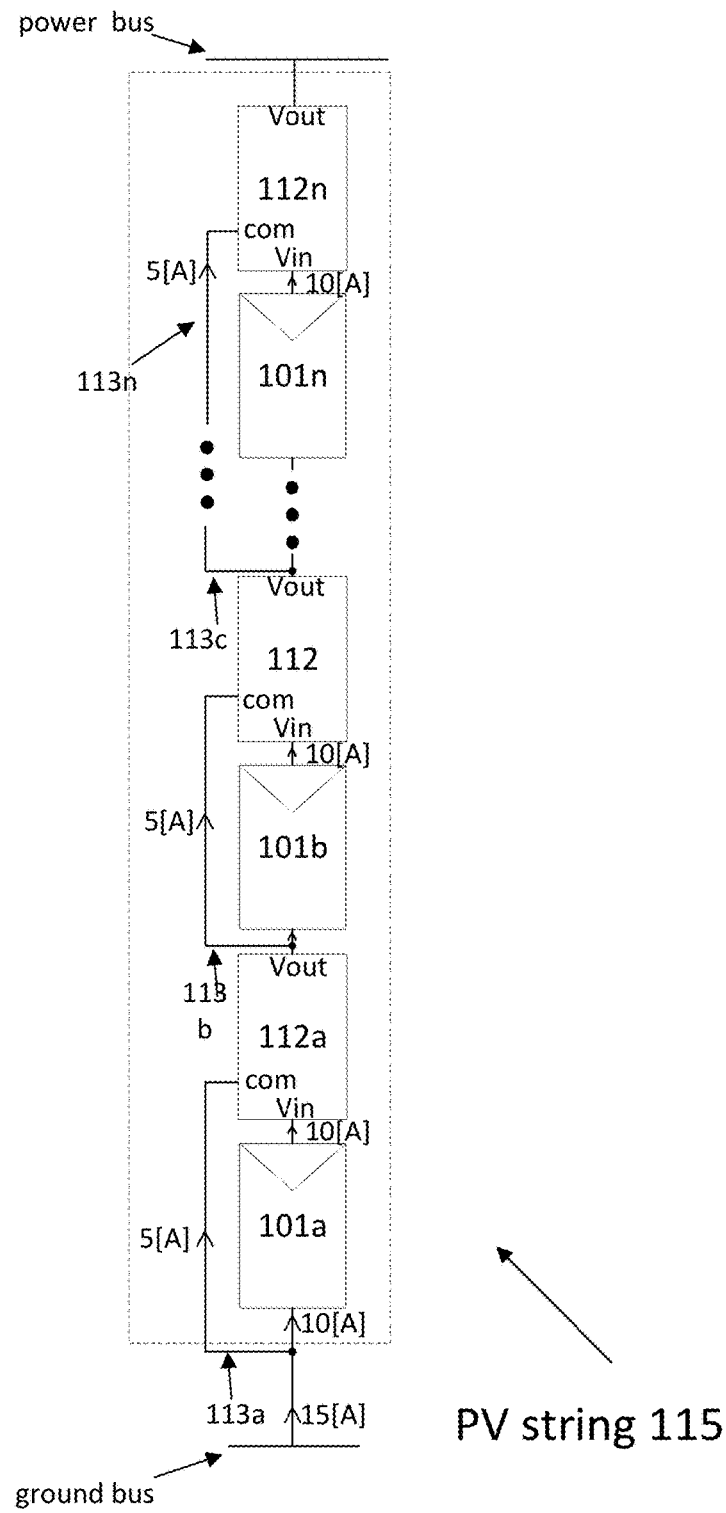

Reference is now made to FIG. 1F, which shows an illustrative embodiment of photovoltaic string 115 according to certain embodiments. PV string 115 may be used as string 105 of FIG. 1A. In this illustrative embodiment, each of a plurality of PV generators in a PV string (e.g. PV string 115) may be coupled to two PV power devices, with the exception of one PV generator (e.g. PV generator 101a) which may be coupled to the ground bus. Each of a plurality of PV power devices in a PV string (e.g. PV string 115) may be coupled to two PV generators, with the exception of one PV power device (e.g. PV power device 112n) which may be coupled to the power bus. Similar to other embodiments disclosed herein, the string current may be divided into two portions and routed along two paths, with a first path passing through PV generators 101 (e.g., 101a, 101b, etc.) and a second path comprising bypass paths 113 (e.g. path 113a, path 113b, etc.) which bypass the modules and carry current from one PV power device to the next PV power device in the string. As a numerical example, the string current may be 15[A], with 10[A] being routed through the PV generators, and 5[A] being routed through the power devices. Each power device 112 may output 15[A] from its single Vout terminal. The power devices 112 depicted may be arranged and implemented similarly to the power device depicted in FIG. 1E, where the power device's Vin terminal is at the bottom of the power device, the common terminal is at the side and the device's Vout terminal is at the top. The power devices 112 may be implemented using a device similar to the device shown in FIG. 1B, with a reduced number of terminals (e.g. combining T3 and T4 to a single terminal).

Figure 2A:
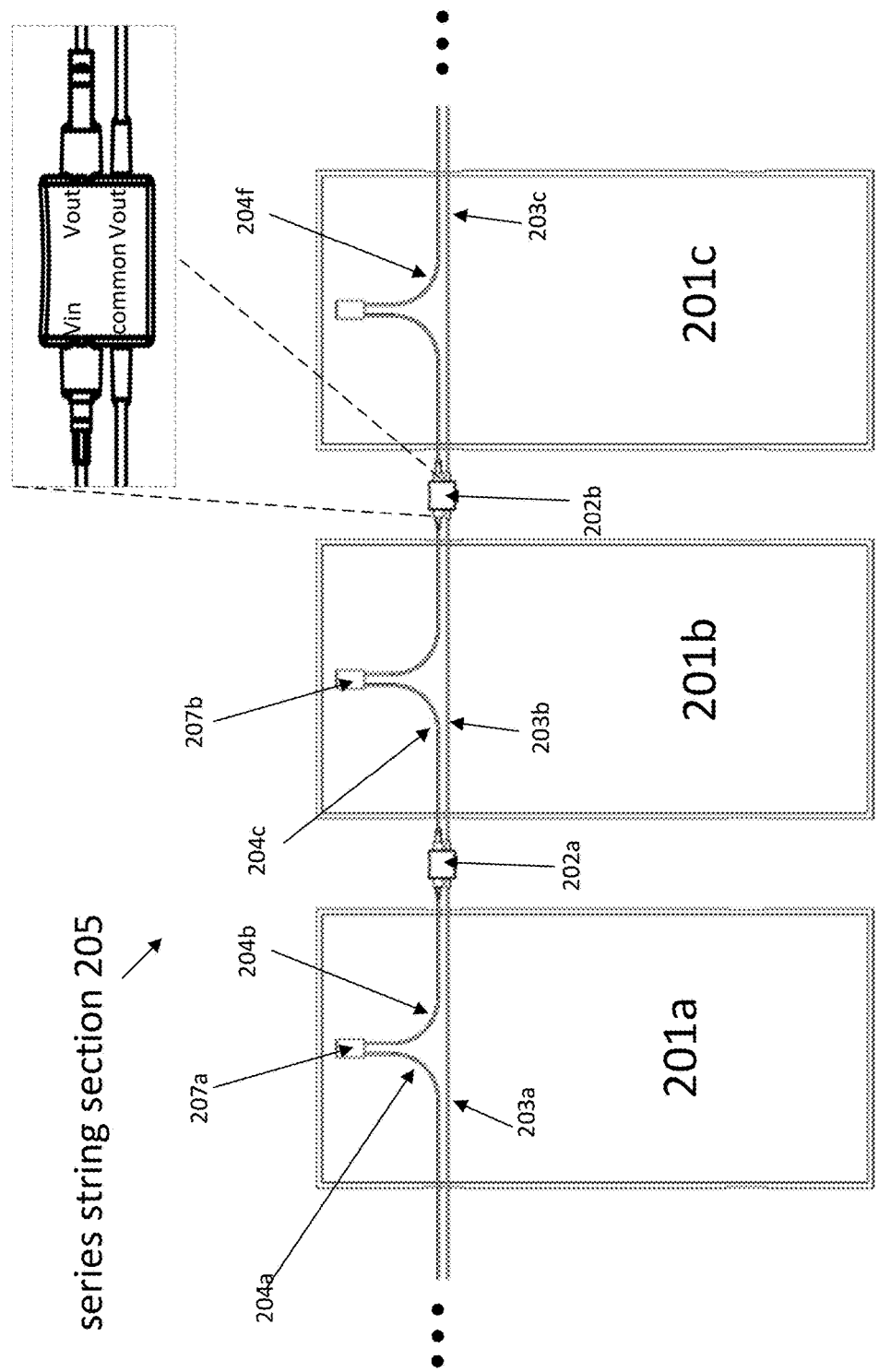
FIG. 2A illustrates a string section according to various aspects of the present disclosure.

Reference is now made to FIG. 2A, which shows an illustrative embodiment of a series string section of photovoltaic string 205, which may be part of or the same as photovoltaic string 105 that may be found in systems such as photovoltaic installation 100. PV generator 201a may comprise a photovoltaic panel including junction box 207a.

PV power device 202a may be coupled to PV generators 201a and 201b, and PV power device 202b may be coupled to PV generators 201b and 201c. PV power devices 202a and 202b may be similar to or the same as PV power devices 102 of FIG. 1A, and may feature four electrical terminals ("Vin", "common" and two "vout" terminals) arranged as depicted in FIG. 2A. In some embodiments, the two "Vout" terminals may be arranged differently (e.g. arranged such as power device 102 of FIG. 1B) or combined into one, similarly to PV power device 112 of FIG. 1E. Bypass cable 203b may be connected between a "Vout" terminal of PV power device 202a and the "common" terminal of PV power device 202b. Panel cable 204b may couple a terminal (e.g. the higher-voltage terminal) of PV generator 201a to the "Vin" terminal of PV power device 202a, and panel cable 204c may couple a "Vout" terminal of PV power device 202a to PV generator 201b (e.g. to the lower voltage terminal of PV generator 201b).

In some embodiments, PV generator 201a may be the "first" module in a section of photovoltaic series string 205. In some embodiments, a splice connector (e.g. a "T-connector") may combine panel cable 204a and bypass cable 203a and be connected to a ground bus. Similarly, in some embodiments, PV generator 201c may be the "last" module in photovoltaic series string section 200. In some embodiments, a splice connector (e.g. a "T-connector") may combine panel cable 204f and bypass cable 203c and be connected to a power bus.

PV generator 201 (e.g. any of PV generators 201a-201c), the connected junction box 207 and the connected panel cables 204 may be a pre-integrated assembly before connection to PV power devices 202. Bypass cables 203 may be pre-integrated with one of the connected PV power devices (e.g., bypass cable 203b may be an integrated part of PV power device 202a or 202b). Bypass cables 203 may be two cables spliced together during assembly of the string section, with each portion an integrated part of a PV power device (e.g., bypass cable 203b may be comprise two cables, with one cable integral to 202a and the other cable integral to 202b).

Figure 2B:
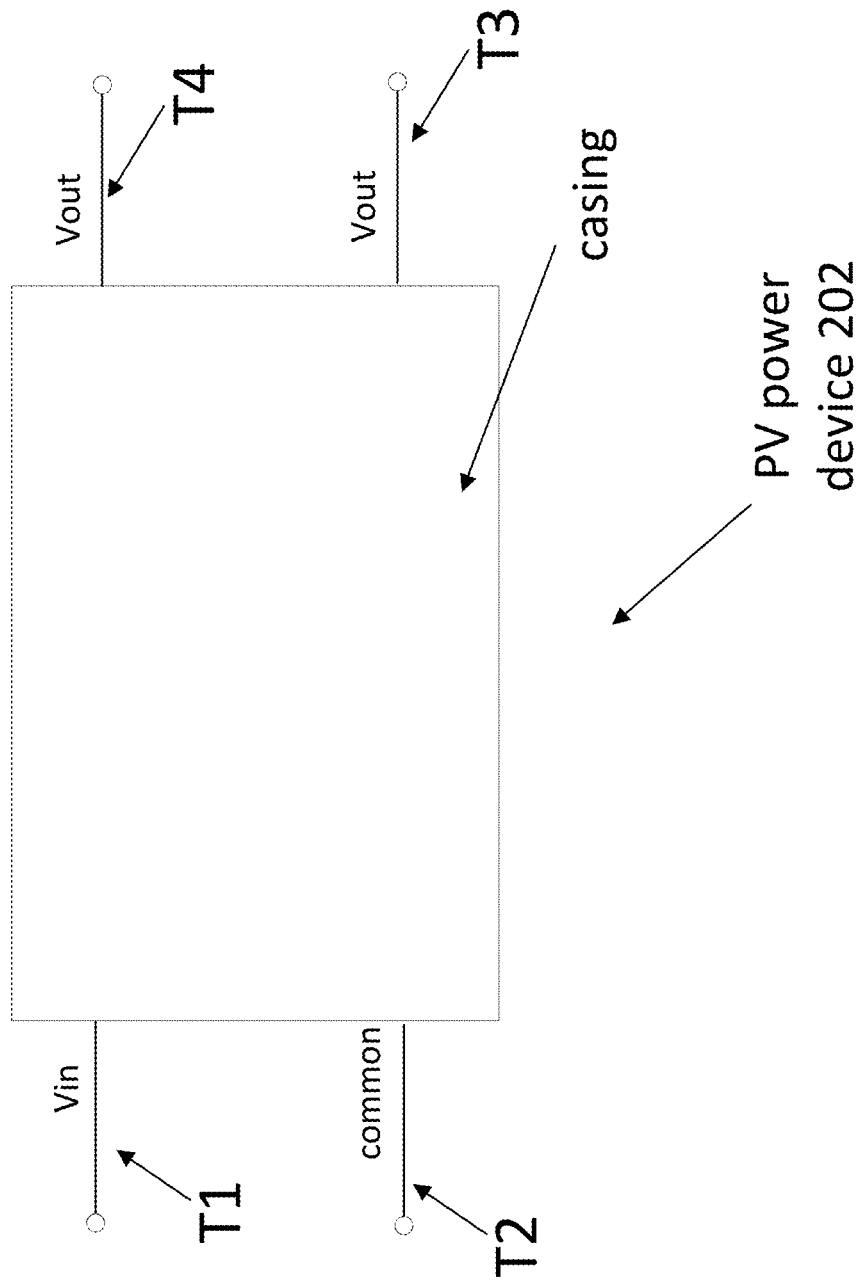
FIG. 2B illustrates a PV power device according to various aspects of the present disclosure.

Reference is now made to FIG. 2B, which shown an illustrative embodiment of the external connection terminals of a photovoltaic power device 202, such as those featured in the illustrative string section in FIG. 1B. PV power device 202 may include four terminals. Terminal T1 may be configured to receive an input from a photovoltaic generator or power device. Terminal T2 may be configured to be coupled to a photovoltaic generator and/or a photovoltaic power device, and may serve as a common terminal for both input and output. Terminals T3 and T4 may be configured to output voltage, current and/or power to additional PV generators and/or power devices. Terminals T3 and T4 may output the same voltage in reference to the common terminal T2, though they may output different current and different power. The physical location of the terminals in relation to the casing of the power device may be arranged to allow for convenient coupling in a photovoltaic string. This illustrative embodiment features terminals T1, T2 on the same side of the power device, with terminals T3, T4 located on the opposite side. Other arrangements may be considered and implemented in alternative embodiments and are within the scope of embodiments included herein.

Figure 3A:
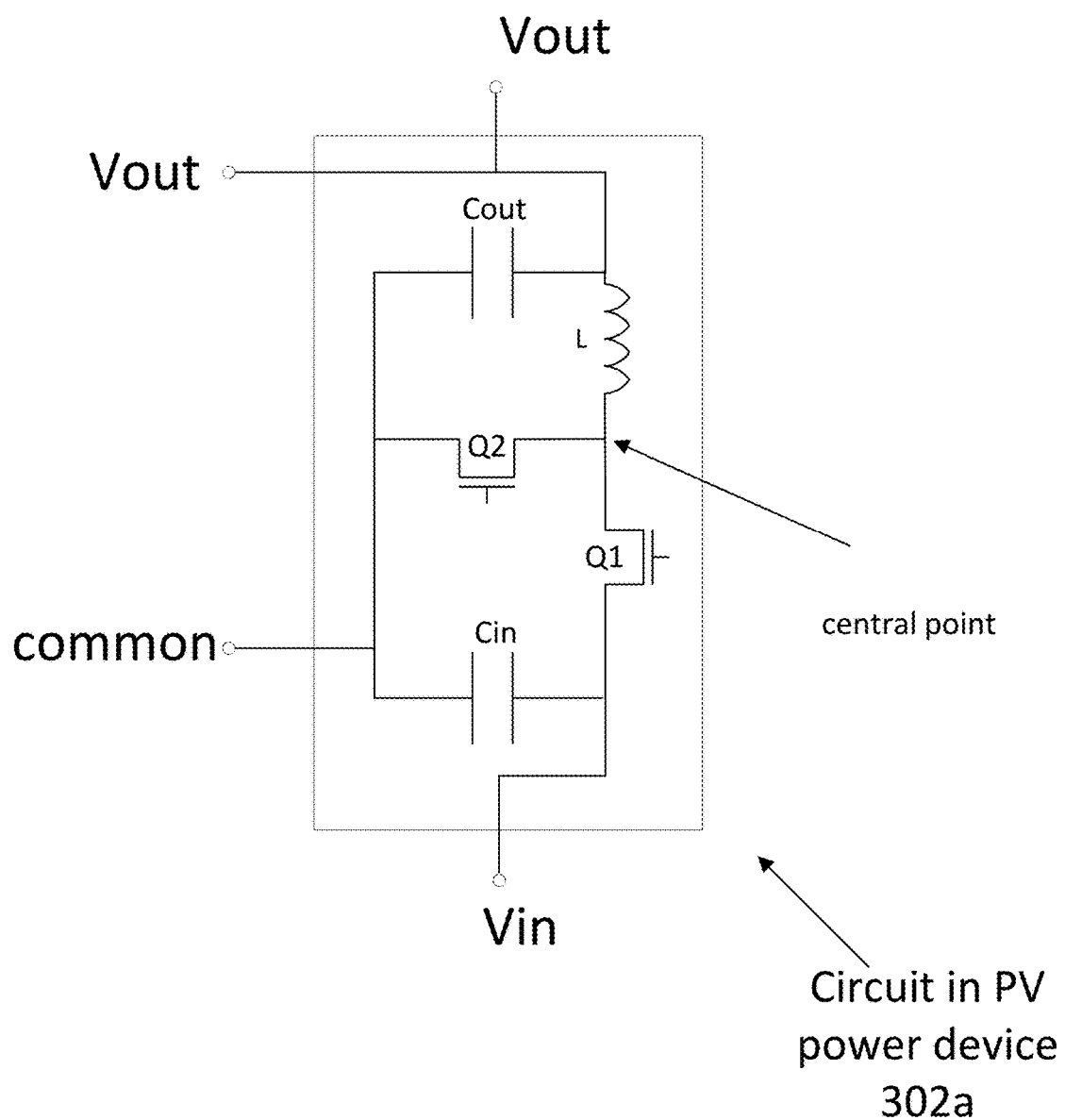
FIGS. 3A-3B illustrate PV power device circuits according to various aspects of the present disclosure.

Reference is now made to FIG. 3A, which shows some of the internal circuitry of a photovoltaic power device 302a according to various illustrative embodiments (e.g., PV power device 302a may be similar to or the same as PV power device 102 of FIGS. 1A-1D, or PV power device 202 of FIGS. 2A-2B). In some embodiments, photovoltaic power device 302a may be implemented using a variation of a Buck DC/DC converter. The power device may include a circuit having two input terminals, denoted Vin and common, and two output terminals which output the same voltage Vout. The input and output voltages are in relation to the common terminal. The circuit may include an input capacitor Cin coupled between the common terminal and the Vin terminal, an output capacitor coupled between the common terminal and the Vout terminals. The circuit may include a central point used for reference. The circuit may include a pair of switches (e.g. MOSFET transistors) Q1 and Q2, with Q1 coupled between Vin and the central point, and Q2 coupled between the common terminal and central point. The circuit may further include inductor L coupled between the Vout terminals and the central point. By staggering the switching of switches Q1 and Q2, the circuit may convert the input voltage Vin to output voltage Vout. If current is input to the circuit by the Vin and common terminals, and the voltage drop across capacitors Cin and Cout stay about constant at voltages Vin and Vout respectively, the currents input to the circuit are combined at inductor L to form an inductor current which is about equal to the sum of the current input at the Vin and common terminals. The inductor current may contain a ripple due to the charging and discharging of capacitors Cin and Cout, but the voltage ripples over the capacitors are generally small, and similarly the inductor current ripple may be generally small. The inductor current may be output by the pair of output terminals Vout. In some embodiments, more than two Vout terminals may be utilized to split the output current into more than two portions. In some embodiments, a single output terminal may be included, and system designers may split the output terminal externally (i.e. outside of the PV power device circuit), if desired. The switching of switches Q1 and Q2 may be controlled by an external control device (not explicitly depicted). If the electrical terminals Vin, common and Vout are arranged as depicted in FIG. 3A, power device 302a may be used as the power device in configurations such as those shown in FIG. 1A-1D (e.g. device 102).

Figure 3B:
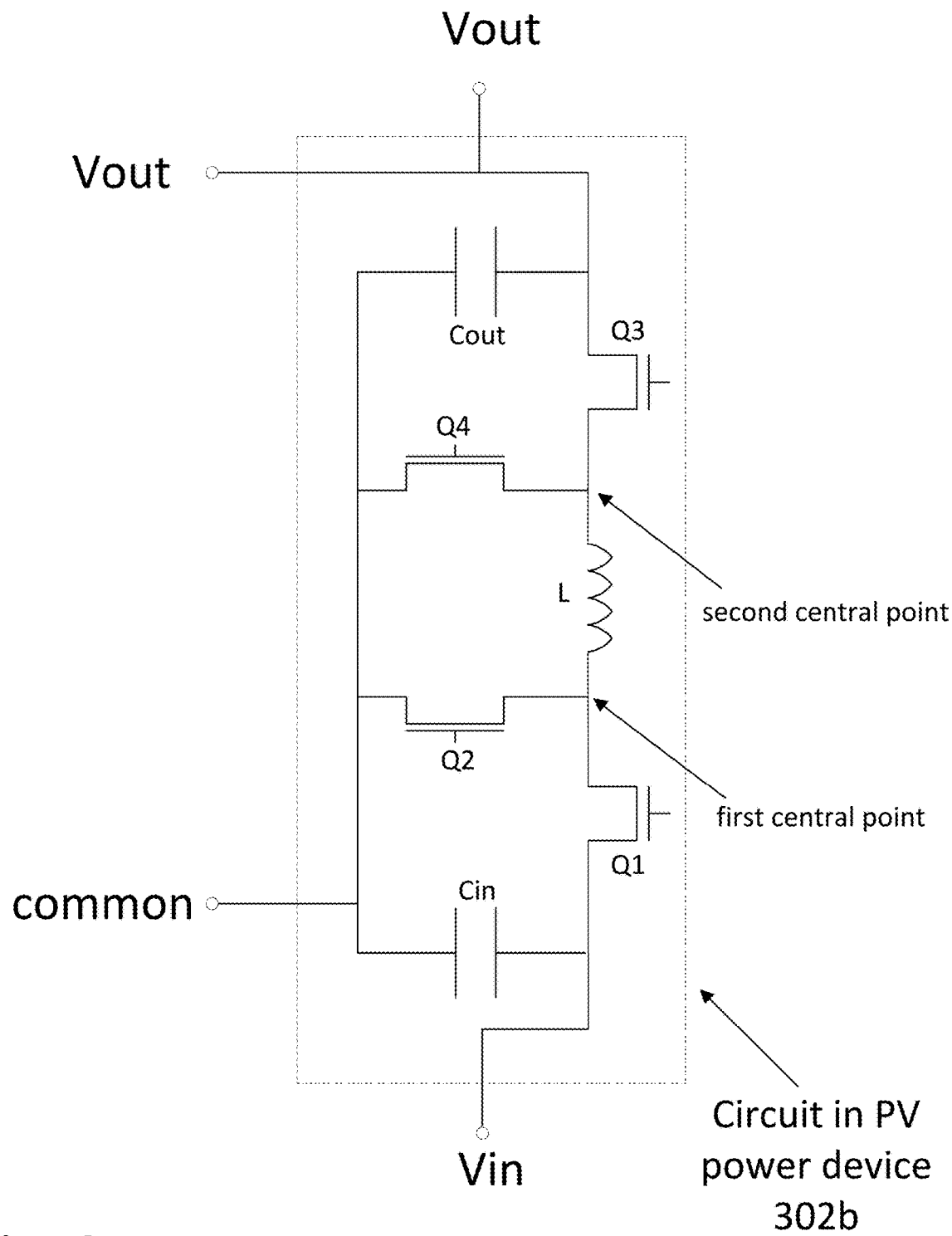

Reference is now made to FIG. 3B, which shows some of the internal circuitry of a photovoltaic power device according to one illustrative embodiment. In some embodiments, photovoltaic power device 302b may be implemented using a variation of a Buck+Boost DC/DC converter. The power device may include a circuit having two input terminals, denoted Vin and common, and two output terminals which output the same voltage Vout. The output voltage is in relation to the common terminal. The circuit may include an input capacitor Cin coupled between the common terminal and the Vin terminal, an output capacitor coupled between the common terminal and the Vout terminals. The circuit may include two central points used for reference. The circuit may include a plurality of switches (e.g. MOSFET transistors) Q1, Q2, Q3 and Q4 with Q1 connected between Vin and the first central point, and Q2 connected between the common terminal and the first central point. Q3 may be connected between the Vout terminal and the second central point, and Q4 may be connected between the common terminal and the second central point. The circuit may further include inductor L coupled between the two central points.

The operation of the Buck+Boost DC/DC converter in PV power device 302b may be variously configured. If an output voltage lower than he input voltage is desired, Q3 may be statically ON, Q4 may be statically OFF, and with Q1 and Q2 being PWM-switched in a complementary manner to one another, the circuit is temporarily equivalent to the Buck converter depicted in FIG. 3A and the input voltage is bucked. If an output voltage higher than he input voltage is desired, Q1 may be statically ON, Q2 may be statically OFF, and with Q3 and Q4 being PWM-switched in a complementary manner to one another, the input voltage is boosted. Staggering the switching of switches Q1 and Q2, the circuit may convert the input voltage Vin to output voltage Vout. If current is input to the circuit by the Vin and common terminals, and the voltage drop across capacitors Cin and Cout are about constant voltages Vin and Vout respectively, the currents input to the circuit are combined at inductor L to form an inductor current which is equal to the sum of the current input at the Vin and common terminals. The inductor current may contain a ripple due to the charging and discharging of capacitors Cin and Cout, but if the voltage drop across capacitors Cin and Cout are about constant, the voltage ripples over the capacitors are small, and similarly the inductor current ripple may be small. The inductor current may be output by the pair of output terminals Vout. In some embodiments, more than two Vout terminals may be utilized to split the output current into more than two portions. In some embodiments, a single output terminal may be included, and system designers may split the output terminal externally (i.e. outside of the PV power device circuit), if desired.

Figure 4A:
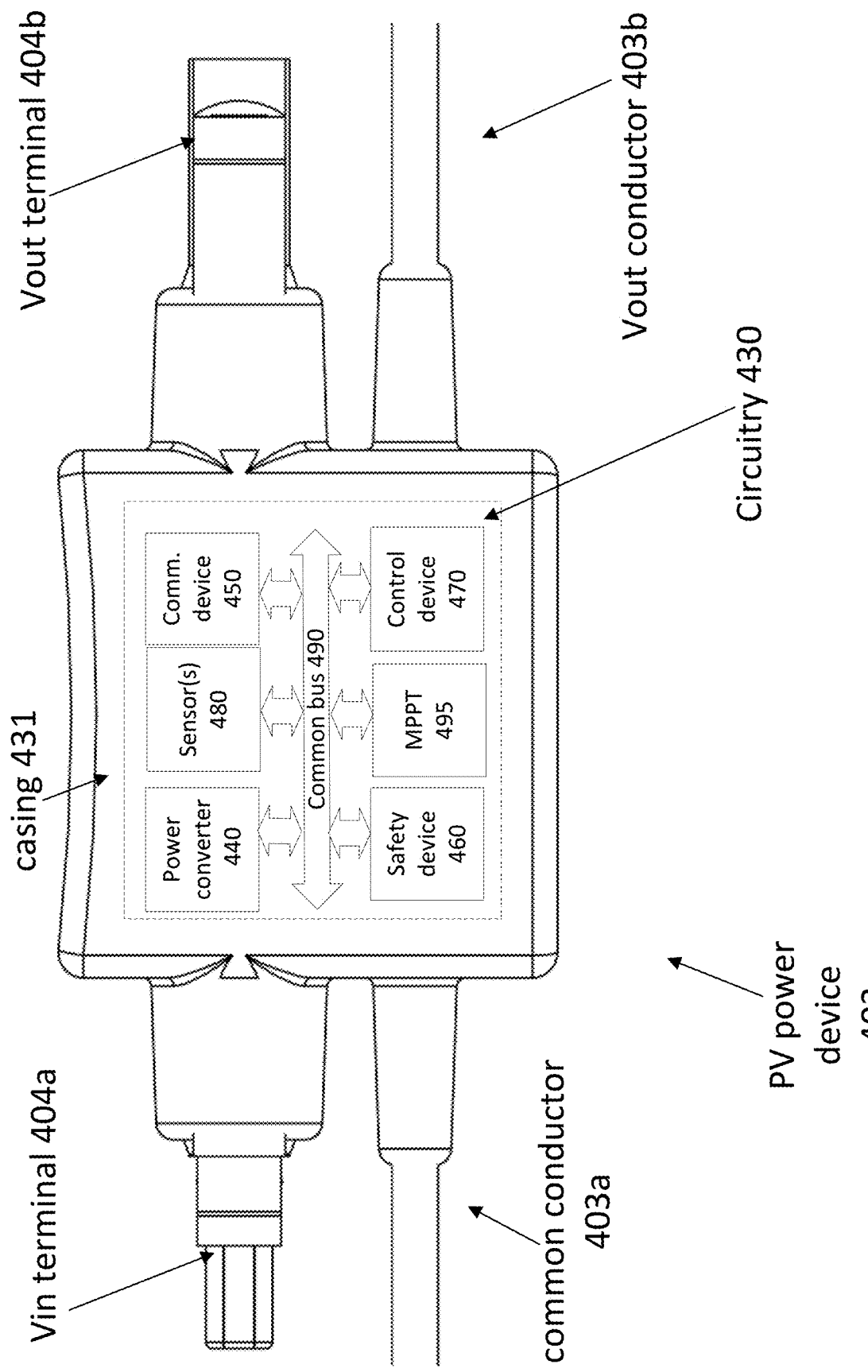
FIG. 4A illustrates a PV power device configuration according to various aspects of the present disclosure.

Reference is now made to FIG. 4A, which illustrates a photovoltaic power device according to illustrative embodiments. Photovoltaic power device 402 may include a casing 431. The casing 431 may house circuitry 430 (illustrated functionally). In some embodiments, circuitry 430 may include power converter 440. Power converter 440 may include a direct current-direct current (DC/DC) converter such as a buck, boost, buck+boost, flyback, Cuk and/or forward converter. In some embodiments, power converter 440 may include a direct current—alternating current (DC/AC) converter (e.g., an inverter, or a micro-inverter designed to convert a small portion of power from DC to AC, such as a 300 W micro-inverter) instead of, or in addition to, a DC/DC converter.

In some embodiments, circuitry 430 may include Maximum Power Point Tracking (MPPT) circuit 495, configured to extract increased power from the PV generator the power device is coupled to. In some embodiments, MPPT circuit 495 may be configured extract increased power from a PV generator connected to its input terminal, and in some embodiments, MPPT circuit 495 may be configured extract increased power from a PV generator connected to its output terminal(s). In some embodiments, power converter 440 may include MPPT functionality, rendering MPPT circuit 495 unnecessary. Circuitry 430 may further comprise control device 470 such as a microprocessor, Digital Signal Processor (DSP) and/or an FPGA. Control device 470 may control and/or communicate with other elements of circuitry 430 over common bus 490. In some embodiments, circuitry 430 may include circuitry and/or sensors/sensor interfaces 480 configured to measure parameters directly or receive measured parameters from connected sensors on or near the photovoltaic generator, such as the voltage and/or current output by the module, the power output by the module, the irradiance received by the module and/or the temperature on or near the module. In some embodiments, circuitry 430 may include communication device 450, configured to transmit and/or receive data and/or commands to/from other devices. Communication device 450 may communicate using Power Line Communication (PLC) technology, acoustic communications technologies, or wireless technologies such as BlueTooth™, ZigBee™, Wi-Fi™, cellular communication or other wireless methods.

In some embodiments, circuitry 430 may include safety devices 460 (e.g. fuses, circuit breakers and Residual Current Detectors). For example, fuses may be connected in series with some or all of conductors 403*a* 403*b*, and terminals 404*a* and 404*b*, with the fuses designed to melt and disconnect circuitry at certain currents. As another example, PV power device 402 may include a circuit breaker, with control device 470 configured to activate the circuit breaker and disconnect PV power device 402 from a PV string or a PV generator in response to detecting a potentially unsafe condition or upon receiving a command (e.g. via communication device 450) from a system control device. As yet another example, PV power device 402 may include a bypass circuit featuring a switch, with control device 470 configured to activate the bypass circuit and short-circuit the input and/or output terminals of PV power device 402 in response to detecting a potentially unsafe condition or upon receiving a command (e.g. via communication device 450) from a system control device.

The various components of circuitry 430 may communicate and/or share data over common bus 490. Input voltage (Vin) terminal 404*a* may be configured to be coupled to the positive output of a photovoltaic generator (e.g. as in FIGS. 1A-1D). Output voltage (Vout) terminal 404*b* may be configured to be coupled to the negative output of a different photovoltaic generator, as described with regard to some of the embodiments herein (e.g. as in FIGS. 1A-1D). In some configurations, Common conductor 403*a* and output voltage (Vout) conductor 403*b* may be coupled to other photovoltaic power devices.

Figure 4B:
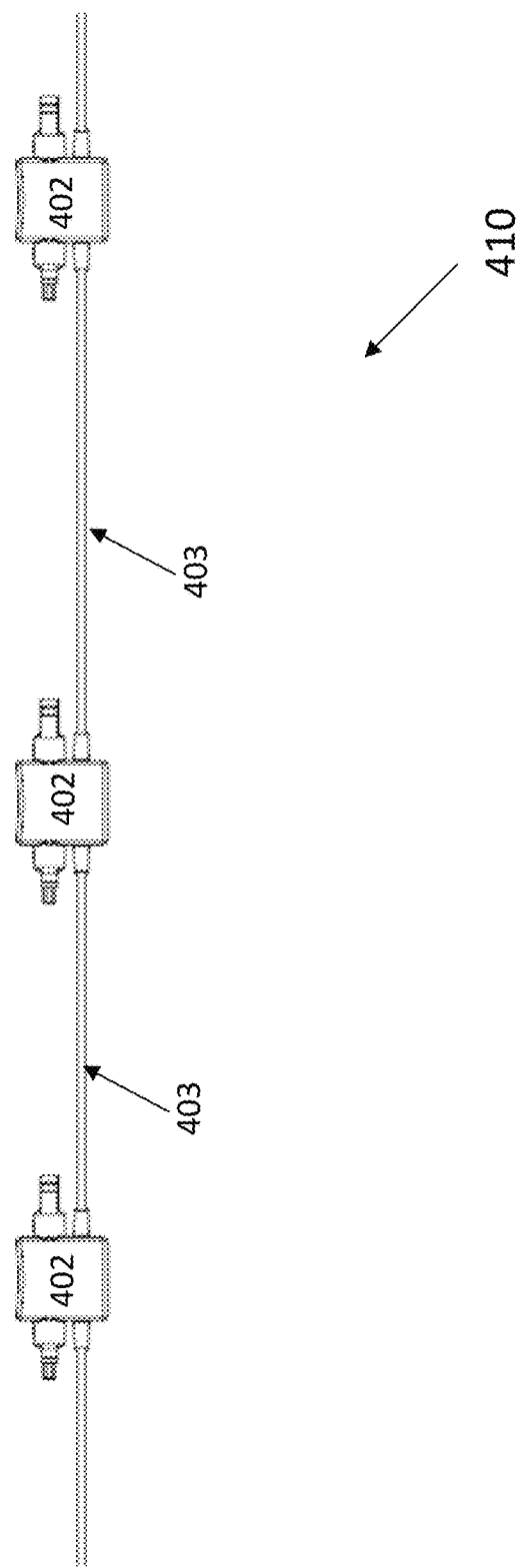
FIG. 4B illustrates a portion of a string of PV power devices according to various aspects of the present disclosure.

In some embodiments, conductors 403*a* and 403*b* may be integrated to photovoltaic power devices at each end, at the time of manufacturing, creating a string of connected photovoltaic power devices as depicted in FIG. 4B, allowing a plurality of coupled power devices to be manufactured and sold as a single unit for fast and easy field deployment. The length of the conductors (e.g. 403*a*, 403*b*) between adjacent power devices may be selected according to a length (or width) of a photovoltaic generator, to enable connecting adjacent power devices to adjacent photovoltaic generators. Manufacturing a string of power devices as a single unit, with the power devices interconnected using integrated (e.g. pre-connected) conductors 403 may provide additional advantages such as reduced cost (e.g. by saving the cost of two connectors. For example, PV power device 402 is depicted in FIG. 4A having two connectors and two conductors, and if the conductors 403*a*, 403*b* do not connect PV power device 402 to an adjacent power device, an additional two connectors may be required) and a lower risk of electrical arcing or overheating due to a faulty connection between connectors. In some embodiments, PV power device 402 may feature an integrated conductor 403*a*, with conductor 403*b* replaced by a terminal for connecting to an integrated conductor from a different PV power device. In some embodiments, conductors 403*a* and 403*b* may be replaced by terminals (e.g. MC4™ connectors made by Multi-Contact or other equivalent connectors) similar to 404*a* and 404*b*, to allow an installer to insert a cable of his or her choosing to be deployed. Terminals 404*a* and 404*b* and conductors 403*a* and 403*b* may be coupled to the terminals of DC/DC or DC/AC power converter 440. For example, power converter 440 may include a Buck converter similar to the converter depicted in FIG. 3*a*. In that case, Vin terminal 404*a* of FIG. 4A may be coupled to the corresponding Vin terminal of FIG. 3*a*, Vout terminal 404*b* and Vout conductor 403*b* of FIG. 4A may be coupled to the Vout terminals of FIG. 3*a*, and the common conductor 403*a* of FIG. 4A may be coupled to the common terminal of FIG. 3*a*. For visual clarity, these connections are not depicted explicitly, and in some embodiments the connections may differ.

Reference is now made to FIG. 4B, which shows a portion of a string of PV power devices. String 405 may be part of a string of PV power devices 402 (e.g. devices similar to or the same as PV power device 402 of FIG. 4A) connected to each other via conductors 403 which may be the same as or similar to common conductor 403*a* of FIG. 4A. The length of each conductor 403 may be about the same as the length a dimension of a PV generator, to enable each PV power devices to be coupled to more than one PV generator (as depicted in FIG. 2A) and/or to enable coupling adjacent PV power devices to adjacent PV generators in a series string. In some embodiments, string 405 may be manufactured and/or packaged, stored and sold as a single unit, enabling fast and easy deployment in a PV installation.

Figure 4C:
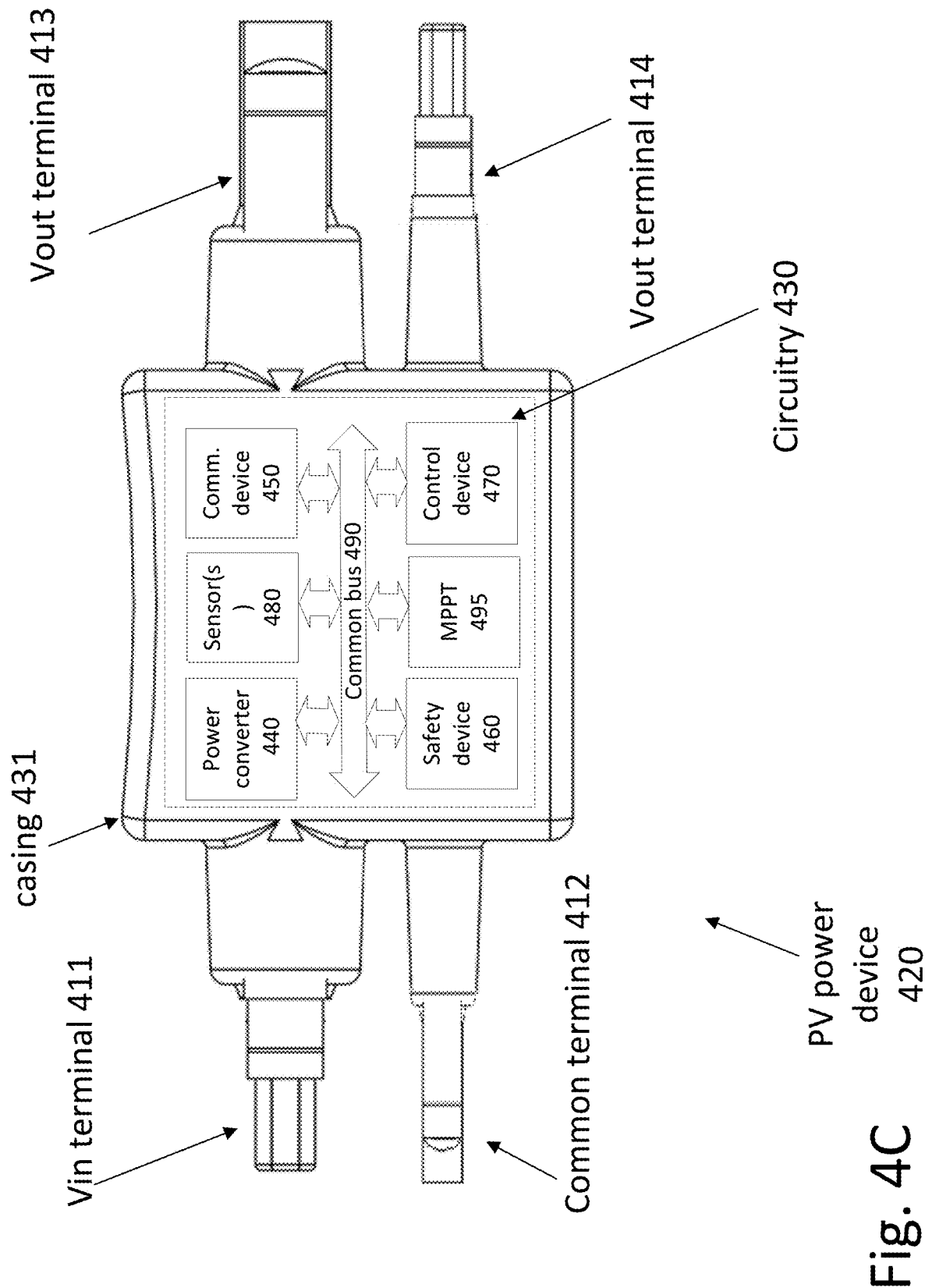
FIG. 4C illustrates a PV power device configuration according to various aspects of the present disclosure.

Reference is now made to FIG. 4C, which illustrates a photovoltaic power device according to illustrative embodiments. First photovoltaic power device 420 may include a casing 431 and circuitry 430 (illustrated functionally). Circuitry 430 may comprise circuits and devices similar to or the same as circuitry 430 as described with regard to FIG. 4A. PV power device 420 may comprise input voltage (Vin) terminal 411, common terminal 412, output voltage (Vout) terminal 413 and output voltage (Vout) terminal 414. Input voltage terminal 411 may be provided for coupling (e.g. connecting) to a first output terminal (e.g. a positive output terminal) of a first photovoltaic generator. Output voltage terminal 413 may be provided for coupling (e.g. connecting) to a second output terminal (e.g. a negative output terminal) of a second photovoltaic generator. Common terminal 412 may be provided for coupling to an output voltage terminal (e.g. similar to or the same as output terminal 414), provided by a second PV power device similar to or the same as PV power device 420. Output voltage terminal 414 may be provided for coupling to a common terminal (e.g. similar to or the same as common terminal 412) provided by a third PV power device similar to or the same as PV power device 420.

In some embodiments, such as embodiments similar to or the same as FIG. 4A, a first conductor couples (e.g. connects) common terminal 412 to an output voltage terminal of the second PV power device, and a second conductor couples (e.g. connects) output voltage terminal 414 to the common terminal of the third PV power device. In some embodiments, the first and second conductors connect the first, second and third power devices at the time of manufacturing, with the first, second and third power devices along with the first and second conductors provided as a single connected apparatus or part of a single connected apparatus. In some embodiments, the first and second conductors are not provided along with PV power device 420, and are connected during installation of PV power device 420.

Figure 5:
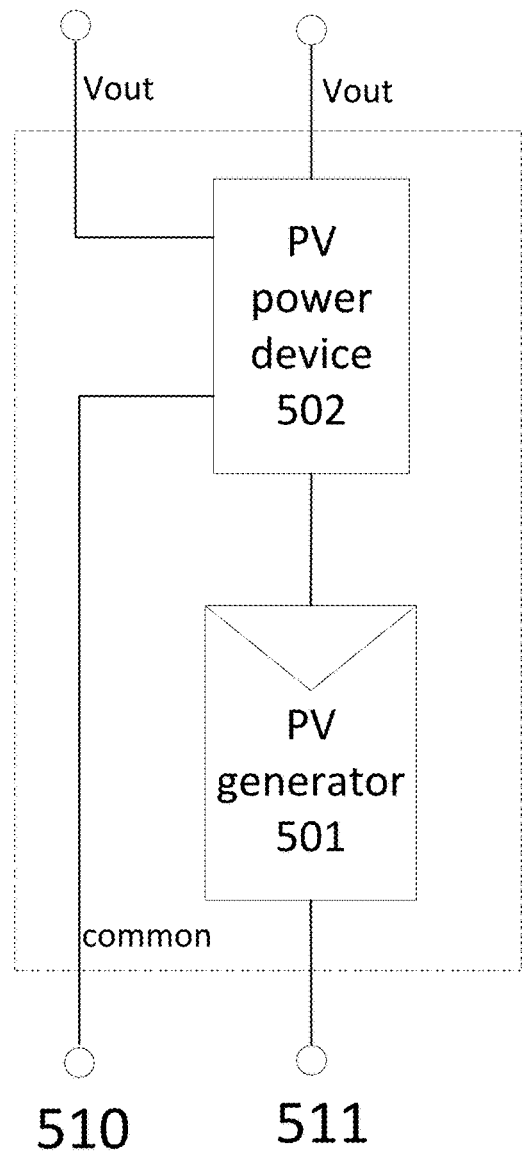
FIG. 5 illustrates a PV power device and PV generator arrangement according to various aspects of the present disclosure.

Reference is now made to FIG. 5, which illustrates an integrated illustrative embodiment. Integrated apparatus 515 may include a photovoltaic generator 501 (e.g., 101, 201 etc.) coupled to a PV power device 502 (e.g., 102, 202, 402a, 402b etc.). Some embodiments may employ the cabling method described herein to couple PV generator 501 to PV power device 502. PV power device 502 may further comprise circuitry similar to or the same as circuitry 430 of FIG. 4A. For example, PV power device 502 may comprise control device 470 such as a microprocessor, Digital Signal Processor (DSP) and/or an FPGA. PV power device 502 may include Maximum Power Point Tracking (MPPT) circuit 495, configured to extract maximum power from the PV generator the power device is coupled to. In some embodiments, control device 470 may include MPPT functionality, rendering MPPT circuit 495 unnecessary. Control device 470 may control and/or communicate with other elements of PV power device 502 over common bus 490. In some embodiments, PV power device 502 may include circuitry and/or sensors/sensor interfaces 480 configured to measure parameters on or near the photovoltaic generator 501 or PV power device 502, voltage, current, power, irradiance and/or temperature. In some embodiments, PV power device 502 may include communication device 450, configured to transmit and/or receive data and/or commands from other devices. Communication device 450 may communicate using Power Line Communication (PLC) technology, or wireless technologies such as ZigBee, Wi-Fi, cellular communication or other wireless methods. In some embodiments, integrated apparatus 515 and/or PV power device 502 may include safety devices 460 (e.g. fuses, circuit breakers and Residual Current Detectors). The various components of PV power device 502 may communicate and/or share data over common bus 490. Integrated apparatus 515 may feature four terminals which are accessible from outside the apparatus, at least two of which output the same voltage. The components of integrated apparatus 515 may be similar to or the same as those of circuitry 430 of FIG. 4A. In FIG. 5 the two terminals outputting the same voltage are denoted 512 and 513. The integrated apparatus may be formed by embedding the components into a photovoltaic generator, the casing of the photovoltaic generator or mounting the components onto the photovoltaic generator. The integrated apparatus may include a portion of or all the circuitry required to comprise a "building block" that may be used for simple "plug 'n play" construction of optimized photovoltaic string. In this manner, the advantages of the current splitting detailed herein may be realized in the internal integrated circuit layout, with one current path in the integrated circuit including a photovoltaic generator 501 (e.g. solar cell, panel or shingle) and another current path bypassing the module. Additional advantages of an implementation as an integrated circuit such as ease of connection, possible cost reduction, etc. may also be realized.

Figure 6:
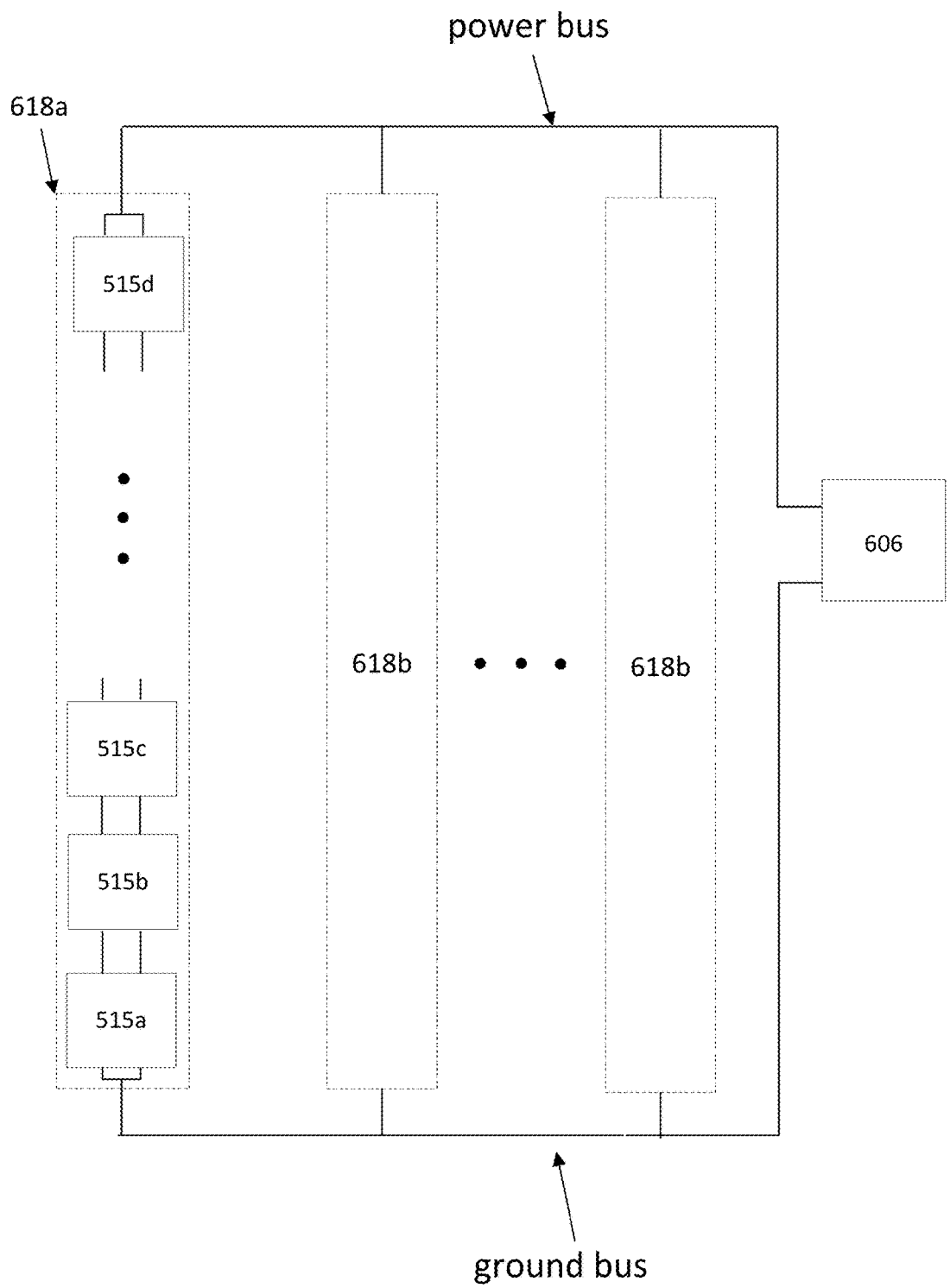
FIG. 6 illustrates a PV system according to various aspects of the present disclosure.

Reference is now made to FIG. 6, which shows a photovoltaic system according to another illustrative embodiment. A number of photovoltaic strings 618 (e.g. 618a, 618b) may be coupled in parallel between ground and power buses to provide power to the power bus. The power and ground buses may be coupled to the inputs of system power device 606. In some embodiments, system power device 606 may include a DC/AC inverter and may output AC power to the grid, home or other destinations. In some embodiments, system power device 606 may comprise a combiner box, transformer and/or safety disconnect circuit. One or more photovoltaic strings 618 may comprise a plurality of series-coupled integrated apparatuses 515. In a string 618, one apparatus 515 may have its terminals 510, 511 coupled to the ground bus. The other apparatuses 515 in the string may have their terminals 510, 511 coupled to the terminals 512, 513 of the preceding apparatuses 515 in the string. One apparatus 515 may have its terminals 512, 513 coupled to the power bus. The other apparatuses 515 in the string may their terminals 512, 513 coupled to terminals 510, 511 of the next apparatus 515 in the string. A photovoltaic system constructed in this manner may enjoy the benefits of optimized photovoltaic strings, multiple current paths which enable cheaper cabling, fully integrated components including safety, monitoring and control functions, and simple installation.

In some photovoltaic systems, it may be beneficial to couple devices outputting a voltage which is not strictly AC or DC. For example, PV power devices (e.g. devices comprising circuitry similar to circuitry 430 of FIG. 4A) may be configured to output a voltage waveform similar to a rectified sine wave, a triangle wave or a square wave. In some systems, configuring each PV power device to output a signal other than DC may reduce the size and cost of the filters and switching circuits required of a system power device configured to supply AC power to a grid or home (e.g. a DC/AC inverter).

Figure 7A:
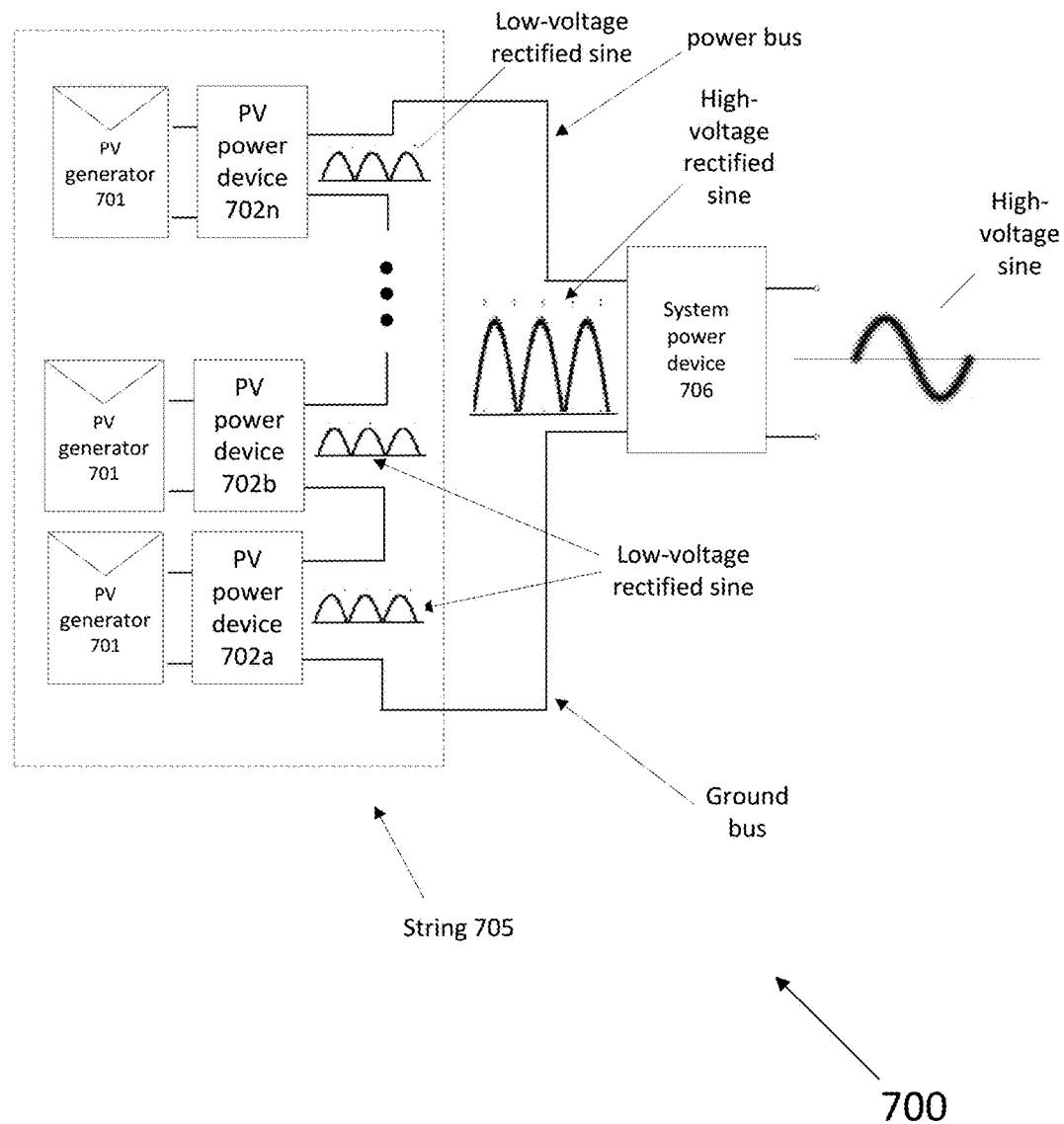
FIGS. 7A-7B illustrate a PV system according to various aspects of the present disclosure.

Reference is now made to FIG. 7A, which shows a photovoltaic system according to another illustrative embodiment in which benefit may be derived by rerouting current portions within a photovoltaic string. System 700 may comprise one or more photovoltaic strings 705 coupled to one another in parallel (only one string is illustrated). Each string may comprise a plurality of PV generators 701 (e.g. 701a, 701b etc.) and PV power devices 702 (e.g. 702a, 702b, etc.). In the embodiment depicted in FIG. 7A, the outputs of each PV generator 701 are coupled across the inputs of a power device 702, and the outputs of the PV power devices are serially coupled to one another to form a photovoltaic serial string. The inputs of each PV power device may receive power from a PV generator, and the outputs of the PV power device deliver power to string 705.

Each power device 702 may include circuitry similar to or the same as circuitry 430 of FIG. 4A. For example, each power device 702 may include a DC/DC converter configured to output a time-varying DC signal which emulates a rectified sine wave, triangular wave, square wave or other wave form which may be later processed and converted to a sine wave. The different power devices may output signals which are identical to one another, or different in shape, magnitude and/or phase. The outputs of the power devices may be summed to form a string voltage signal which is input to system power device 706.

Figure 7B:
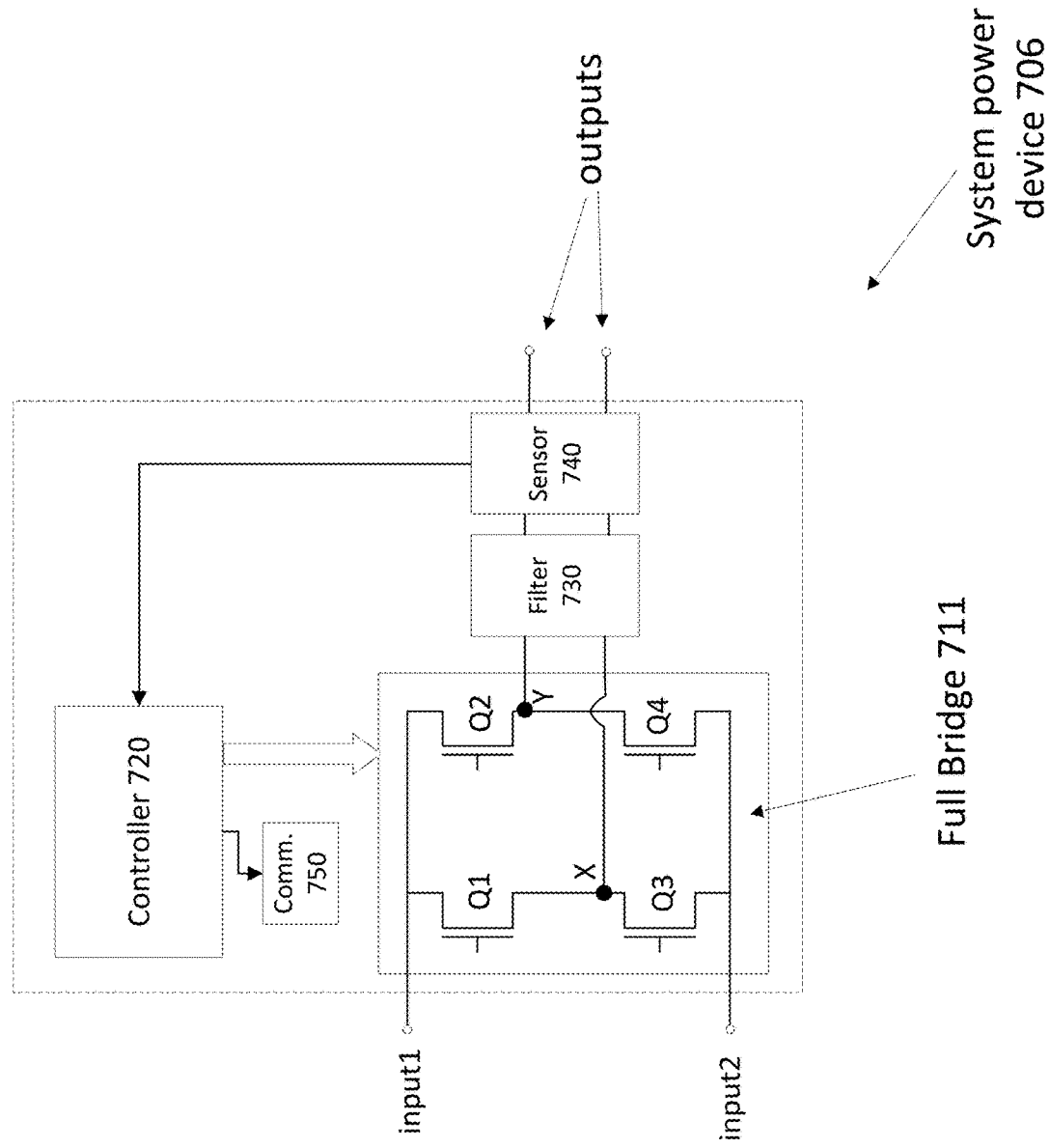

System power device 706 may be configured to receive the string voltage input and output an alternating current (AC) signal such as a sine wave, which may be fed to the grid or home. In the illustrative embodiment depicted in FIG. 7A, each power device 702 outputs a low-voltage rectified sine wave which is synchronized to be in-phase with the rectified sine waves output by the other power devices in the same string. Synchronization may be achieved by a master control device (e.g. a controller 720 and communication device 750 of system power device 706, as depicted in FIG. 7B) commanding the PV power devices to produce a voltage of a certain waveform, and at a certain phase. The synchronized, rectified sine waves may be of a low frequency such as 100 Hz or 120 Hz, and may be summed to form a higher-voltage, rectified sine wave of amplitude about that of the utility grid voltage, such as 311[V] in European systems or 156[V] in the USA.

The voltage output by each power device 702 may be substantially lower than a utility grid voltage. The summed peak output voltages of each group of serially connected power devices 702 may be about the same as a utility grid peak voltage. For example, a string of ten serially connected power devices 702 may have a total peak voltage of about 311V, and the output voltage of each of the ten power devices 702 may output, on average, about 31V.

System power device 706 may configure the output voltage to be appropriate for feeding the grid, home or storage devices. For example, if the string voltage signal is a rectified sine wave of grid-voltage amplitude, system power device 706 may comprise a full-bridge to converter the rectified sine wave to an alternating sine wave. In some embodiments, the string voltage amplitude may be different from grid voltage amplitude, and may be adjusted by circuits and/or devices such as a transformer. In some embodiments, the string voltage may be similar to a triangular or square wave, and filtering may be applied before or after converting the signal from time-varying-DC to AC.

In some embodiments, a plurality of strings 705 may be connected in parallel at the input of system power device 706. Each string 705 may be connected to system power device 706 via a switch (not explicitly shown), the switch being operable to disconnect a string 705 (e.g., an individual string 705 without disconnecting other strings 705) in response to a failure occurring at or in the disconnected string 705 and/or a failure to provide adequate or synchronized power to system power device 706.

In some embodiments, system power device 706 may regulate the voltage across string 705. For example, system power device 706 may set the peak string voltage to a substantially constant value (e.g. a rectified sine voltage signal with a peak value of 350V), with the string current varying according to power available from PV generators 701. The substantially constant peak voltage value may be changed periodically according to operational considerations such as the efficiency of system power device 706 at different input voltages and currents, according to available power, or as part of a safety-response protocol.

In some embodiments, system power device 706 may regulate the current flowing through string 705. For example, system power device 706 may set the string current to a substantially constant value with the string voltage amplitude varying according to power available from PV generators 701. The substantially constant current value may be changed periodically according to operational considerations such as the efficiency of system power device 706 at different input voltages and currents, according to available power, or as part of a safety-response protocol.

Reference is now made to FIG. 7B, which shows a system power device 706 according to illustrative embodiments. System power device 706 may include full bridge 711, controller 720, filter 730 and sensor 740. System power device 706 may further include additional components such as communication device(s), sensor(s)/sensor interfaces, safety and/or disconnect devices(s), monitoring device(s) and/or auxiliary power circuit(s) (not explicitly depicted) similar to or the same as the components of circuitry 430 of FIG. 4A. Full bridge 711 may comprise four switches (e.g. MOSFETs) Q1, Q2, Q3 and Q4, two inputs and two outputs. Q1 may be connected between input1 and X. Q2 may be connected between input1 and Y. Q3 may be connected between input2 and X. Q4 may be connected between input2 and Y.

When switches Q1 and Q4 are ON and switches Q2 and Q3 are OFF, the output terminals may output a signal which is an inversion of the input signal. When switches Q1 and Q4 are OFF and switches Q2 and Q3 are ON, the output terminals may output a signal which is identical to the input signal. If the input signal is a rectified sine wave such as the string voltage of system 700 of FIG. 7A, by inverting every second lobe of the rectified sine wave, an alternating sine wave may be obtained. The switching of the switches Q1-Q4 may be controlled by controller 720. For example, the controller may apply a PWM signal to turn switches Q1 and Q4 OFF and switches Q2 and Q3 ON for the duration of one positive sine lobe, and then reverse the signals (i.e. turn Q1 and Q4 ON and switches Q2 and Q3 OFF) to invert the next sine lobe. Controller 720 may include a microprocessor, Digital Signal Processor (DSP), ASIC, and/or an FPGA. System power device 706 may include filter 730 which may be placed on either the input or output side of the device, to filter higher-order harmonics which may be present in the processed signal. 701 An appropriate filter (e.g. a low-pass LC filter) may reduce higher-order harmonics, creating an output signal which more closely resembles a pure sine wave.

Sensor 740 may comprise a voltage-sensor for measuring the voltage output by system power device 706. In some embodiments, the output of system power device 706 is coupled to a utility grid, and sensor 740 may further measure the grid voltage. Sensor 740 may provide output voltage measurements to controller 720, with controller switching switches Q1-Q4 responsively to the measurements provided by sensor 740. For example, when sensor 740 measures an output voltage of negative polarity, sensor 740 may provide the negative voltage measurements to controller 720, and controller 720 may responsively switch Q1 and Q4 to the ON state and switches Q2 and Q3 to the OFF state. Communication device 750 may be configured to communicate with communication devices deployed in PV power devices, for example, communication devices similar to or the same as communication device 450 of FIG. 4A. For example, if communication device 450 includes a Power Line Communication transceiver, communication device 750 may similarly be a PLC transceiver. If communication device 450 includes a wireless transceiver, communication device 750 may similarly be a wireless transceiver. Communication device 750 may transmit voltage magnitude measurements to PV power devices 702 of FIG. 7A, with each PV power device 702 configured to output a voltage corresponding to the magnitude measurements.

As a numerical example, when sensor 740 measures an output voltage of 100V, communication device 750 may transmit the measurement of 100[V] to PV power devices 702, with each PV power device 702 adjusting its duty cycle to output 100/N [V], where N is the number of serially-connected PV power devices 702. In some embodiments, the total voltage of 100[V] may be split unevenly amongst PV power devices 702, with each PV power device 702 outputting a voltage proportional to the power processed by the respective PV power device, and the total voltage output by all of PV power devices 702 equaling 100[V].

In some illustrative embodiments, two or more system power devices 706 may be deployed in parallel in system 700, reducing the risk of system failure in case of a failure in a single device. While component redundancy often significantly increases system cost, the architecture of system 700 may enable system power device 706 to be implemented using inexpensive circuitry (e.g. low frequency switches Q1-Q4 and/or a controller 720 that does not need expensive processing capabilities), thereby decreasing the cost of adding redundant components to reduce the risk of system failure. By adding a backup system power device 706, system 700 may reduce the number of single points of failure or have no single point of failure, such that a failure of a single device does not cause the entire system to cease producing power. In some embodiments, certain components within system power device 706 may be duplicated for redundancy. For example, system 700 may comprise system power device 706 comprising a single controller 720, a single filter 730 and a single communication device 750, but multiple sensors 740 and full-bridges 711.

Figure 7C:
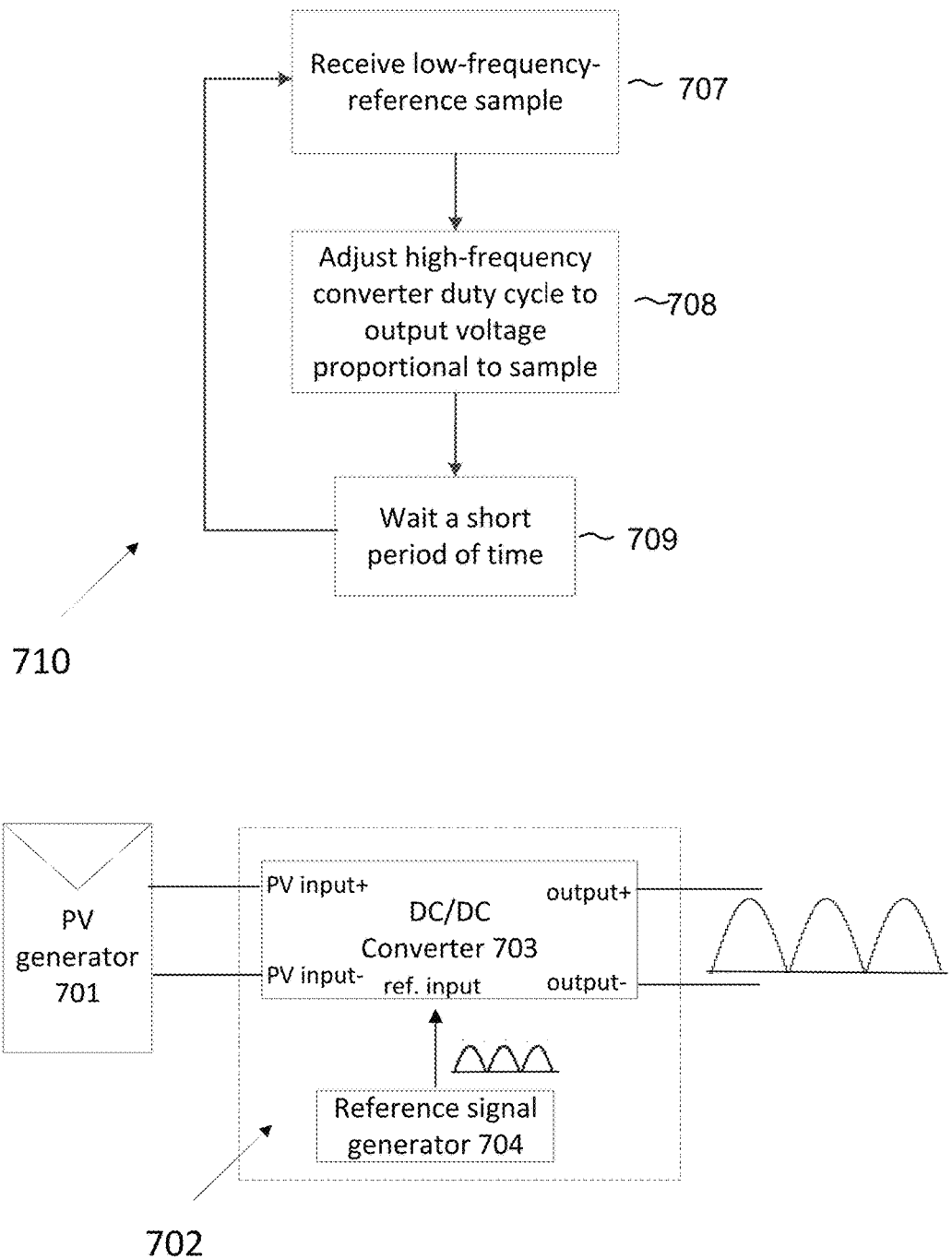
FIG. 7C illustrates a PV system and associated method according to various aspects of the present disclosure.

Reference is now made to FIG. 7C, which shows an illustrative embodiment of generating a pseudo-AC signal which varies over time, for example, a DC output that is varied in amplitude in a step-wise manner to emulate a biased or rectified alternating-current signal. DC/DC converter 703 may receive an input from a DC voltage source such as PV generator 701. In alternative embodiments, PV generator 701 may be replaced in FIGS. 7A and 7C by an alternating current (AC) power source (e.g. a wind turbine), PV power device 702 comprising an alternating current to direct current (AC/DC) rectifying circuit (not explicitly depicted) converting the AC input power to DC power to be input to DC/DC converter 703. Converter 703 may further receive a reference signal from reference signal generator 704, and may attempt to output a voltage signal which is proportional to the reference signal. For example, signal generator 704 may output a rectified sine wave reference with an amplitude of 100 mV, and converter 703 may output a rectified sine which tracks the reference, but with a different amplitude. If converter 703 operates at a frequency significantly higher than the frequency of the reference signal, the tracking can be highly accurate for any reference waveform. For example, the reference signal may be of a low frequency such as 100 Hz or 120 Hz, and the DC/DC converter may operate at a frequency of tens or hundreds of kHz. The converter's high frequency may allow it to stabilize an output voltage rapidly, within a time-frame that is a small fraction of the period of the reference signal.

Reference signal generator 704 may be implemented in various manners. In some embodiments, digital samples may be stored on a memory device (e.g. Read Only Memory (ROM) Random Access Memory (RAM), Flash memory or similar memory devices) coupled to DC/DC converter 703, with a digital sample provided to DC/DC converter 703 at regular intervals. In some embodiments, reference signal generator 704 may comprise an analog oscillator and an analog-to-digital (A/D) converter configured to sample the oscillator and provide a digital sample to DC/DC converter 703. In some embodiments, reference signal generator 704 may be a communication device for receiving reference samples from a different communication device (e.g. communication device 750 of FIG. 7B, transmitting samples measured by sensor 740) and providing them the DC/DC converter 703.

Still referring to FIG. 7C, DC-DC converter 703 may carry out method 710. At step 707, the DC/DC converter may digitally sample the reference signals. At step 708, the DC/DC converter may adjust the duty cycle of its high-frequency switching components to output a voltage which is proportional (according to a predefined ratio) to the reference signal. At step 709, the converter may wait a short time before the next sample is processed. In some embodiments, the short time is predetermined (e.g. the converter may draw a new reference sample from memory or sample an oscillating reference signal after a period of time such as about 10 microseconds or about 100 microseconds). In some embodiments, the method will wait until a new sample is received from an external device, in which case the short time is not predetermined by the converter. In the illustrative embodiment depicted in FIG. 7C, the reference signal is a rectified sine, and the converter output is a rectified sine of a different amplitude. The higher the frequency, the "smoother" the output signal may be (e.g., because the output voltage would be adjusted in smaller time-interval steps).

In illustrative systems such as system 700, it may be desirable for photovoltaic power devices 702 to be configured to output voltage and current signals shaped similarly to one another, to maintain a system power factor close to one. For example, if the voltage signal output by a PV power device is shaped as a triangular wave, to maintain a power factor equal to one the current output may be a triangular wave proportional to the triangular voltage wave (i.e. of the same frequency, and with no phase shift between the two signals). In some embodiments, the output voltage or current is imposed on the power device outputs, requiring the converter device to configure either the voltage or the current to match the imposed signal. Illustrative embodiments may include, but are not limited to, systems comprising PV power devices configured output in-phase voltage and current waveforms, to obtain a power factor close or equal to unity.

Synchronization of PV power devices to output in-phase voltage and current waveforms may be achieved is several ways. In some embodiments, synchronization may be achieved by providing each DC/DC converter with the same reference sample at the same time. For example, communication device 750 of FIG. 7B may transmit a reference sample to an entire string of serially-connected DC/DC converters at the same time, with each DC/DC converter receiving the sample at about the same time and outputting a voltage derived from the same reference sample. In some embodiments, each DC/DC converter may store (e.g. in a memory device) a group of digital samples to be processed in order according to predetermined time intervals, with a trigger received from an external device signaling each converter to restart processing from the first sample.

In some embodiments, DC/DC converter 703 may include a bypass circuit (not explicitly shown) disposed between the DC/DC converter 703 output terminals (denoted output+ and output− in FIG. 7C), and include a controller configured to activate the bypass circuit (e.g. to directly connect the output+ terminal to the output− terminal) in response to a failure by the DC/DC converter to synchronize the converter output to other converter outputs, or in response to a different failure in the converter or in PV generator 701. In response to such failures (or bypassing) of a DC/DC converter 703 in a PV power device 702 (e.g. PV power device 702a of FIG. 7A), other serially-connected PV power devices 702 (e.g. PV power devices 702b-702n) may adjust (e.g. raise) their output voltages to compensate for the failed device.

Figure 7D:
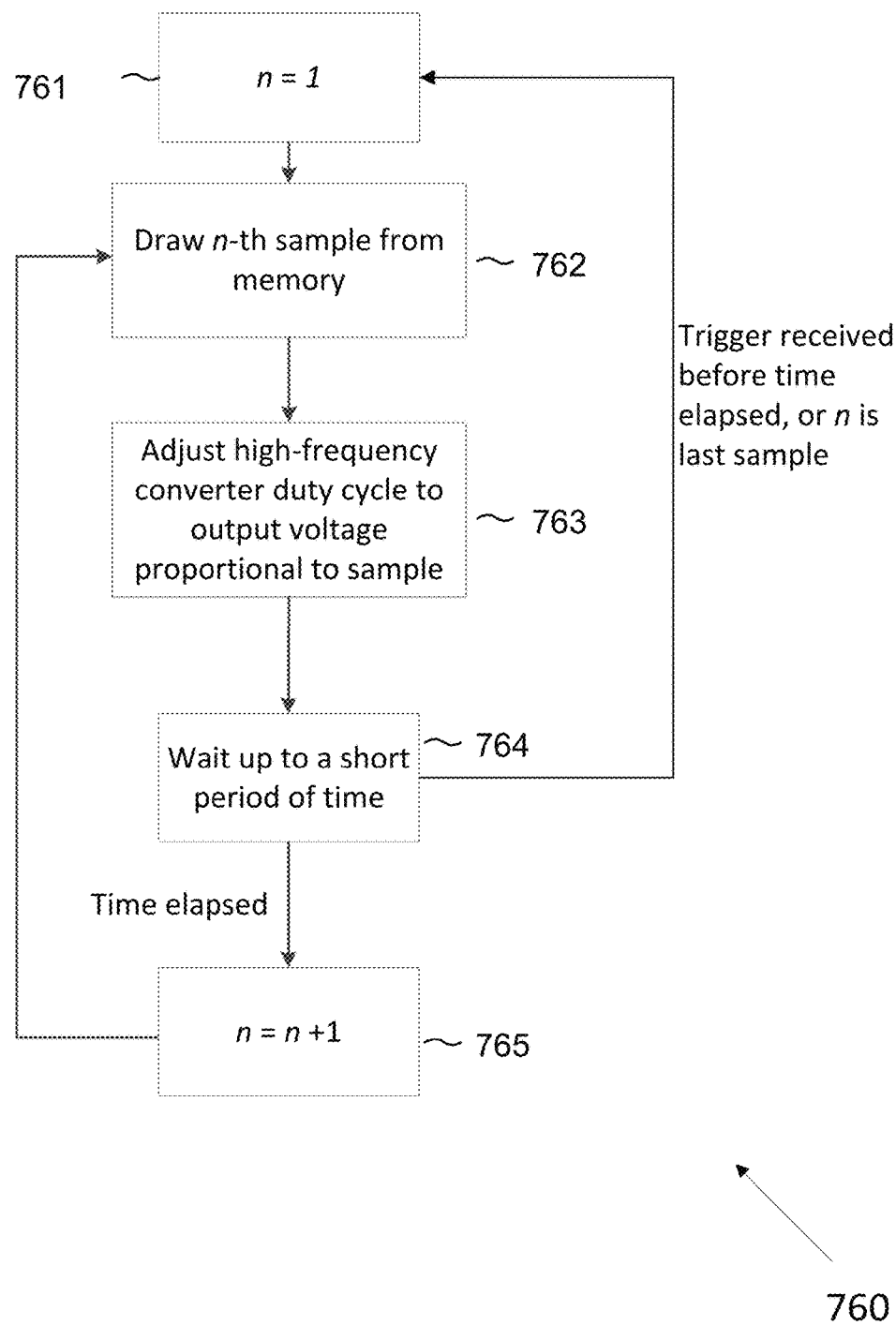
FIG. 7D illustrates a method according to various aspects of the present disclosure.

Reference is now made to FIG. 7D, which shows a method for synchronizing waveforms according to aspects of the present disclosure. Method 760 may be carried out by one PV power device or a plurality of series or parallel connected PV power devices such as PV power devices 702. Each power device may include a memory device storing a sequence of output voltage reference samples. At step 761, the power device may initialize the counter n to the first reference sample. At step 762, the n-th (at the initialization stage, the first) sample is drawn from memory, and at step 763 the power device adjusts the duty cycle of a high-frequency converter to output a voltage proportional to the n-th sample. At step 764, the method may wait up to a predetermined short period of time (e.g. 10 microseconds or 100 microseconds). If the time elapses, the method may increment n at step 765 and loop back to step 762, where a new sample is drawn from memory. If a trigger is received before the predetermined time elapses, the method may loop back to step 761 and reset n to equal 1.

In some embodiments, the trigger may be received from a system control device. For example, a group of serially connected PV power devices 702 may each hold in memory a sequence of 1000 samples corresponding to a single lobe of a rectified sine wave. System power device 706 may be configured to send a trigger via communication device 750 every 10 milliseconds (corresponding to a frequency of 100 Hz), with each PV power device 702 receiving the trigger at about the same time. Upon reception of the trigger, each PV power device may output 0[V], corresponding to the first sample of a rectified sine wave. Each predetermined short period of time at step 764 may be $$\frac{10 \text{ ms}}{1000 \text{ samples}} = 10$$

microseconds per sample. In some embodiments, each PV power device may be configured to set n=1 after the final sample is processed, even without receiving a trigger. The triggers may be used as a timing synchronization backup method, to ensure that the PV power devices are resynchronized at least once per cycle.

Figure 8:
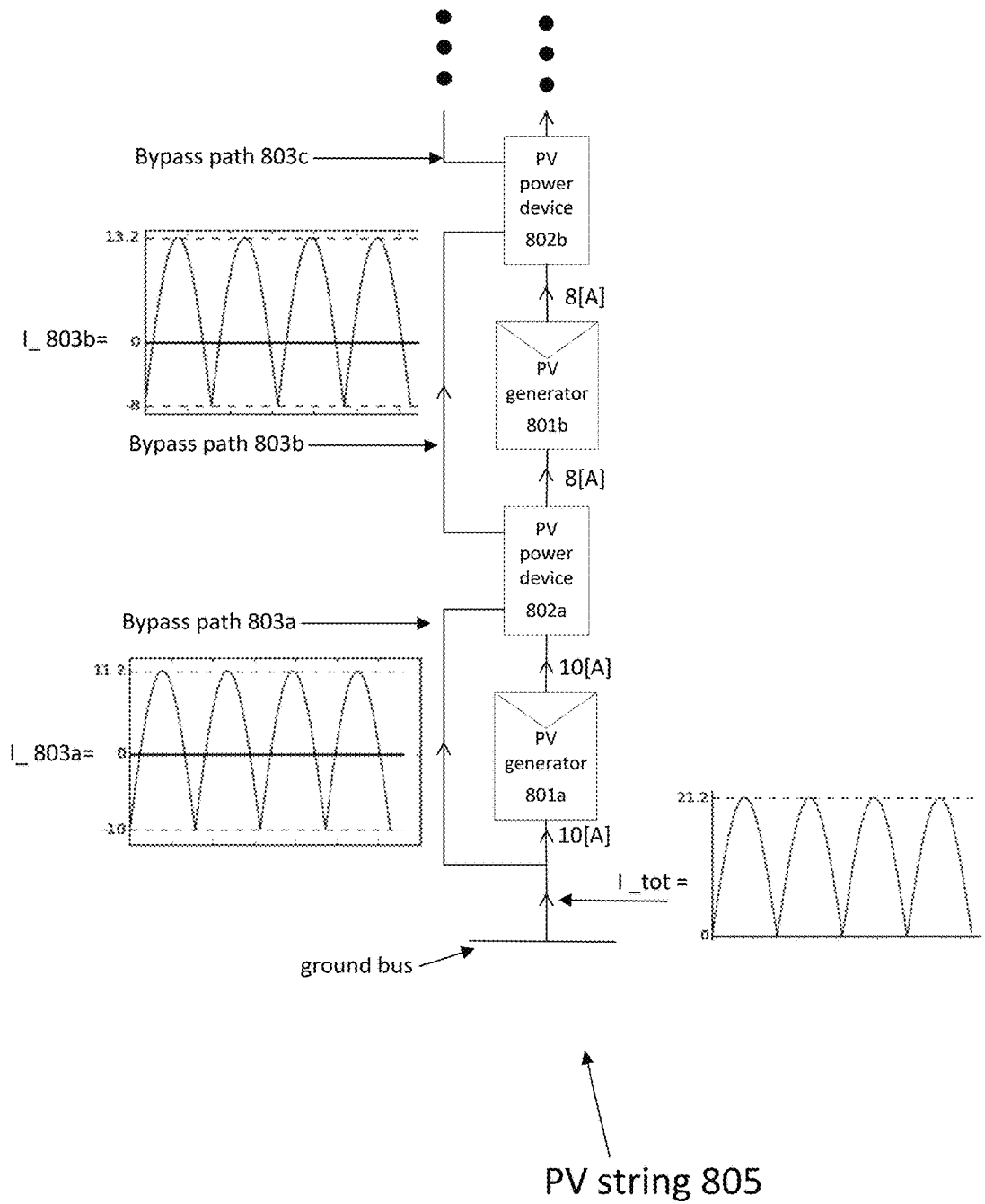
FIGS. 8, '9A and 9B illustrate various components of a PV system according to various aspects of the present disclosure.

Reference is now made to FIG. 8, which shows how illustrative embodiments of conductor splitting techniques may be applied to illustrative systems such as system 700. Photovoltaic string 805 may be part of or the same as other photovoltaic strings disclosed herein, such as photovoltaic string 105 of FIG. 1A. Photovoltaic string 805 may comprise a plurality of photovoltaic generators (e.g. 801a, 801b etc.) and a plurality of photovoltaic power devices 802 (e.g. 802a, 802b etc.). The string current may be a DC current that is varied (e.g., step-wise adjusted), for example, a current of magnitude 15[A](RMS) shaped as a rectified sine wave with a peak amplitude of 21.2[A]. The string current may be divided into two portions, with a first DC portion being routed through photovoltaic generators 502, and a second AC portion being routed along a second route comprising bypass paths 803 (e.g. 803a, 803b etc.), bypassing the PV generators. The two portions may be joined at the bottom of the string by the ground bus, and at the top of the string by the power bus (not shown). By routing a DC portion of the string current through photovoltaic generators, the current flowing through the bypass paths may comprise biased rectified sine waves. The root-mean-square (RMS) of a biased rectified sine current is given by $$I_{RMS} = \sqrt{\frac{A^2}{2} - \frac{4AB}{\pi} + B^2}$$

where A is the amplitude of the rectified sine wave (routed through bypass paths 803) and B is the DC current bias (routed through the PV generators). Similar formulae exist for other current waveforms such as triangular waves. The root-mean-square of an unbiased rectified sine current is given by $$I_{RMS} = \frac{A}{\sqrt{2}}$$

where A is the amplitude of the rectified sine wave. It can be shown that careful selection of the bias B may reduce the RMS of the current flowing through the bypass paths significantly, possibly requiring thinner, cheaper cables compared to those that would be required to carry the entire, unbiased string current.

Selection of the bias B may include a calculation to minimize an RMS value of a current. For example, given a mathematical expression of an RMS current, the derivative of the expression may be calculated parametrically, and a B selected to set the derivative to zero, corresponding to a minimum value. For example, given the RMS value of a rectified sine wave current signal $$I_{RMS} = \sqrt{\frac{A^2}{2} - \frac{4AB}{\pi} + B^2},$$

the minimum value of Iris is calculated to be obtained for $$B = \frac{2A}{\pi}.$$

In some embodiments, where the RMS value of a current may be difficult to calculate analytically, simulation may show various RMS values obtained when varying B, and an appropriate B (e.g. to minimize the current RMS) may be selected.

In some embodiments, B may be selected as to increase the power output by a photovoltaic generator, and A may be accordingly selected to minimize an RMS current value (e.g. by analytic methods or by simulation).

With appropriate selection of conductor sizes for the bypass paths, losses may also be reduced, as explained previously herein. In the illustrative embodiment discussed herein, PV generator 801a carries a DC current of 10[A], with the remainder of the string current, a rectified sine-wave bypassing PV generator 801a via bypass path 803a to PV power device 504a may be biased by 10[A]. PV generator 801b carries a DC current of 8[A], with the remainder of the string current, a 8[A]-biased rectified sine-wave bypassing module 502b via bypass path 803b. PV power devices 802 may comprise similar components and may utilize similar methods to the components and methods discussed herein with regard to power devices 702. The terminals and internal circuitry of power devices 702 may be configured to provide input, common and output voltages similarly to the configurations discussed herein with regard to power devices 102, 202, 302a, 302b, 112, 402, 420, and 502.

Figure 9A:
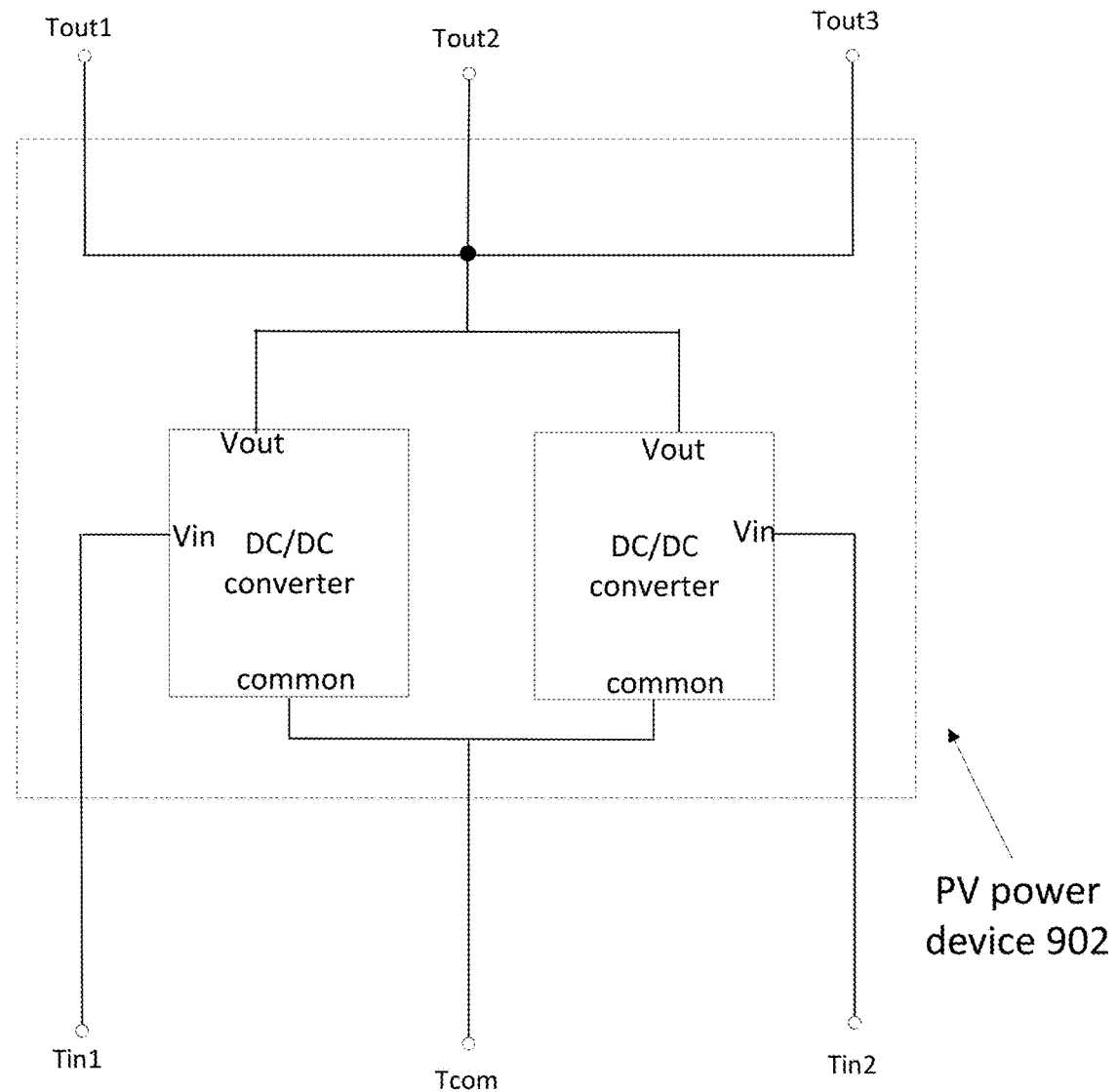

Reference is now made to FIG. 9A, which shows a photovoltaic power device according to illustrative embodiments. Power device 902 may comprise two DC/DC converters. Different types of DC/DC converters may be used, such as Buck, Boost, Buck+Boost, Flyback and/or Forward converters. In some embodiments, the power device may comprise two different types of converters. For example, one converter may be a Buck converter, and the other converter may be a Buck+Boost converter. The two converters may include, for example, 3 terminals: an input terminal, an output terminal and a common voltage terminal. Each converter's input terminal may be configured to be coupled to a separate set of one or more PV generators. For example, terminal Tin1 may be coupled to the input of one DC/DC converter, and may be configured to be coupled to a first set of one or more PV generators. Terminal Tin2 may be coupled to the input of the other DC/DC converter, and may be configured to be coupled to a second set of one or more PV generators. The converters' common terminals may be coupled to one another and made available via external terminal Tcom. The converters' output terminals may be coupled to one another, with the converters being configured to process the input voltages to allow matching and coupling of output voltages. The coupled output terminals may then be split into three externally available output terminals Tout1, Tout2 and Tout3, with each terminal capable of carrying a portion of a total photovoltaic string current. In some embodiments, power device 902 may comprise more than two converters, may be coupled to more than two sets of photovoltaic generators, and may feature a different number of externally available terminals. In some embodiments, a plurality of photovoltaic power devices may be coupled to one another using conductors of predetermined length at the time of manufacturing, packaged and sold as a single unit, and deployed as a single unit when installing a photovoltaic system.

Figure 9B:
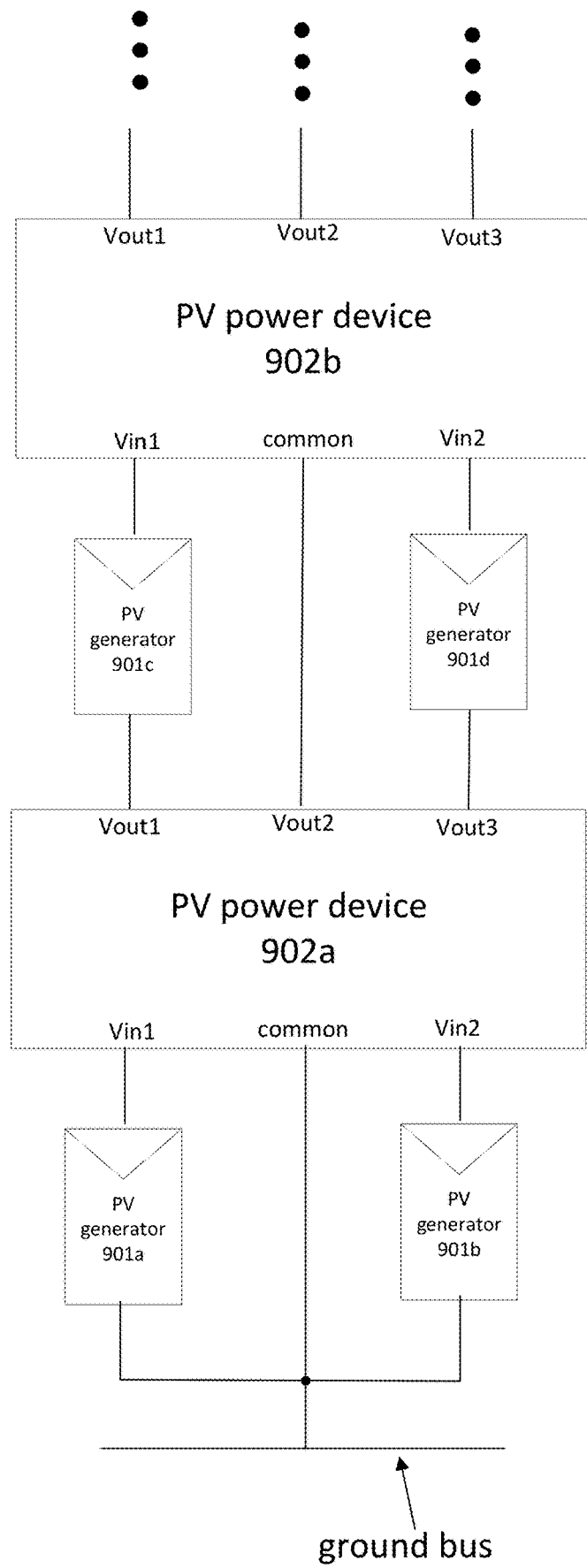

Reference is now made to FIG. 9B, which shows a portion of a photovoltaic string according to illustrative embodiments. Photovoltaic generators 901a and 901b may have their negative output terminals coupled to the string ground bus, and have their positive output terminals coupled to the Vin1 and Vin2 terminals of PV power device 902a. PV power device 902a's common terminal may also be coupled to the ground bus. Output terminals Vout1 and Vout3 of power device 902a may be coupled to the negative output terminals of additional PV generators 901c and 901d, respectively. Power device 902a may be coupled to the next power device in the string, 902b, by coupling output terminal Vout2 of device 902a to the common terminal of device 902b. Additional PV generators and power devices may be connected similar to the manner described herein to form a photovoltaic string. The three output terminals of the final power device in the string may be coupled to a power bus (not shown). Using the cabling scheme described herein allows the string current to be split along three paths, potentially reducing system losses and allowing cheaper conductors to be used for some of the conduction paths. The portion of the photovoltaic string illustrated in FIG. 9B may be included in photovoltaic installation 100 in place of string 105.

Figure 10A:
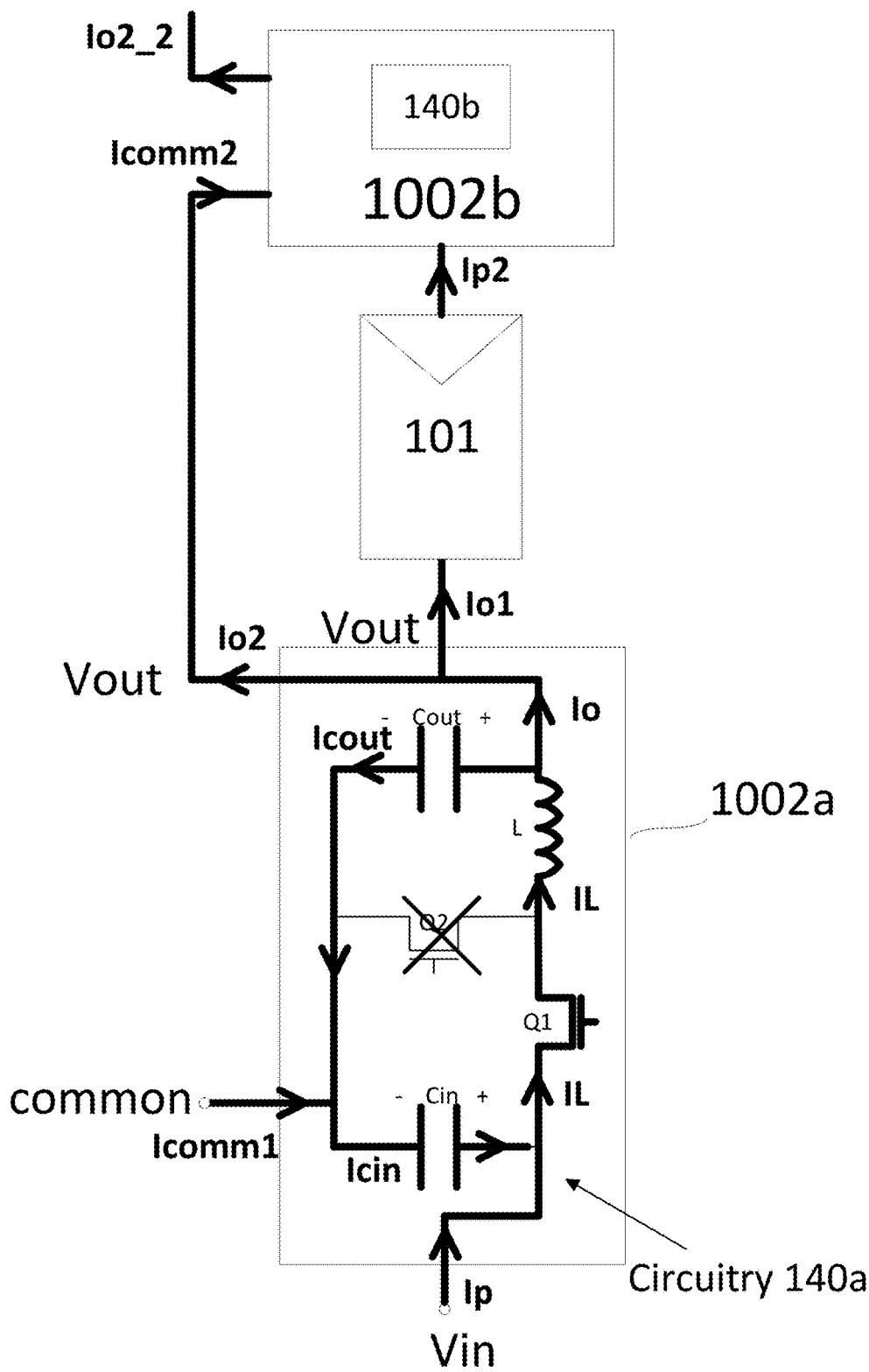
FIGS. 10A-10G illustrate operational aspects of a PV system according to various aspects of the present disclosure.

Reference is now made to FIG. 10A, which shows PV power device 1002a comprising circuitry 140a. PV power device may be the same as or similar to previously described photovoltaic power devices according to various illustrative embodiments (e.g., PV power device 102 of FIGS. 1A-1D, PV power device 402 of FIG. 4A-4B, PV power device 502 of FIG. 5, etc.). Circuitry 140a may be similar to or the same as circuitry of FIG. 3A. FIG. 10A depicts the current flowing in the branches of circuitry 140a when switch Q2 is OFF and Q1 is ON. Current Icomm1 flows into the circuitry from the common terminal and current Ip flows into the circuitry from the Vin terminal. Current IL flows through switch Q1 and inductor L, and the current Io is split into two portions, Io1 and Io2, which flow through the two Vout terminals, respectively. The currents Icin and Icout flow through the capacitors Cin and Cout, respectively. According to the denoted capacitor voltage polarities, Cin is discharging, and Cout is charging. The voltage drop across inductor L is about (i.e. assuming negligible voltage drop over switch Q1) Vout-Vin, which in this illustrative embodiment will be negative (since the circuitry comprises a buck converter), leading to a reduction in the current flowing through inductor L. According to Kirchoff's Current Law (KCL), the following relationships hold:

$$Icin = Icomm1 + Icout$$

$$IL = Ip + Icin$$

$$Icout = IL - Io$$

$$Io = Io1 + Io2.$$

Current Io1 flows through a PV generator 101 and into PV power device 1002b comprising circuitry 140b, which may be similar to or the same as circuitry 140a. If no current leaks out of PV generator 101, then Ip2=Io1. Similarly, Io2=Icomm2, i.e. one of the output current portions of circuitry 140a becomes input current at the common terminal of PV power device circuitry 140b.

Figure 10B:
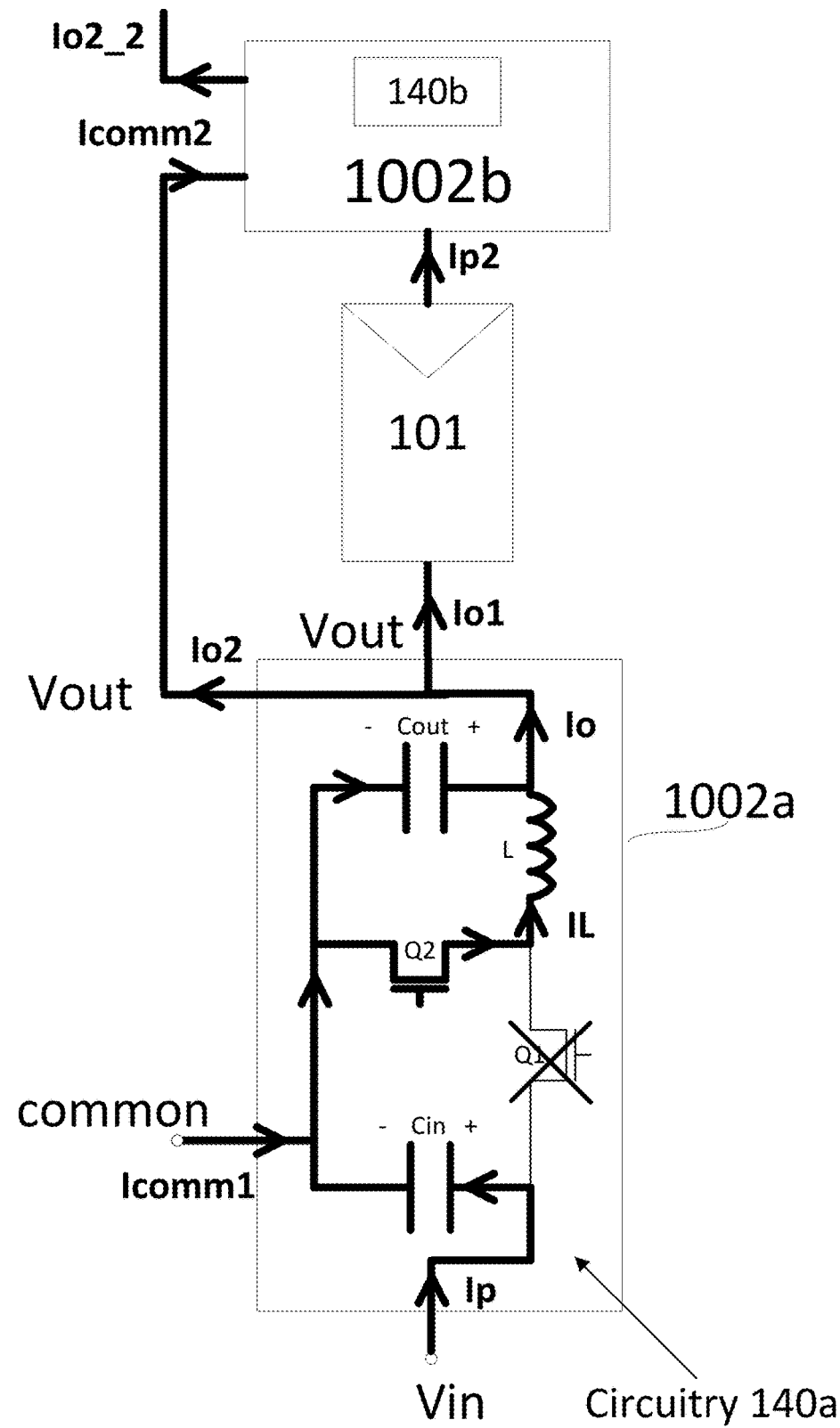

Reference is now made to FIG. 10B, which shows circuitry 140a when switch Q1 is OFF and switch Q2 is ON. According to the denoted capacitor voltage polarities, Cin is charging, and Cout is discharging. The voltage drop across inductor L is Vout, which is a positive quantity, leading to an increase in the current flowing through inductor L. The increase in inductor current when Q2 is ON compensates for the decrease in inductor current when Q2 is OFF, and the DC current flowing through inductor L is about constant under constant operating conditions (e.g. no change in the solar irradiance, the performance of the PV generators or in the load connected to the photovoltaic system).

Figure 10C:
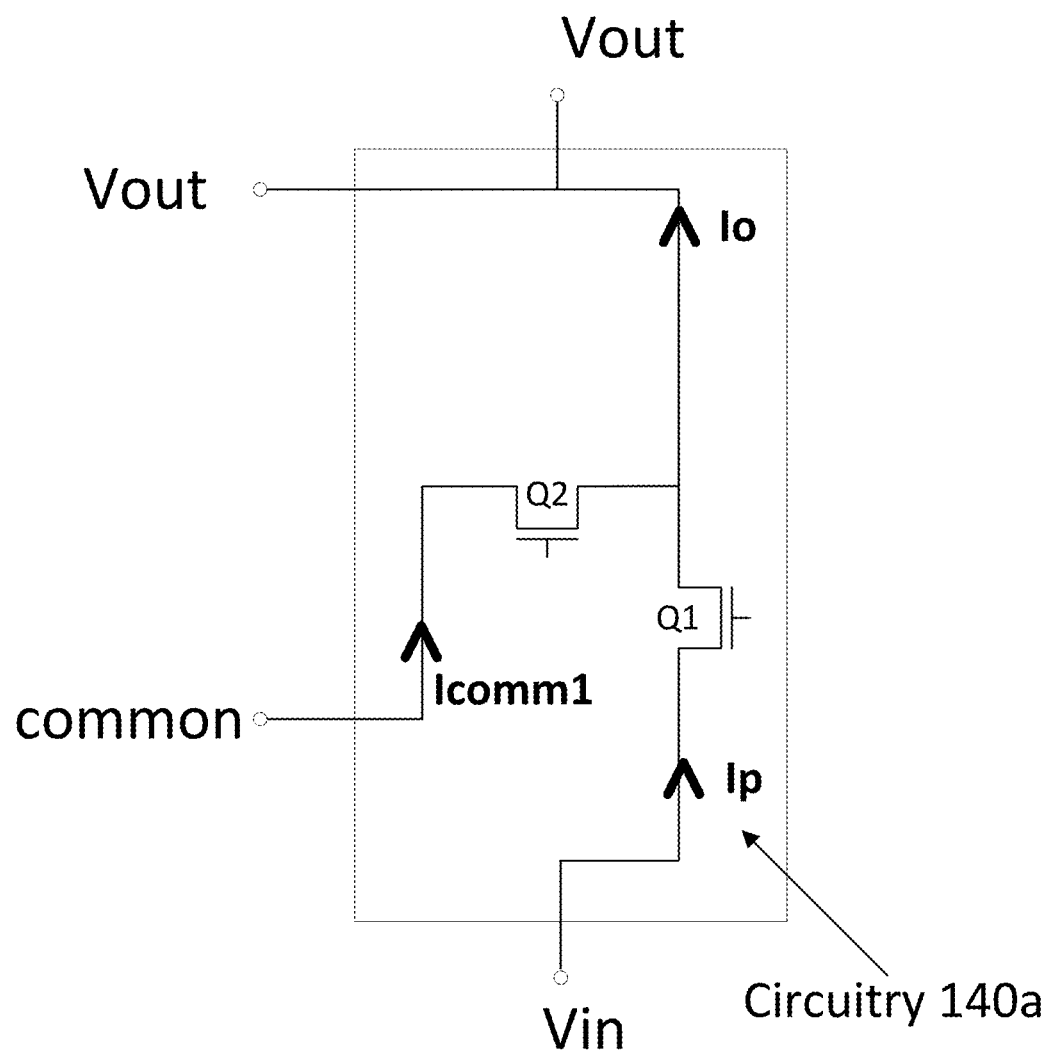

Reference is now made to FIG. 10C, which shows a DC-equivalent circuit of circuitry 140a according to the illustrative embodiments of FIGS. 10A and 10B. The inductor L has been replaced with a short-circuit, and the capacitors Cin and Cout have been replaced by open circuits, in accordance with common practice when obtaining equivalent DC-models of electrical circuits. Under the operating condition where Q1 and Q2 are switched in opposing states (e.g., Q2 is off when Q1 is on, and Q2 is off when Q1 is on), D denotes the duty cycle of switch Q1, i.e. the relative portion of each switching cycle in which Q1 is ON (e.g. D=0.2 corresponds to Q1 being ON %20 of the time, and Q2 being on %80 of the time), then the DC current Io can be expressed as $I_o = D \cdot I_p + (1-D) \cdot I_{comm1}$.

Figure 10D:
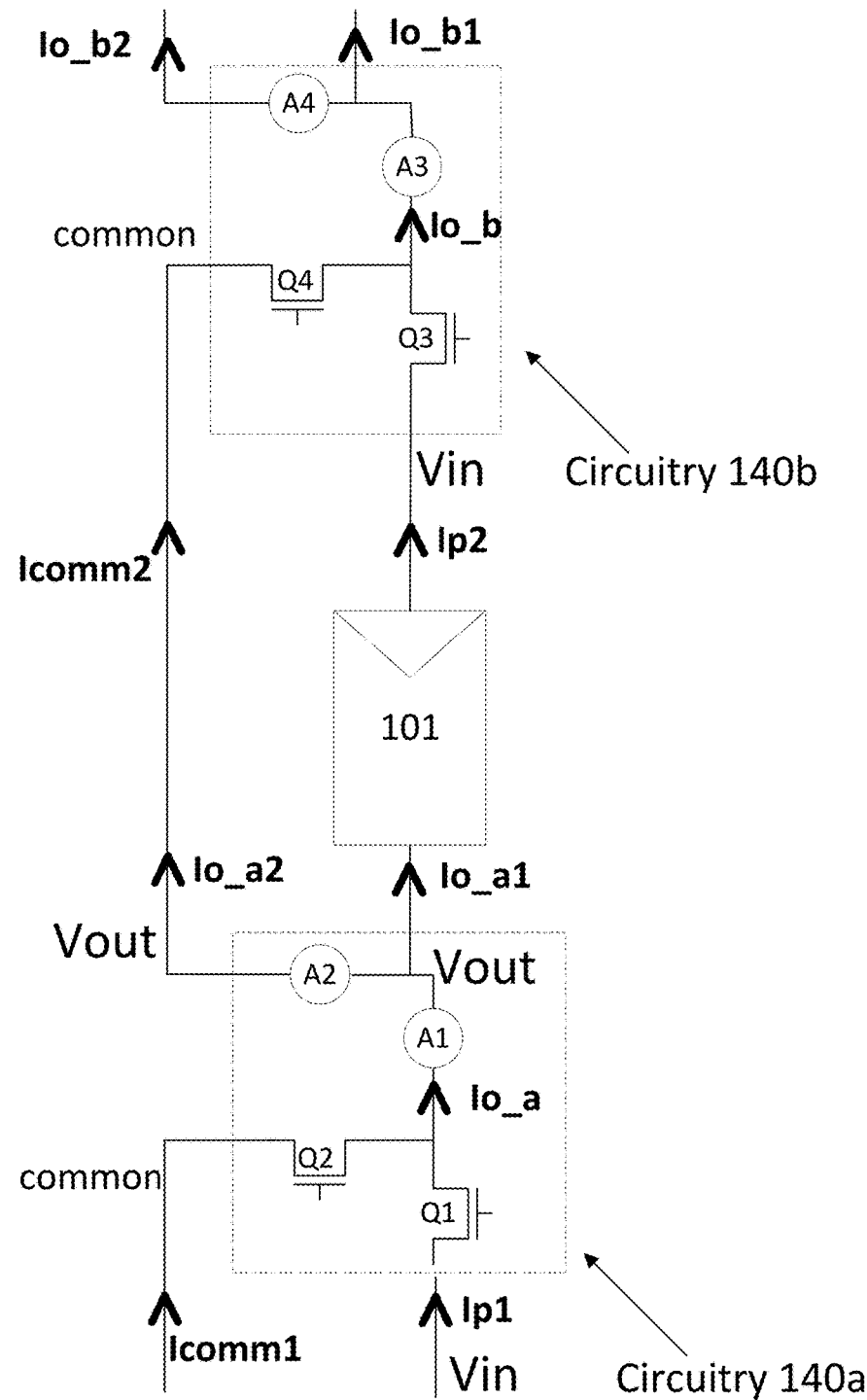

Reference is now made to FIG. 10D, which shows a DC-equivalent circuit of serially-connected circuitry 140a and 140b. Output current Io_a1 of circuitry 140a is coupled (e.g. connected) to PV generator 101, with PV generator outputting current Ip2 to the Vin terminal of circuitry 140b. If little or no current leaks out of PV generator 101, then Io_a1≈Ip2. Similarly, Io_a2=Icomm2. Ammeters A1, A2, A3 and A4 may measure the DC components of currents Io_a, Io_a2, Io_b and Io_b2, respectively. Currents Io_a1 and Io_b1 may be readily computed by the results as Io_b1=Io_b−Io_b2, and Io_a1=Io_a−Io_a2. Ammeters A1 and A2 may be part of a power device (e.g. power device 402 of FIG. 4A) and may be coupled to a control device and to a communication device (e.g. control device 470 and communication device 450 of FIG. 4A, where circuitry 140a may be part of power converter 440). Similarly, ammeters A3 and A4 may be part of a different power device (e.g. a second power device 402 of FIG. 4A) coupled to a control device and may be to a communication device (e.g. control device 470 and communication device 450 of FIG. 4A, where circuitry 140b may be part of power converter 440).

Still referring to DC-analysis of the circuitry of FIG. 10D, the absence of electrical storage devices (and assuming no current leakage) leads to the equations Ip1+Icomm1=Io_a=Io_a1+Io_a2=Ip2+Icomm2=Io_b=Io_b1+Io_b2. Switch Q4 is serially connected to ammeter A2. Similarly, switch Q3 is serially connected to PV generator 101, which carries current Io_a1. As mentioned above, Io_a1 is calculated as Io_a1=Io_a−Io_a2, with Io_a and Io_a2 directly measured by ammeters A1 and A2, respectively. In some embodiments, Io_a1 may be directly measured, along with Io_a and/or Io_a2. If Io_a1 and one of either Io_a or Io_a2 are directly measured, then the unmeasured current may be calculated using the two measured currents.

Still referring to FIG. 10D, varying the duty cycles of switches Q3 and Q4 may affect the DC current measurements of ammeters A1 and A2. As a numerical example, if Io_b=Io_a=15[A], and a duty cycle of D=0.5 is selected for the operation of switch Q4, then the equation 15 A=$I_{o\_b}$=0.5·$I_{comm2}$+0.5·$I_{p2}$ will hold. If the duty cycle is changed from 0.5 to 0.2, then the new equation will be 15 A=$I_{o\_b}$=0.2·$I'_{comm2}$+0.8·$I'_{p2}$. Therefore (unless, coincidentally, $I_{comm2}$=$I_{p2}$, but that condition can be easily avoided by selecting a duty cycle for switch Q1 which creates an inequality), $I'_{comm2}$≠$I_{comm2}$ and $I'_{p2}$≠$I_{p2}$ will hold, and varying the duty cycles of switches Q3 and Q4 of circuitry 140b may cause the DC current readings of ammeters A1 and A2 of circuitry 140a to change.

Figure 10E:
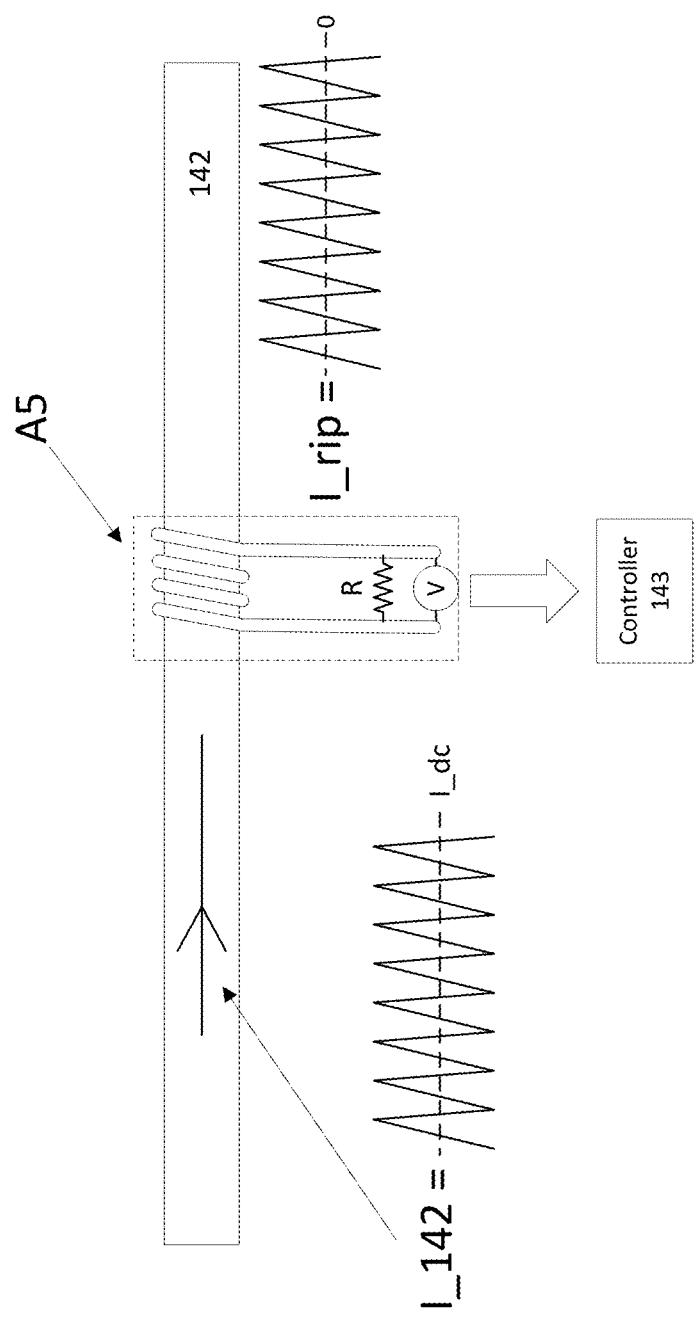

Reference is now made to FIG. 10E, which illustrates an apparatus for detecting alternating-current components in the current flowing through system conductors according to illustrative embodiments. Conductor 142 may be a conductor carrying current I_142, which may be similar to or the same as currents IL, Io, Io1 or Io2 of FIG. 10B. Current I_142 may include a direct-current (DC) component which may correspond to a DC current such as Io_a, Io_a1 or Io_a2 of FIG. 10D. Current I_142 may further include an alternating-current (AC) component I_rip caused by variations in the current flowing through a power-converter inductor (e.g. inductor L of circuitry 140a in FIG. 10B). Ammeter A5 may be coupled to conductor 142 and may be configured to measure the AC-current component I_rip of current I_142. According to one illustrative embodiment, ammeter A5 comprises windings wound around conductor 142 and coupled (e.g. connected) to resistor R. According to Faraday's Law of Induction, the voltage measured across resistor R will be proportional to the change in magnetic flux through the windings, which in turn will be proportional to the current flowing through the windings. In some embodiments, a different type of AC-ammeter may be used, such as a hall effect sensor.

The current I_rip measured by ammeter A5 may depend on the amplitude, frequency, and duty cycle of the AC-component of the current flowing through conductor 142. For example, if the AC component of current I_142 has a high frequency (e.g. tens or hundreds of kHz, or MHz), ammeter A5 may detect a corresponding high frequency in current I_rip. Similarly, the positive and negative slopes of a triangular current waveform may be calculated by ammeter A5. In some embodiments, ammeter A5 provides current measurements to controller 143, with controller 143 calculating the frequency, slope values and amplitude of the corresponding triangular waveform. Controller 143 may be similar to or the same as control device 270 of FIG. 4A.

Figure 10F:
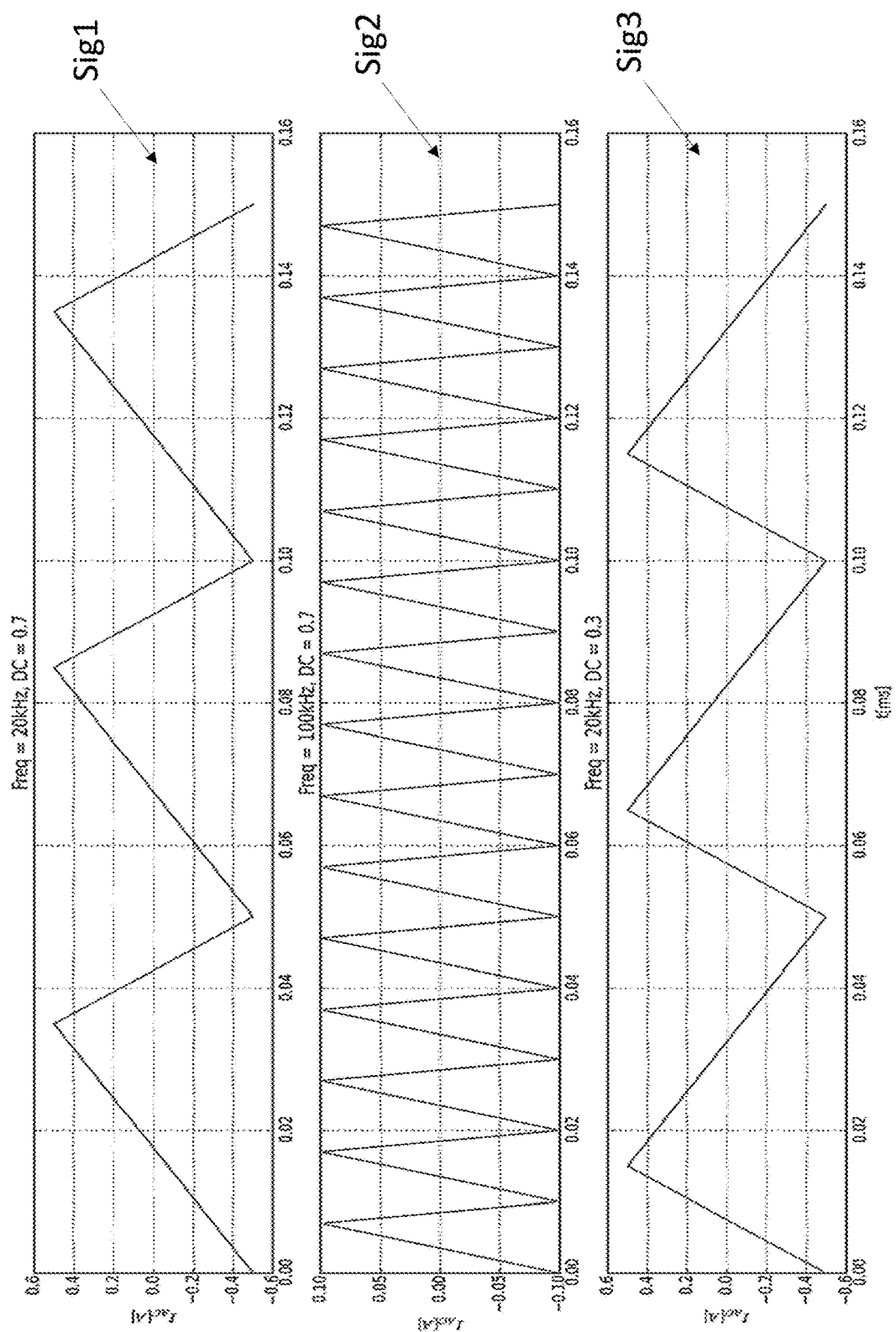

Reference is now made to FIG. 10F, which illustrates various alternating current signals which may be generated by controlling the switching of switches Q1-Q4 of FIG. 10D. Sig1 is a 20 kHz triangular wave with an amplitude of 1Vp-p, a rising slope of $$\frac{1A}{3.5 \text{ ms}} \approx 286 \left[ \frac{A}{\text{sec}} \right]$$

and a falling slope of $$\frac{-1A}{1.5 \text{ ms}} \approx -667 \left[ \frac{A}{\text{sec}} \right].$$

Sig2 is a 100 kHz triangular wave with an amplitude of 0.2Vp-p, a rising slope of $$\frac{-0.2A}{0.3 \text{ ms}} \approx -667 \left[ \frac{A}{\text{sec}} \right].$$

and a falling slope of $$\frac{0.2A}{0.7 \text{ ms}} \approx 286 \left[ \frac{A}{\text{sec}} \right]$$

It is evident that Sig1 and Sig2 have essentially the same shape and slope values, indicating that they are generated by switches switching at similar duty cycles. However, Sig2 is of a frequency larger by a factor of five than the frequency of Sig1, and the ripple amplitude is correspondingly smaller by a factor of five. Sig1 may represent a current measured by AC ammeter A2 when operating the circuit of FIG. 10B, switching switch Q3 at a frequency of 20 kHz and a duty cycle of 0.7. When the frequency of Q3 is increased to 100 kHz, the current measured by ammeter A2 corresponds to Sig 2. If the switching frequency of Q3 is maintained at 20 kHz, but the duty cycle is changed from 0.7 to 0.3, ammeter A2 measures a current corresponding to Sig3, which has a positive slope of $$\approx 667 \left[ \frac{A}{\sec} \right]$$

and a negative slope of $$\approx -286 \left[ \frac{A}{\sec} \right].$$

In various embodiments, either a DC-current ammeter or an AC-current ammeter (e.g. ammeter A2) deployed in a first power device circuitry (e.g. circuitry 140b) may detect changes in current by changing the switching duty cycle of a switch (e.g. Q3) deployed in a second power device circuitry (e.g. circuitry 140a).

Figure 10G:
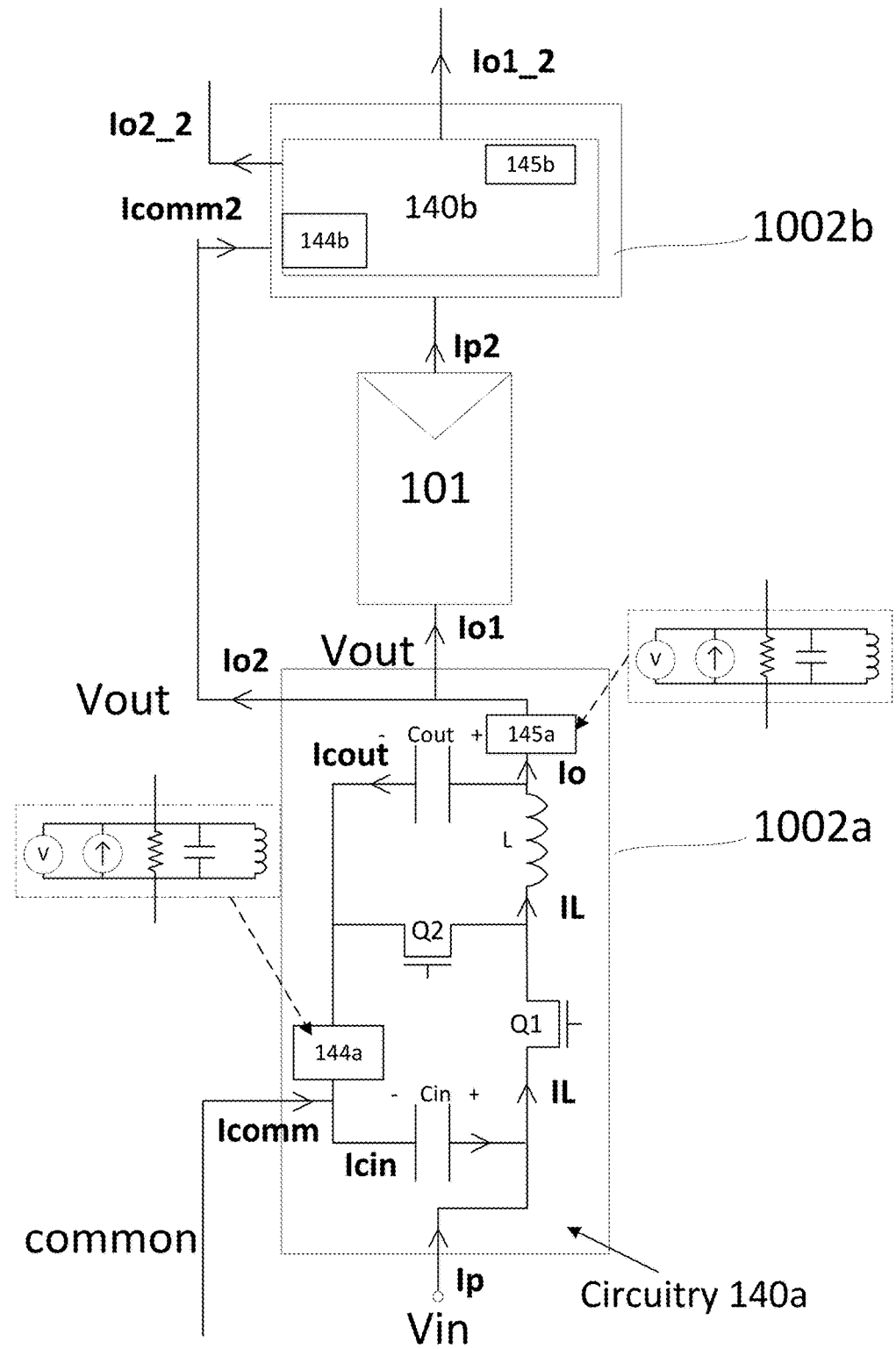

Reference is now made to FIG. 10G, which illustrates PV power device circuitry according to illustrative embodiments. Power line communication (PLC) circuit 144a may be deployed in circuitry 140a, between the common terminal and the negative node of output capacitor Cout. PLC circuit 145a may be deployed in circuitry 140a, between the Vout terminals and the positive node of output capacitor Cout. PLC circuits 144b and 145b may be similarly deployed in PV power device circuitry 140b. PLC circuits 144a-b and 145a-b may be variously implemented. In one embodiment, each PLC circuit comprises a parallel circuit comprising a resistor, an inductor, a capacitor, a current source and a voltmeter. The inductor and capacitor sizes are selected to resonate at a resonance frequency, with the equivalent circuit impedance achieving a maximum value at the resonance frequency. The current source of each PLC circuit injects a high-frequency (e.g. tens or hundreds of KHz) current signal into the PV power device circuitry, with a portion of the current signal reaching the other PLC devices, inducing a high-frequency voltage across the resistor terminals and measured by the voltmeter.

Implementation of Power Line Communications (PLC) over a conventional serial string of photovoltaic power devices may be challenging due to the presence of inductors (e.g. inductor L of circuitry 140a) which inherently suppress high-frequency current signals. This challenge is generally overcome by broadcasting current signals at a high enough amplitude to enable signal detection even after the attenuation caused by inductors. However, point-to-point PLC over serial strings of PV power devices includes the additional challenge of differentiating between current signals generated by different PV power devices. For example, in a string comprising ten serially-connected PV power devices, a current signal broadcast by a first PV power device may be received by the other nine power devices at about the same amplitude, making it difficult to determine the relative order of PV power devices with respect to one another.

By coupling an output of a first to PV power device to an input of an adjacent PV power device, the novel cabling method described herein may enable point-to-point PLC between adjacent PV power devices that is unimpeded by inductors. In the illustrative embodiment of FIG. 10G, PLC circuit 145a of circuitry 140a is coupled to PLC circuit 144b of circuitry 140b with no inductor disposed between them. Because there is no inductor between PLC circuits 145a and 144b, PLC circuit 145a may receive a high-frequency current signal transmitted by PLC circuit 144b at a higher amplitude than the signal amplitude received by other PLC circuits included in the serial string. Similarly, PLC circuit 144b may receive a high-frequency current signal transmitted by PLC circuit 145a at a higher amplitude than the signal amplitude received by other PLC circuits included in the serial string. The increased PLC signal amplitude detected by an adjacent PV power device enables each PV power device to determine which device(s) are its "neighbors," e.g., directly adjacently connected.

As mentioned above, in some illustrative embodiments (e.g. the circuitry of FIG. 10D) PV power device circuitry may enable one-way adjacency determination even without specialized PLC circuitry. For example, PV power device circuitry 140a may determine that it is connected to circuitry 140b by on knowing the duty cycle which each serially connected PV power device is being operated at and measuring the currents Io_a1 and Io_a2. However, circuitry 140b might not be able to determine that it is connected to 140a, rather, it may determine that it is connected to the next PV power device in the string (e.g. 140c, not explicitly depicted). By adding PLC circuitry (e.g. as depicted in FIG. 10G), the adjacency determination may be two-way.

Various aspects include mapping the location of power devices in photovoltaic installations, as well as various methods and apparatuses for carrying out localization algorithms. The circuitry disclosed in FIGS. 10A-10G may enable certain PV power devices to determine which other PV power devices are directly connected to them if they are provided with information regarding the operating state of neighboring PV power devices. Aggregation of the determinations made by each PV power device in a serial string of PV power devices may enable a full map to be generated, the map including location information for each PV power device.

Figure 11A:
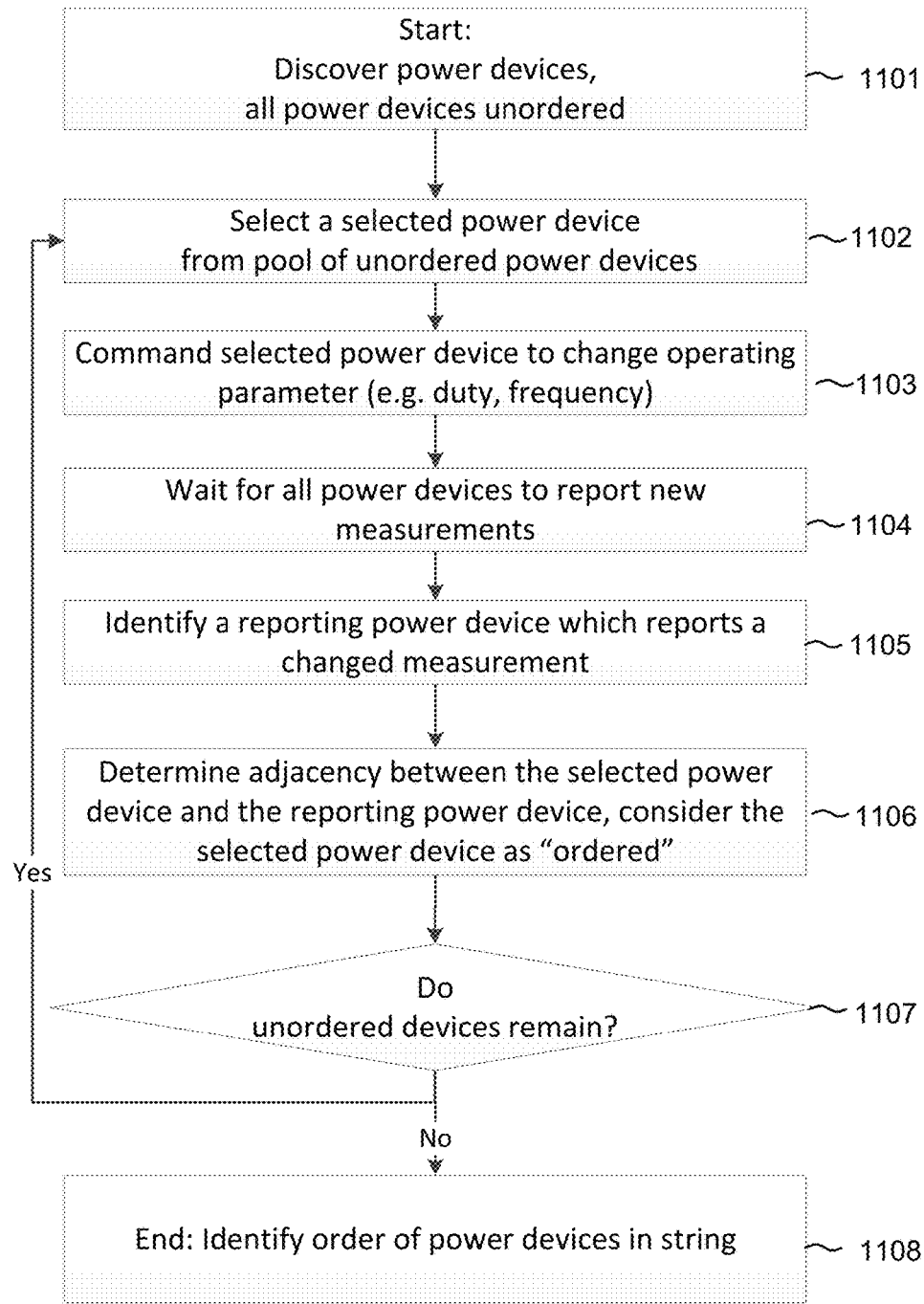
FIGS. 11A-11C illustrate methods of operating and associated states of a PV system according to various aspects of the present disclosure.

Reference is now made to FIG. 11A, which depicts an illustrative method for determining the order of serially coupled PV power devices comprising a photovoltaic string. Method 1100 may be applied to photovoltaic strings comprising PV power devices and circuitry according to illustrative embodiments (e.g. string 105 of FIG. 1A, which may comprise PV power devices 102 having circuitry similar to or the same as circuitry 140a of FIGS. 10A-10D, 10G). Method 1100 may be carried out by a control device in communication with PV power devices. For example, the method may be carried out by system power device 106 of FIG. 1A, system power device 606 of FIG. 6, system power device 1006 of FIG. 11B, or system power device 706 of FIGS. 7A-7B, with control and communication devices (e.g. devices comprised by system power device 110 of FIG. 1A, or controller 720 and communication device 750 of FIG. 7B) carrying out the method steps. In an alternative embodiment, a PV power device (e.g. PV power device 402 or 420 of FIGS. 4a-4c) may operate in a "master mode" and carry out method 1100 with regard to the other PV power devices comprised by the PV string.

At step 1101, the method is initialized The control device carrying out method may discover PV power devices in a photovoltaic string, e.g. by receiving unique ID numbers of the PV power devices comprises by string. As an illustrative example, each PV power device may transmit a telemetry (e.g. by a wireless transmitter, or by power line communications) to the system power device, the telemetry including the PV power device's unique ID. The system power device may store the PV power devices' ID numbers to memory.

In some embodiments, the control device carrying out the method may have a list of PV power devices comprised in the PV string. For example, the control device may have PV power device identification numbers stored to memory. The method may identify an order in which the PV power devices are connected, with all serially coupled PV power devices initially unordered (i.e., there is no available information regarding the sequential order in which PV power devices are arranged. For example, for every pair of a first PV power device and a second PV power device in a serial PV string, it might not be known if the first PV power device is coupled closer to a ground bus than the second PV power device, or if the second PV power device is coupled closer to the ground bus than the first PV power device). At step 1102, a device (e.g., 706) may select one of the PV power devices as a selected power device which has not yet been ordered (i.e. its sequential order in relation to a different PV power device has not been determined). The first time step 1102 is reached, all PV power devices in the string may be candidates for selection as the selected power device. In subsequent iterations of a portion of the method, step 1102 may select a selected power device from a shrinking pool of power devices, since at each iteration, a selected power device may be classified as "ordered" and might not be a candidate for selection at the next iteration.

At step 1103, the device performing the method may command the selected power device to change an operational parameter. For example, the selected power device may comprise switches (e.g., the selected power device may comprise circuitry such as circuitry 140b of FIG. 10D, including switches Q3 and Q4), and at step 1103, the selected power device may be commanded to change a duty cycle or frequency of a switching signal. The command to change an operational parameter may be issued by a system power device, and the transmitted command may include an ID number of the selected power device. In some embodiments, the command is received by some or all of the PV power devices, but may be ignored by all PV power devices not having the ID number indicated by the command (i.e. all PV power devices which are not the selected power device).

In illustrative PV systems, PV power devices comprising a PV string may periodically transmit reports and/or telemetries to system power devices. For example, with reference to FIG. 4A, communication device 250 may periodically transmit measurements (e.g. current, voltage, temperature and/or irradiance measurements) taken by sensor/sensor interfaces 280 to a system power device. At step 1104, the system power device carrying out method 1100 may wait to receive measurements from some or all of the PV power devices comprising the PV string. One or more of the PV power devices may report measurements which indicate that they are adjacent to the selected power device.

As an illustrative example, the selected power device may comprise circuitry 140b of FIG. 10D. Prior to step 1103, switch Q3 may be switched at a duty cycle of 0.7, and the power device comprising circuitry 140a may periodically report (e.g. to a system power device) the DC current measured by ammeters A1 and A2. As explained previously, the DC current measured by ammeter A2 may reflect the duty cycle of switch Q3. At step 1103, the selected power device may be commanded by a system power device to change the duty cycle of switch Q3 from 0.7 to 0.3. The change in duty cycle may be reflected by measurements taken by ammeter A2, and at step 1104, the new measurements may be received by a system power device from the power devices.

At step 1105, the system power device may compare measurements received from PV power devices to previously received measurements, and may detect the change in measurements received from circuitry 140b. In response to detecting the change in measurements received from circuitry 140b, the method may determine that circuitry 140b is adjacent to the selected power device, determine that circuitry 140b is comprised by a second, reporting power device adjacent to the selected power device, and uniquely identify the reporting power device (e.g. identified by its associated unique ID number) as being adjacent to the selected power device (e.g., as identified by its associated unique ID number).

At step 1106, the system power device carrying out method 1100 method may consider the selected power device as "ordered" and remove it from the pool of unordered devices. The method may save to memory an indication that the selected power device is adjacent to the reporting power device. As the method iterates through steps 1102-1107, the method may create a table mapping selected PV power devices to their "neighbors", i.e. one or more adjacent PV power devices.

At step 1107, if unordered devices remain, the method may loop back to step 1102. If no unordered devices remain, the method may proceed to step 1108, and aggregate the results stored when iterating over steps 1102-1107. The results stored by the time step 1108 is reached may enable the method to identify the sequence in which the PV power devices are wired in the string.

Figure 11B:
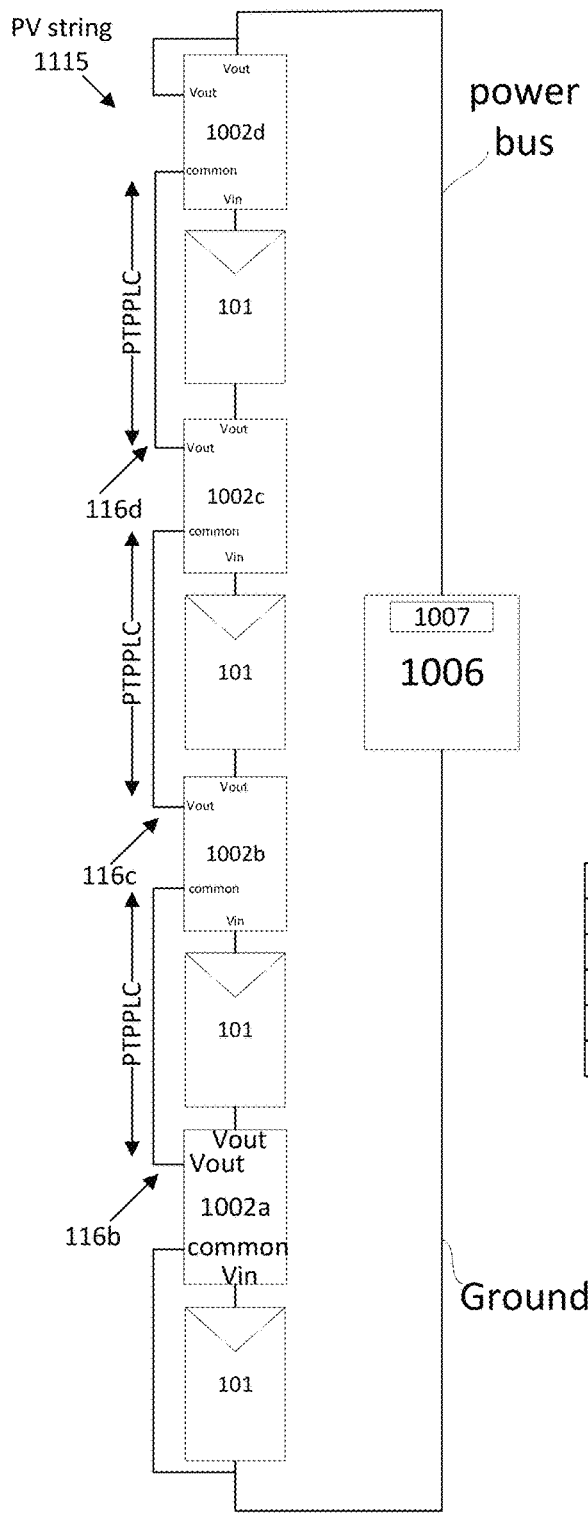

Reference is now made to FIG. 11B, which illustrates, by way of example, a result of running method 1100 on an illustrative PV string. In this illustrative example, PV string 1115 comprises four PV power devices: 1002a, 1002b, 1002c and 1002d, each comprising circuitry similar to or the same as circuitry 140a of FIGS. 10A-10D or of FIG. 10G. At the outset of the method, the order of the power devices is unknown (i.e. the method does not know which (i.e. first) PV power device is coupled to the ground bus, which (i.e. second) PV power device is coupled to the first PV power device, and so on. At the method initialization, table 1110 is empty, and table 111 indicates that the pool of unordered power devices comprises all of the PV power devices in string 1115. The first time the method reaches step 1102, the method selects (e.g. at random, the lowest ID number, etc.) power device 1002b as the selected power device. At step 1102, PV power device 1002b may be commanded to change an operating parameter (e.g. the duty cycle of switching elements in PV power device 1002b). At step 1104 PV power devices 1002a-d report measurements taken by sensors/sensor interfaces such as ammeters. At step 1105, the method may determine that only the measurements taken by PV power device 1002a have changed substantially, and may determine that PV power device 1002a is adjacent to PV power device 1002b. At step 1106, Line #1 of table 1110 may be saved to memory, indicating that PV power devices 1002a, 1002b are adjacent to one another, and PV power device 1002b may be removed from the pool of unordered devices (as indicated by table 1111, in the line corresponding to the end of the first iteration).

At step 1107, the method may determine that the pool of unordered devices is not empty, loop back to step 1102, and select PV power device 1002a as the selected power device. In some embodiments, the selection may be random. In some embodiments, the reporting power device of the previous iteration may become the selected power device (provided it is still in the pool of unordered devices). At the next time step 1105 is reached, the method may determine that no PV power devices have reported changed measurements, and may determine that PV power device 1002a is coupled to the ground bus. In this iteration, no reporting power device may be labeled, and Line #2 of table 1110 may be generated indicating the PV power device 1002a has no neighbor at this iteration. PV power device 1002a may be removed from the pool of unordered devices at step 1106.

After iterating through steps 1102-1107 an additional two times, step 1108 may be reached, with table 1110 having four line indicating the results of the four iterations through steps 1102-1107. At step 1108, the method may determine that PV power device 1002a is coupled to the ground bus, as indicated by Line #2 of table 1110. The method may determine that PV power device 1002b is coupled to PV power device 1002a (as indicated by Line #1 of table 1110), PV power device 1002c is coupled to PV power device 1002b (as indicated by Line #3 of table 1110), and that PV power device 1002d is coupled to PV power device 1002c (as indicated by Line #4 of table 1110). The method may therefore output the determination that the order of the power devices is 1002a-1002b-1002c-1002d, as shown in the figure.

Point-to-point PLC between adjacent power devices may be used for a variety of communication and control applications in addition to mapping photovoltaic installations. For example, in some photovoltaic installations, photovoltaic power devices may measure operational parameters such as input or output voltage, input or output current, input or output power, and the temperature and/or solar irradiance in the vicinity of the power device. These operational parameters may be periodically transmitted via PLC (e.g., by a sequence of point-to-point PLC transmissions along the string of power devices) to a data collection point, such as a memory or control device (e.g. a dedicated data collection or control device, or a device included in a system device such as a power combiner box or DC-to-AC inverter). In PLC that does not use the point-to-point configuration as disclosed herein, a transmitted data packet may be transmitted at a high power amplitude, to enable the transmitted signal to be received at the data collection point at a power amplitude sufficient to be detected by PLC receiving circuitry. For example, a last power device may be located 100 meters away from the data collection point, with 15 other power devices connected in between the last power device and the data collection point. Without using point-to-point PLC, the last power device would need to transmit a high-power signal to be received 100 m away after traversing 15 other power devices. By taking advantage of circuitry deployed in the illustrative embodiment of FIG. 10G, each respective first power device may transmit a signal to be received at the second power device immediately adjacent to the first power device, each power device repeating all messages received from other power devices, reducing the required signal power amplitude. The power device connected to the data collection point may be physically closest to the data collection point, and may transmit data at an amplitude significantly lower than what would otherwise be required by each other power device, still enabling reception of the message by the device collecting data. In some embodiments, the power device connected to the data collection point may transmit data at an amplitude sufficient to traverse several PV power devices. One possible advantage of transmitting data at an increased amplitude may be enablement of continuous communication in case an intermediate device fails. Referring again to FIG. 11B, PV power device 1002a may communicate with PV power device 1002b using Point-to-Point Power Line Communications (PTPPLC) over bypass path 116b. In some embodiments (e.g. each PV power device 1002 has circuitry similar to or the same as circuitry 140a of FIG. 10A), communication may be uni-directional (e.g. power device 1002b is able to send data to power device 1002a, while power device 1002a might not be able to send data to power device 1002b), and in some embodiments (e.g. each PV power device 1002 has circuitry similar to or the same as circuitry 140a of FIG. 10G), communication may be bidirectional (for example, power devices 1003a and 1003b may be able to send data to each other). System power device 1006 (e.g. DC-to-AC inverter or combiner box) may be similar to system power device 110 of FIG. 1A, and may be coupled between the ground bus and power bus, and may comprise a data-collection device (e.g. a memory device, a controller, etc.— not explicitly depicted). System power device 1006 may further comprise PLC device 1007 coupled to carry out power line communications over the power bus and/or the ground bus. Similarly to other illustrative embodiments disclosed herein, additional PV strings similar to PV string 1115 (not explicitly depicted) may be coupled in parallel with PV string 1115, and coupled to system power device 1006. In some embodiments enabling one-way PLC, PV power device 1002d may transmit data to PV power device 1002c, PV power device 1002c may transmit data to PV power device 1002b, PV power device 1002b may transmit data to PV power device 1002a, and PV power device 1002a may transmit data to system power device 1006. In some embodiments enabling two-way PLC, PV power device 1002d may transmit data to system power device 1006 and PV power device 1002c, PV power device 1002c may transmit data to PV power devices 1003d and 1003b, and so on.

System power device 1006 may be configured to transmit commands and/or sent data to PV power devices 1002a-d. For example, step 1103 of method 1100 may comprise system power device 1006 transmitting a PLC signal over the power bus indicating an ID number of a selected PV power device.

In some embodiments, a message sent by a PV power device to an adjacent PV power device may be transmitted at a power amplitude significantly lower than a message which may be sent to system power device (e.g. 1006). For example, communication between PV power devices 1002b and 1002c may utilize much lower power than communication between PV power device 1002b and system power device 1006, due to the much shorter distance and lower number of electrical circuits in between the two communicating devices. In case a PV power device (e.g. 1002b) fails, two PV power devices adjacent to the failed PV power device (e.g. 1002a and 1002c) may communicate via PLC, with PV power device 1002b providing a bypass path for PLC signals. PLC between PV power devices 1002a and 1002c may be carried out at a reduced amplitude compared to the amplitude that would be required for PV power device 1002c to transmit directly to system power device 1006. Significant power savings may be realized by not attempting to transmit data to system power device 1006 by PV power devices not physically close to system power device 1006. Furthermore, the size and cost of associated circuitry for transmitting PLC messages may be significantly reduced by limiting the transmitted data to a lower power amplitude.

Figure 11C:
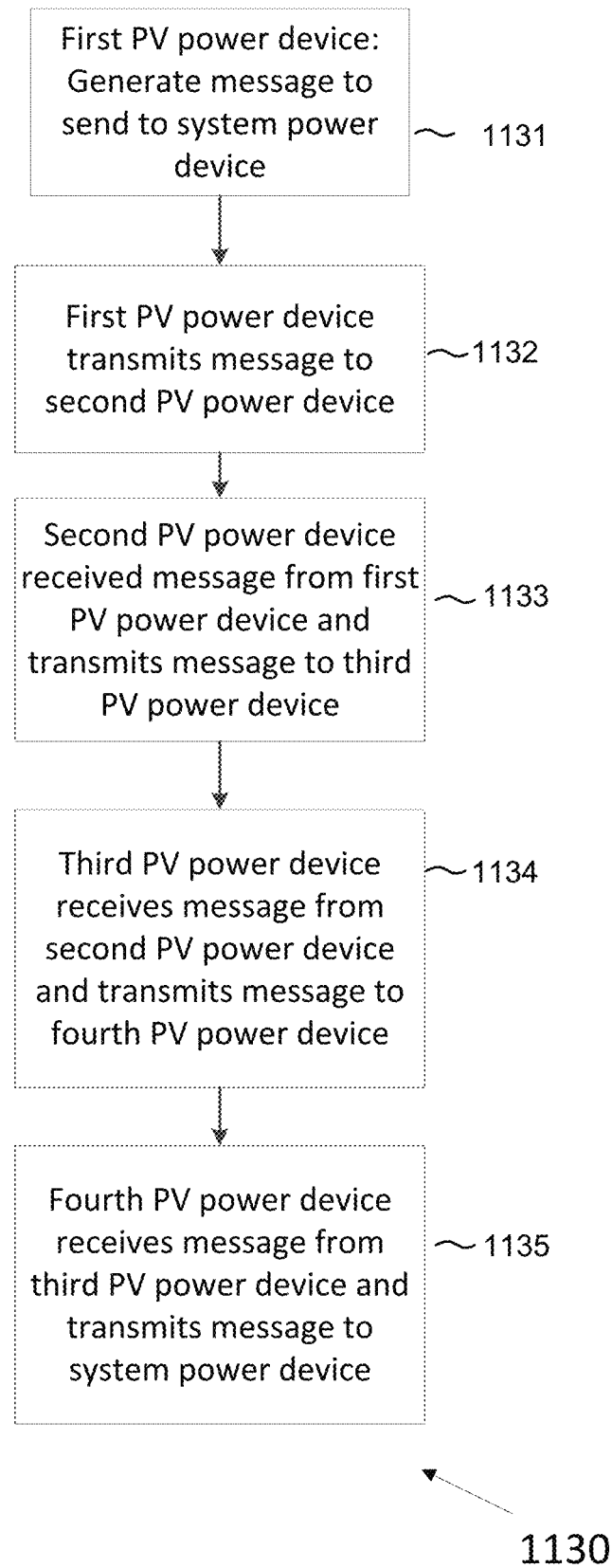

Reference is now made to FIG. 11C, which illustrates a method for point-to-point power line communications (PTP-PLC) according to illustrative embodiments. Method 1130 may be used when, for example, a first PV power device (e.g. PV power device 1002a of FIG. 11B) may send a message (e.g. comprising telemetry data or other operational data) to a system power device (e.g. system power device 1006.) At step 1131, the first PV power device (e.g., 1002a) generates the message to be sent. At step 1132, the first PV power device transmits the message using PTPPLC to a second, adjacent PV power device (e.g., 1002b). For example, the message may be encoded as a high-frequency (e.g. tens or hundreds of kHz) signal transmitted over a first bypass path between the PV power devices (e.g., 116b of FIG. 11B). In some embodiments, the first PV power device may transmit a message to the second PV power device through a PV generator, e.g. the PV generator 101 coupled between PV power devices 1002a and 1002b). At step 1133, the second PV power device (e.g., 1002b) may receive the message transmitted over the bypass path, and may re-transmit the message to a third PV power device adjacent to the re-transmitting PV power device (e.g., 1002c) over a second bypass path (e.g., 116c). At step 1134, the third PV power device (e.g. 1002c) may receive the message re-transmitted over the second bypass path (e.g., 116c), and may re-transmit for a second time the message to a third PV power device (e.g. 1002d) over a third bypass path (e.g. 116d). Each PV power device in a PV string may receive a message from a first adjacent PV power device, and re-transmit the message to a second adjacent PV power device, until the message is received by a final PV power device adjacent or in close physical proximity to a system power device (e.g. 1006). At step 1134, the final PV power device (e.g. 1002d) may receive the message transmitted over a final bypass path, and may forward the message to a system power device (e.g. 1006) over the power bus. In some embodiments, the communication connections may be reversed, i.e. the first PV power device (e.g. 1002a) may communicate directly with system power device 1006 over the ground bus, with messages generated by the final PV power device (e.g. 1002d) passing through intermittent PV power devices (e.g. 1002c, 1002b and 1002a). In some embodiments, the first and final PV power devices (e.g. 1002a and 1002d) may communicate directly with the system power device (e.g. 1006) over either the ground bus or the power bus, with messages generated by intermediate PV power devices (e.g. 1002b and 1002c) passing through the first or final PV power devices (e.g. 1002a or 1002d) for transmission to system power device (e.g. 1006).

Illustrative embodiments may include a system comprising a plurality of DC/DC converters, each DC/DC converter receiving power from a photovoltaic generator, the DC/DC converters coupled in series or in parallel between a ground bus and a power bus, the DC/DC converters configured to output a time-varying DC voltage. A system power device comprising a group of switches is coupled between the ground bus and the power bus, and is configured to receive the time-varying DC voltage and output an AC voltage. In some embodiments, the system power device further comprises a filter, a controller and/or a communication device. In some embodiments, the controller is configured to switch the switches featured by system power device. In some embodiments, the communication device is configured to communicate with communication devices featured by the PV power devices. In some embodiments, the system power device further comprises a second group of switches, the controller configured to switch the second group of switches in response to a failure of one or more of the first group of switches. In some embodiments, the system includes a second system power device, the second system power device operable in response to a failure of the first system power device. In some embodiments, the DC/DC converters are configured to output synchronized time-varying DC voltage and current signals.

In the illustrative embodiments disclosed herein, photovoltaic generators are used to exemplify power sources which may make use of the novel features disclosed. In some embodiments, the power sources may include batteries, supercapacitors, wind or hydroelectric turbines, fuel cells or other energy sources in addition to or instead of photovoltaic generators. The power sources may be alternating current (AC) power sources or direct current (DC) power sources. In some embodiments, batteries may be both used as a power source and used as an electrical load, and charged by the system power sources. The current routing methods and other techniques disclosed herein may be applied to alternative power sources such as those listed above, and the nearly exclusive mentioning of photovoltaic generators as power sources is not intended to be limiting in this respect.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations. For example, the power device and current routing elements of one embodiment may be interchanged with the power device and current routing elements of other embodiments. For example, PV generator 101 from FIG. 1A may be interchangeable with PV generator 501 from FIG. 5 and/or generator 101 of FIGS. 10A-10D and 10G, and string 105 from FIGS. 1A, 1C and 1D may be interchangeable with string 205 of FIG. 2A and/or string 805 of FIG. 8.

What is claimed is:

1. A system comprising:
    a plurality of power devices arranged in a sequence, wherein each power device comprises an output, an input, and a common; and
    a plurality of first current paths, wherein, between each adjacent pair of the power devices in the sequence, one of the plurality of first current paths connects the output of a first power device of the adjacent pair to the common of a second power device of the adjacent pair, and wherein the output of the first power device of the adjacent pair is configured to be connected by one of a plurality of second current paths through one of a plurality of power sources to the input of the second power device of the adjacent pair.

2. The system of claim 1, further comprising the plurality of power sources and the plurality of second current paths, wherein for each adjacent pair of the power devices in the sequence, the output of the first power device of the adjacent pair is connected by one of the plurality of second current paths through one of the plurality of power sources to the input of the second power device of the adjacent pair.

3. The system of claim 1, wherein each of the plurality of power devices comprises a second input, wherein for each adjacent pair of the power devices in the sequence, the output of the first power device of the adjacent pair is configured to be connected by one of a plurality of third current paths through a further one of the plurality of power sources to the second input of the second power device of the adjacent pair.

4. The system of claim 3, further comprising the plurality of power sources, the plurality of second current paths, and the plurality of third current paths, wherein for each adjacent pair of the of the power devices in the sequence, the output of the first power device of the adjacent pair is connected by one of the plurality of second current paths through one of the plurality of power sources to the input of the second power device of the adjacent pair, and wherein the output of the first power device of the adjacent pair is connected by one of the plurality of third current paths through the further one of the plurality of power sources to the second input of the second power device of the adjacent pair.

5. The system of claim 1, wherein the plurality of first current paths are configured to carry direct-current (DC).

6. The system of claim 1, wherein the plurality of first current paths are configured to carry alternating-current (AC).

7. The system of claim 1, wherein an ending power device of the plurality of power devices is arranged at an end of the sequence, is the second power device in only one of the adjacent pairs, and has its output connected to a ground bus or a power bus.

8. The system of claim 1, wherein a beginning power device of the plurality of power devices is arranged at a beginning of the sequence, is the first power device in only one of the adjacent pairs of the power devices in the sequence, and is connected to a power bus or a ground bus through separate third and fourth paths, the third path connecting the common of the beginning power device to the power bus or the ground bus and the fourth path connecting the input of the beginning power device through a further one of the power sources to the power bus or the ground bus.

9. The system of claim 2, wherein the plurality of power sources comprise photovoltaic generators.

10. The system of claim 1, further comprising the plurality of power sources, wherein each of the plurality of power devices is integrated with one of the plurality of power sources to form one of a plurality of integrated apparatuses.

11. A power device comprising:
an input connector, a common connector, a plurality of output connectors, a conversion circuit, and a photovoltaic generator, integrated together, wherein:
the common connector is connected by a first direct-current path to a common node of the conversion circuit, the input connector is connected by a second direct-current path to an input node of the conversion circuit, and the plurality of output connectors are connected by a plurality of additional direct-current paths to an output node of the conversion circuit;
the photovoltaic generator is connected serially between the input connector and the input node as part of the second direct-current path or connected serially between one of the plurality of output connectors and the output node as part of one of the plurality of additional direct-current paths; and
the conversion circuit is configured to convert input power received on the input node to output power on the output node.

12. The power device of claim 11, wherein the conversion circuit comprises a direct-current to direct-current (DC/DC) converter or a direct-current to alternating-current (DC/AC) converter.

13. The power device of claim 11, further comprising a communication device configured to communicate with at least one other power device comprising another communication device.

14. The power device of claim 13, wherein the communication device is configured to communicate with the at least one other power device by transmitting a signal over the first direct-current path, the second direct-current path, or one of the plurality of additional direct-current paths.

15. The power device of claim 11, further comprising a current sensor, wherein the power device is configured to compare two or more current measurements taken with the current sensor at two or more different times, and based on the two or more current measurements, detect an identifying characteristic of an adjacent power device connected to the power device.

16. The power device of claim 11, further comprising a control circuit configured to maximize the input power received by the conversion circuit at the input node.

17. A system comprising:
a first and second power devices each comprising:
a casing,
a power conversion circuit housed in the casing and comprising an input node, an output node, and a common node,
an input connector accessible from outside of the casing and electrically connected to the input node, and
an output connector accessible from outside of the casing and electrically connected to the output node; and
an electrical cable connected between the first and the second power devices and electrically connecting the common node of the power conversion circuit in the first power device to the output node of the power conversion circuit in the second power device.

18. The system of claim 17, further comprising:
a second output connector of the first power device, or a second cable, accessible from outside of the casing of the first power device and connected to the output node of the power conversion circuit in the first power device; or
a common connector of the second power device, or the second cable, connected to the common node of the power conversion circuit in the second power device.

19. The system of claim 17, further comprising:
a third power device comprising:
a third casing,
a third power conversion circuit housed in the third casing and comprising a third input node, a third output node, and a third common node,
a third input connector accessible from outside of the third casing and electrically connected to the third input node, and a third output connector accessible from outside of the third casing and electrically connected to the third output node; and
a second electrical cable connected between the second and the third power devices and electrically connecting the common node of the power conversion circuit in the second power device to the third output node of the third power conversion circuit in the third power device.

20. The system of claim 17, wherein the first and the second power devices each comprise a maximum power point tracking circuit configured to maximize power received at the input node of the first and the second power devices, respectively.

* * * * *